US011822324B2

United States Patent
Abe et al.

(10) Patent No.: US 11,822,324 B2
(45) Date of Patent: Nov. 21, 2023

(54) MACHINE LEARNING METHOD, CONSUMABLE MANAGEMENT APPARATUS, AND COMPUTER READABLE MEDIUM

(71) Applicant: Gigaphoton Inc., Tochigi (JP)

(72) Inventors: Kunihiko Abe, Oyama (JP); Yuji Minegishi, Oyama (JP); Satoru Kikuchi, Oyama (JP); Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 223 days.

(21) Appl. No.: 17/366,586

(22) Filed: Jul. 2, 2021

(65) Prior Publication Data

US 2021/0333788 A1    Oct. 28, 2021

Related U.S. Application Data

(63) Continuation of application No. PCT/JP2019/004449, filed on Feb. 7, 2019.

(51) Int. Cl.
    *G05B 23/02* (2006.01)
    *G06N 20/00* (2019.01)
    *G06N 3/02* (2006.01)

(52) U.S. Cl.
    CPC .......... *G05B 23/0283* (2013.01); *G06N 3/02* (2013.01); *G06N 20/00* (2019.01)

(58) Field of Classification Search
    CPC .... G05B 23/0283; G05B 23/024; G06N 3/02; G06N 20/00
    See application file for complete search history.

(56) References Cited

U.S. PATENT DOCUMENTS 6,219,367 B1    4/2001  Atsumi
6,697,695 B1    2/2004  Kurihara et al.
(Continued)

FOREIGN PATENT DOCUMENTS

CN    103364732 A    10/2013
CN    107181163 A    9/2017
(Continued)

OTHER PUBLICATIONS

International Search Report issued in PCT/JP2019/004449; dated May 7, 2019.
(Continued)

*Primary Examiner* — Manuel A Rivera Vargas
(74) *Attorney, Agent, or Firm* — Studebaker & Brackett PC

(57) ABSTRACT

A machine learning method according to a viewpoint of the present disclosure is a machine learning method for creating a learning model configured to estimate the life of a consumable of a laser apparatus, the method including acquiring first life-related information containing data on a parameter relating to the life of the consumable, the data recorded in correspondence with different numbers of oscillation pulses during a period from the start of use of the consumable to replacement thereof, dividing the first life-related information into a plurality of levels each representing the degree of degradation of the consumable in accordance with the numbers of oscillation pulses to create training data, creating the learning model by performing machine learning using the created training data, and saving the created learning model.

20 Claims, 33 Drawing Sheets

(56) References Cited

U.S. PATENT DOCUMENTS

| | | | |
|---|---|---|---|
| 9,059,554 B2 * | 6/2015 | Kurosu | F16C 32/047 |
| 2008/0205472 A1 | 8/2008 | Dunstan et al. | |
| 2011/0235663 A1 | 9/2011 | Akins et al. | |
| 2013/0268466 A1 | 10/2013 | Baek et al. | |
| 2015/0139258 A1 | 5/2015 | Tsushima et al. | |
| 2015/0180192 A1 | 6/2015 | Tsushima et al. | |
| 2017/0262772 A1 | 9/2017 | Takigawa et al. | |
| 2018/0174658 A1 | 6/2018 | Kikuchi | |
| 2018/0246494 A1 | 8/2018 | Nakahama | |
| 2020/0061768 A1 | 2/2020 | Morita et al. | |

FOREIGN PATENT DOCUMENTS

| | | | |
|---|---|---|---|
| CN | 108228371 A | 6/2018 | |
| JP | H08-320296 A | 12/1996 | |
| JP | H10-275951 A | 10/1998 | |
| JP | 2002-043219 A | 2/2002 | |
| JP | 2010-519782 A | 6/2010 | |
| JP | 2013-217897 A | 10/2013 | |
| JP | 2018-097723 A | 6/2018 | |
| JP | 2018-138327 A | 9/2018 | |
| JP | 2018-205528 A | 12/2018 | |
| WO | 2014/017562 A1 | 1/2014 | |
| WO | 2014/038584 A1 | 3/2014 | |
| WO | 2018/105175 A1 | 6/2018 | |

OTHER PUBLICATIONS

International Preliminary Report on Patentability (Chapter I) and Written Opinion of the International Searching Authority issued in PCT/JP2019/004449; dated Aug. 10, 2021.

An Office Action; "Notice of Reasons for Refusal," mailed by the Japanese Patent Office dated Jan. 26, 2023, which corresponds to Japanese Patent Application No. 2020-570296 and is related to U.S. Appl. No. 17/366,586; with English language translation.

A Notice of Decision of Granting Patent Right mailed by China National Intellectual Property Administration dated Apr. 22, 2023, which corresponds to Chinese Application No. 201980087617.2 and is related to U.S. Appl. No. 17/366,586; with English language translation.

* cited by examiner

FIG. 15

| DEGREE OF DEGRADATION | PROBABILITY OF DEGREE OF DEGRADATION |
|---|---:|
| Lv(1) | 0.0% |
| Lv(2) | 0.0% |
| Lv(3) | 3.2% |
| Lv(4) | 9.8% |
| Lv(5) | 13.7% |
| Lv(6) | 43.2% |
| Lv(7) | 67.8% |
| Lv(8) | 39.3% |
| Lv(9) | 17.3% |
| Lv(10) | 2.0% |

FIG. 18

| BLANKET ITEM | SPECIFIC EXAMPLE | DESCRIPTION |
|---|---|---|
| ELECTRODE DEGRADATION PARAMETER | NUMBER OF DISCHARGE ACTIONS BETWEEN ELECTRODES | NUMBER OF DISCHARGE ACTIONS BETWEEN ELECTRODES OF LASER CHAMBER ($\approx$ NUMBER OF OSCILLATION PULSES Np AFTER LASER CHAMBER IS REPLACED) |
| | SPECTRAL LINEWIDTH | DEGRADATION OF ELECTRODES AND SPECTRAL LINEWIDTH $\Delta\lambda$ POSITIVELY CORRELATE WITH EACH OTHER, AND INCREASE IN SPECTRAL LINEWIDTH TENDS TO INDICATE IN SOME CASES THAT ELECTRODES HAVE BEEN DEGRADED. SPECTRAL LINEWIDTH MAY, FOR EXAMPLE, BE FULL WIDTH AT HALF MAXIMUM OR WIDTH CORRESPONDING TO 95% OF ENERGY. |
| | INPUT ENERGY | ENERGY Ein INPUTTED TO ELECTRODES TENDS TO BE PROPORTIONAL TO DEGRADATION OF ELECTRODES DUE TO ONE DISCHARGE ACTION. $Ein = (1/2) Co \cdot V^2$ Co: CAPACITY OF CHARGING CAPACITOR OF PPM, V: CHARGING VOLTAGE |
| | INTEGRATED VALUE OF INPUT ENERGY AFTER LASER CHAMBER IS REPLACED | INTEGRATED VALUE Einsum OF ENERGY INPUTTED TO ELECTRODES TENDS TO BE PROPORTIONAL TO ACCUMULATION OF DEGRADATION OF ELECTRODES. $Einsum = Ein(1) + Ein(2) + \ldots Ein(Np)$ |
| PULSE ENERGY STABILITY PARAMETER | PULSE ENERGY | PULSE ENERGY E OF PULSED LASER LIGHT OUTPUTTED FROM LASER APPARATUS, PULSE ENERGY MAY BE AVERAGED |
| | VARIATION IN PULSE ENERGY | VARIATION IN PULSE ENERGY $E\sigma = Es/Eav \cdot 100(\%)$ Es: STANDARD DEVIATION OF m PULSE ENERGY VALUES (E(1), E(2), ... E(m)) Eav: AVERAGE OF m PULSE ENERGY VALUES (E(1), E(2), ... E(m)) |
| | VARIATION IN INTEGRATED VALUE OF PULSE ENERGY | VARIATION IN INTEGRATED VALUE OF PULSE ENERGY $D\sigma = Ds/Dav \cdot 100(\%)$ Ds: STANDARD DEVIATION o PULSE ENERGY INTEGRATED VALUES D (D(1), D(2), ... D(o)) Dav: AVERAGE OF o PULSE ENERGY INTEGRATED VALUES D (D(1), D(2), ... D(o)) D: INTEGRATED VALUE D OF q PULSE ENERGY VALUES $D(1) = E(1) + E(2) + \ldots + E(q), D(2) = E(2) + E(3) + \ldots + E(q+1)$ |

FIG. 19

| BLANKET ITEM | SPECIFIC EXAMPLE | DESCRIPTION |
|---|---|---|
| GAS CONTROL PARAMETER | GAS PRESSURE IN LASER CHAMBER | GAS PRESSURE P IN LASER CHAMBER IS PARAMETER THAT AFFECTS PULSE ENERGY OF PULSED LASER LIGHT OUTPUTTED FROM LASER APPARATUS AND MAY BE AVERAGED VALUE |
| | CHARGING VOLTAGE | CHARGING VOLTAGE V IS PARAMETER THAT AFFECTS PULSE ENERGY OF PULSED LASER LIGHT OUTPUTTED FROM LASER APPARATUS AND MAY BE AVERAGED VALUE |
| | INTEGRATED VALUE OF AMOUNT OF INJECTED HALOGEN GAS AFTER LASER CHAMBER IS REPLACED | INTEGRATED VALUE OF AMOUNT OF INJECTED HALOGEN GAS IS PARAMETER THAT CORRELATES WITH DEGRADATION OF DISCHARGE ELECTRODES AND MAY BE REPLACED WITH THE NUMBER OF ACTIONS OF INJECTING HALOGEN GAS BY FIXED AMOUNT AFTER LASER CHAMBER IS REPLACED |
| | AMOUNT OF INJECTED HALOGEN GAS PER OSCILLATION PULSE | AMOUNT OF INJECTED HALOGEN GAS PER OSCILLATION PULSE IS PARAMETER THAT TENDS TO INCREASE WHEN LIFE OF LASER CHAMBER APPROACHES END OF LIFE AND MAY BE REPLACED WITH NUMBER OF ACTIONS OF INJECTING HALOGEN GAS PER OSCILLATION PULSE |
| | INTEGRATED VALUE OF AMOUNT OF INJECTED LASER GAS AFTER LASER CHAMBER IS REPLACED | INTEGRATED VALUE OF AMOUNT OF INJECTED LASER GAS AFTER LASER CHAMBER IS REPLACED IS PARAMETER THAT CORRELATES WITH AMOUNT OF IMPURITY GAS PRESENT IN CHAMBER AND MAY BE INTEGRATED VALUE OF SUM OF AMOUNT OF LASER GAS ENTIRELY REPLACED AND AMOUNT OF LASER GAS PARTIALLY REPLACED AFTER LASER GAS IS REPLACED AND MAY BE REPLACED WITH NUMBER OF ACTIONS OF ENTIRELY REPLACING LASER GAS OR NUMBER OF ACTIONS OF PARTIALLY REPLACING LASER GAS |
| | AMOUNT OF INJECTED LASER GAS PER OSCILLATION PULSE | AMOUNT OF INJECTED LASER GAS PER OSCILLATION PULSE IS PARAMETER THAT TENDS TO INCREASE WHEN LIFE OF LASER CHAMBER APPROACHES END OF LIFE AND MAY BE REPLACED WITH NUMBER OF ACTIONS OF ENTIRELY REPLACING GAS OR NUMBER OF ACTIONS OF PARTIALLY REPLACING GAS PER OSCILLATION PULSE |
| | CHARGING VOLTAGE AFTER ENTIRE GAS IS REPLACED AND ADJUSTMENT OSCILLATION IS PERFORMED | TO CONTROL CHARGING VOLTAGE WITH OVERALL GAS PRESSURE FIXED, ADJUSTMENT OSCILLATION IS PERFORMED AFTER ENTIRE GAS IS REPLACED INITIAL CHARGING VOLTAGE Vini FOR RECOVERING LASER PERFORMANCE |
| | GAS PRESSURE IN LASER CHAMBER AFTER ENTIRE GAS IS REPLACED AND ADJUSTMENT OSCILLATION IS PERFORMED | TO CONTROL OVERALL GAS PRESSURE IN SUCH A WAY THAT CHARGING VOLTAGE FALLS WITHIN PREDETERMINED RANGE, ADJUSTMENT OSCILLATION IS PERFORMED AFTER ENTIRE GAS IS REPLACED INITIAL GAS PRESSURE Pini IN LASER CHAMBER FOR RECOVERING LASER PERFORMANCE |

FIG. 20

| BLANKET ITEM | SPECIFIC EXAMPLE | DESCRIPTION |
|---|---|---|
| RUNNING LOAD PARAMETER | AVERAGE POWER OF LASER LIGHT OUTPUTTED FROM LASER APPARATUS | AVERAGE POWER PW IS PARAMETER PROPORTIONAL TO THERMAL LOAD TO LASER CHAMBER $PW=Nt\cdot E/T$, T: SAMPLING PERIOD, Nt: NUMBER OF PULSES IN PERIOD T, E: PULSE ENERGY WHEN PULSE ENERGY E IS NOT FIXED, AVERAGE POWER PW MAY BE DETERMINED BY INTEGRATING PULSE ENERGY IN SAMPLING PERIOD (Esum) $PW=Esum/T$ T MAY RANGE FROM 30 TO 3000 SECONDS |
| | DUTY IN BURST RUNNING | RUNNING LOAD PARAMETER MAY BE REPLACED WITH THE FOLLOWING PARAMETER WHEN REPETITIVE FREQUENCY f AT THE TIME OF BURST ON IS SUBSTANTIALLY FIXED AND PULSE ENERGY E AT THE TIME OF BURST ON IS SUBSTANTIALLY FIXED, RUNNING LOAD PARAMETER MAY BE REPLACED WITH DUTY IN BURST RUNNING $DUTY=Don/Tb*100(\%)$ |
| PARAMETER OF DEGRADATION OF OPTICAL ELEMENT IN LASER RESONATOR | NUMBER OF OSCILLATION PULSES AFTER WINDOWS ARE REPLACED | DEGRADATION OF WINDOWS DEPENDS ON NUMBER OF OSCILLATION PULSES Npw AFTER WINDOWS ARE REPLACED |
| | INTEGRATED VALUE OF PULSE ENERGY AFTER WINDOWS ARE REPLACED | ACCUMULATED PARAMETER W1psum OF DEGRADATION OF WINDOWS DUE TO ONE-PHOTON ABSORPTION $W1psum=E(1)+E(2)+E(3)....+E(Npw)$ WHEN PULSE ENERGY IS SUBSTANTIALLY FIXED, ACCUMULATED PARAMETER MAY BE REPLACED WITH NUMBER OF OSCILLATION PULSES Npw |
| | INTEGRATED VALUE OF SQUARE OF PULSE ENERGY AFTER WINDOWS ARE REPLACED | ACCUMULATED PARAMETER W2psum OF DEGRADATION OF WINDOWS DUE TO TWO-PHOTON ABSORPTION $W2psum=E(1)^2+E(2)^2+E(3)^2....+E(Npw)^2$ WHEN PULSE ENERGY IS SUBSTANTIALLY FIXED, ACCUMULATED PARAMETER MAY BE REPLACED WITH NUMBER OF OSCILLATION PULSES Npw |
| | NUMBER OF OSCILLATION PULSES AFTER LNM IS REPLACED | DEGRADATION OF OPTICAL ELEMENT OF LNM DEPENDS ON NUMBER OF OSCILLATION PULSES NpL AFTER LNM IS REPLACED |
| | INTEGRATED VALUE OF PULSE ENERGY AFTER LNM IS REPLACED | ACCUMULATED PARAMETER LNM1psum OF DEGRADATION OF OPTICAL ELEMENT DUE TO ONE-PHOTON ABSORPTION $LNM1psum=E(1)+E(2)+E(3)....+E(NpL)$ WHEN PULSE ENERGY IS SUBSTANTIALLY FIXED, ACCUMULATED PARAMETER MAY BE REPLACED WITH NUMBER OF OSCILLATION PULSES NpL |
| | INTEGRATED VALUE OF SQUARE OF PULSE ENERGY AFTER LNM IS REPLACED | ACCUMULATED PARAMETER LNM2psum OF DEGRADATION OF OPTICAL ELEMENT DUE TO TWO-PHOTON ABSORPTION $LNM2psum=E(1)^2+E(2)^2+E(3)^2....+E(NpL)^2$ WHEN PULSE ENERGY IS SUBSTANTIALLY FIXED, ACCUMULATED PARAMETER MAY BE REPLACED WITH NUMBER OF OSCILLATION PULSES NpL |
| | NUMBER OF OSCILLATION PULSES AFTER OC IS REPLACED | DEGRADATION OF OC DEPENDS ON NUMBER OF OSCILLATION PULSES NpO AFTER OC IS REPLACED |
| | INTEGRATED VALUE OF PULSE ENERGY AFTER OC IS REPLACED | ACCUMULATED PARAMETER OC1psum OF DEGRADATION OF OPTICAL ELEMENT DUE TO ONE-PHOTON ABSORPTION $OC1psum=E(1)+E(2)+E(3)....+E(NpO)$ WHEN PULSE ENERGY IS SUBSTANTIALLY FIXED, ACCUMULATED PARAMETER MAY BE REPLACED WITH NUMBER OF OSCILLATION PULSES NpO |
| | INTEGRATED VALUE OF SQUARE OF PULSE ENERGY AFTER OS IS REPLACED | ACCUMULATED PARAMETER OC2psum OF DEGRADATION OF OPTICAL ELEMENT DUE TO TWO-PHOTON ABSORPTION $OC2psum=E(1)^2+E(2)^2+E(3)^2....+E(NpO)^2$ WHEN PULSE ENERGY IS SUBSTANTIALLY FIXED, ACCUMULATED PARAMETER MAY BE REPLACED WITH NUMBER OF OSCILLATION PULSES NpO |

FIG. 21

| BLANKET ITEM | SPECIFIC EXAMPLE | DESCRIPTION |
|---|---|---|
| PARAMETER OF DEGRADATION OF OPTICAL ELEMENT IN MONITORING MODULE | NUMBER OF OSCILLATION PULSES AFTER MONITORING MODULE IS REPLACED | DEGRADATION OF OPTICAL ELEMENT OF MONITORING MODULE DEPENDS ON NUMBER OF OSCILLATION PULSES NpM AFTER MONITORING MODULE IS REPLACED |
| | INTEGRATED VALUE OF PULSE ENERGY AFTER MONITORING MODULE IS REPLACED | ACCUMULATED PARAMETER MM1psum OF DEGRADATION OF WINDOWS DUE TO ONE-PHOTON ABSORPTION $MM1psum = E(1) + E(2) + E(3) \ldots + E(NpM)$ WHEN PULSE ENERGY IS SUBSTANTIALLY FIXED, ACCUMULATED PARAMETER MAY BE REPLACED WITH NUMBER OF OSCILLATION PULSES NpM |
| | INTEGRATED VALUE OF SQUARE OF PULSE ENERGY AFTER MONITORING MODULE IS REPLACED | ACCUMULATED PARAMETER MM2psum OF DEGRADATION OF WINDOWS DUE TO TWO-PHOTON ABSORPTION $MM2psum = E(1)^2 + E(2)^2 + E(3)^2 \ldots + E(NpM)^2$ WHEN PULSE ENERGY IS SUBSTANTIALLY FIXED, ACCUMULATED PARAMETER MAY BE REPLACED WITH NUMBER OF OSCILLATION PULSES NpM |
| PARAMETER OF DEGRADATION OF OPTICAL SENSOR | INTENSITY OF LIGHT DETECTED WITH IMAGE SENSOR | INTENSITY OF LIGHT DETECTED WITH IMAGE SENSOR CAN BE PARAMETER OF DEGRADATION OF IMAGE SENSOR. DETECTION SENSITIVITY OF IMAGE SENSOR IS DEGRADED WHEN IRRADIATED WITH LASER LIGHT. SPECIFICALLY, DETECTED LIGHT INTENSITY MAY BE PEAK OPTICAL INTENSITY OF INTERFERENCE FRINGES PRODUCED BY ETALON SPECTROMETER OR INTEGRATED VALUE OF DETECTED OPTICAL INTENSITY IN EACH CHANNEL OF IMAGE SENSOR |
| | SPECTRAL LINEWIDTH | PEAK INTENSITY DETECTED WITH IMAGE SENSOR CHANGES IN ACCORDANCE WITH PULSE ENERGY. WHEN SPECTRAL LINEWIDTH WIDENS, PEAK INTENSITY LOWERS. SPECTRAL LINEWIDTH MAY, FOR EXAMPLE, BE FULL WIDTH AT HALF MAXIMUM OR WIDTH CORRESPONDING TO 95% OF ENERGY |
| | PULSE ENERGY | PEAK INTENSITY DETECTED WITH IMAGE SENSOR CHANGES IN ACCORDANCE WITH PULSE ENERGY. WHEN SPECTRAL LINEWIDTH WIDENS, PEAK INTENSITY LOWERS. |
| | INTEGRATED VALUE OF PULSE ENERGY | SINCE INTEGRATED VALUE OF PULSE ENERGY DEPENDS ON AMOUNT OF EXPOSER AFTER MONITORING MODULE IS REPLACED, INTEGRATED VALUE MMpsum OF PULSE ENERGY AFTER MONITORING MODULE IS REPLACED $MMpsum = E(1) + E(2) + E(3) \ldots + E(NpM)$ WHEN PULSE ENERGY IS SUBSTANTIALLY FIXED, INTEGRATED VALUE OF PULSE ENERGY MAY BE REPLACED WITH NUMBER OF OSCILLATION PULSES NpM |

FIG. 22

| BLANKET ITEM | SPECIFIC EXAMPLE | DESCRIPTION |
|---|---|---|
| PARAMETER OF DEGRADATION OF OPTICAL ELEMENT OF LNM | NUMBER OF OSCILLATION PULSES AFTER LNM IS REPLACED | DEGRADATION OF OPTICAL ELEMENT OF LNM DEPENDS ON NUMBER OF OSCILLATION PULSES NpL AFTER LNM IS REPLACED |
| | INTEGRATED VALUE OF PULSE ENERGY AFTER LNM IS REPLACED | ACCUMULATED PARAMETER LNM1psum OF DEGRADATION OF OPTICAL ELEMENT DUE TO ONE-PHOTON ABSORPTION $LNM1psum=E(1)+E(2)+E(3)\ldots+E(NpL)$ WHEN PULSE ENERGY IS SUBSTANTIALLY FIXED, ACCUMULATED PARAMETER MAY BE REPLACED WITH NUMBER OF OSCILLATION PULSES NpL |
| | INTEGRATED VALUE OF SQUARE OF PULSE ENERGY AFTER LNM IS REPLACED | ACCUMULATED PARAMETER LNM2psum OF DEGRADATION OF OPTICAL ELEMENT DUE TO TWO-PHOTON ABSORPTION $LNM2psum=E(1)^2+E(2)^2+E(3)^2\ldots+E(NpL)^2$ WHEN PULSE ENERGY IS SUBSTANTIALLY FIXED, ACCUMULATED PARAMETER MAY BE REPLACED WITH NUMBER OF OSCILLATION PULSES NpL |
| PARAMETER OF DEGRADATION OF WAVELENGTH ACTUATOR | WAVELENGTH STABILITY | WAVELENGTH STABILITY IS STANDARD DEVIATION $\lambda\sigma$ OF WAVELENGTH AND MAY BE INDEX OF DEGRADATION OF WAVELENGTH ACTUATOR SUCH AS ROTARY STAGE OF PRISM. VARIATION IN WAVELENGTH STABILITY $\lambda\sigma$ = STANDARD DEVIATION $(\lambda(1), \lambda(2), \ldots, \lambda(m))$ m: NUMBER OF SAMPLES |
| PARAMETER OF DEGRADATION OF WAVEFRONT | SPECTRAL LINEWIDTH | AS FOR SPECTRAL LINEWIDTH $\Delta\lambda$, WAVEFRONT PASSING THROUGH OPTICAL ELEMENT IN LNM OR WAVEFRONT DIFFRACTED BY OPTICAL ELEMENT IN LNM MAY BE INDEX OF DISTORTION. SPECTRAL LINEWIDTH MAY, FOR EXAMPLE, BE FULL WIDTH AT HALF MAXIMUM OR WIDTH CORRESPONDING TO 95% OF ENERGY. |

FIG. 33

HARDWARE VERSION OF LASER CHAMBER: LHW Ver.XXXX
VERSION OF PULSE ENERGY CONTROL SOFTWARE: PEC Ver.XXXX
VERSION OF GAS CONTROL SOFTWARE: GASC Ver.XXXX

| | | | | REPLACEMENT OF LASER CHAMBER → |
|---|---|---|---|---|
| NUMBER OF OSCILLATION PULSES Np AFTER LASER CHAMBER IS REPLACED (≈NUMBER OF DISCHARGE ACTIONS) | Np(1) | Np(2) | | Np(L) |
| SPECTRAL LINEWIDTH $\Delta\lambda$ | $\Delta\lambda$log(1) | $\Delta\lambda$log(2) | | $\Delta\lambda$log(L) |
| INPUT ENERGY Ein | Einlog(1) | Einlog(2) | | Einlog(L) |
| INTEGRATED VALUE Einsum OF INPUT ENERGY AFTER LASER CHAMBER IS REPLACED | Einsumlog(1) | Einsumlog(2) | | Einsumlog(L) |
| PULSE ENERGY E | Elog(1) | Elog(2) | | Elog(L) |
| VARIATION IN PULSE ENERGY E$\sigma$ | E$\sigma$log(1) | E$\sigma$log(2) | | E$\sigma$log(L) |
| VARIATION IN INTEGRATED VALUE OF PULSE ENERGY D$\sigma$ | D$\sigma$log(1) | D$\sigma$log(2) | | D$\sigma$log(L) |
| GAS PRESSURE P IN LASER CHAMBER | Plog(1) | Plog(2) | | Plog(L) |
| CHARGING VOLTAGE V | Vlog(1) | Vlog(2) | | Vlog(L) |
| INTEGRATED VALUE OF AMOUNT OF INJECTED HALOGEN GAS Ghsum AFTER LASER CHAMBER IS REPLACED | Ghsumlog(1) | Ghsumlog(2) | | Ghsumlog(L) |
| AMOUNT OF INJECTED HALOGEN GAS Ghpn PER NUMBER OF OSCILLATION PULSES | Ghpnlog(1) | Ghpnlog(2) | | Ghpnlog(L) |
| INTEGRATED VALUE OF AMOUNT OF INJECTED LASER GAS Glsum AFTER LASER CHAMBER IS REPLACED | Glsumlog(1) | Glsumlog(2) | | Glsumlog(L) |
| AMOUNT OF INJECTED LASER GAS Glpn PER NUMBER OF OSCILLATION PULSES | Glpnlog(1) | Glpnlog(2) | | Glpnlog(L) |
| CHARGING VOLTAGE Vin AFTER ENTIRE GAS IS REPLACED AND ADJUSTMENT OSCILLATION REFORMED | Vinlog(1) | Vinlog(2) | | Vinlog(L) |
| GAS PRESSURE Pini IN LASER CHAMBER AFTER ENTIRE GAS IS REPLACED AND ADJUSTMENT OSCILLATION IS PERFORMED | Pinilog(1) | Pinilog(2) | | Pinilog(L) |

MACHINE LEARNING METHOD, CONSUMABLE MANAGEMENT APPARATUS, AND COMPUTER READABLE MEDIUM

CROSS-REFERENCE TO RELATED APPLICATIONS

The present application is a continuation application of International Application No. PCT/JP2019/004449, filed on Feb. 7, 2019, the entire contents of which are hereby incorporated by reference.

BACKGROUND

1. Technical Field

The present disclosure relates to a machine learning method, a consumable management apparatus, and a computer readable medium.

2. Related Art

A semiconductor exposure apparatus is required to improve the resolution thereof as a semiconductor integrated circuit is increasingly miniaturized and highly integrated. The semiconductor exposure apparatus is hereinafter referred simply to as an "exposure apparatus." To improve the resolution, reduction in wavelength of light outputted from a light source for exposure is underway. A gas laser apparatus is used as the light source for exposure in place of a mercury lamp in related art. At present, a KrF excimer laser apparatus, which outputs ultraviolet light having a wavelength of 248 nm, and an ArF excimer laser apparatus, which outputs ultraviolet light having a wavelength of 193 nm, are used as the gas laser apparatus for exposure.

As a current exposure technology, liquid-immersion exposure, in which a gap between a projection lens of the exposure apparatus and a wafer is filled with a liquid, has been put into use. In the liquid-immersion exposure, since the refractive index of the gap between the projection lens and the wafer changes, the apparent wavelength of the light from the light source for exposure shortens. In the liquid-immersion exposure with an ArF excimer laser apparatus as the light source for exposure, the wafer is irradiated with ultraviolet light having an in-water wavelength of 134 nm. The technology described above is called ArF liquid-immersion exposure. The ArF liquid-immersion exposure is also called ArF liquid-immersion lithography.

Since the KrF and ArF excimer laser apparatuses each have a wide spectral linewidth ranging from about 350 to 400 pm in spontaneous oscillation, the chromatic aberrations occur in association with the laser light (ultraviolet light) projected with the size thereof reduced onto the wafer via the projection lens of the exposure apparatus, resulting in a decrease in the resolution. To avoid the decrease in the resolution, the spectral linewidth of the laser light outputted from the gas laser apparatus needs to be narrow enough to make the chromatic aberrations negligible. The spectral linewidth is also called a spectral width. To achieve a narrow spectral linewidth, a line narrowing module including a line narrowing element is provided in a laser resonator of the gas laser apparatus, and the line narrowing module narrows the spectral width. The line narrowing element may, for example, be an etalon or a grating. A laser apparatus providing a narrowed spectral width described above is called a narrowed-line laser apparatus.

CITATION LIST

Patent Literature

[PTL 1] JP-A-8-320296
[PTL 2] US Patent Application Publication No. 2018/0246494
[PTL 3] U.S. Pat. No. 6,219,367
[PTL 4] U.S. Pat. No. 6,697,695

SUMMARY

A machine learning method according to a viewpoint of the present disclosure is a machine learning method for creating a learning model configured to estimate a life of a consumable of a laser apparatus, the method including acquiring first life-related information containing data on a parameter relating to the life of the consumable, the data recorded in correspondence with different numbers of oscillation pulses during a period from start of use of the consumable to replacement thereof, dividing the first life-related information into a plurality of levels each representing a degree of degradation of the consumable in accordance with the numbers of oscillation pulses and creating training data configured to associate the first life-related information with the levels representing the degrees of deterioration, creating the learning model configured to estimate the degree of degradation of the consumable from the data on the life-related parameter by performing machine learning using the training data, and saving the created learning model.

A consumable management apparatus according to another viewpoint of the present disclosure is a laser apparatus consumable management apparatus including a learning model saving section configured to save the learning model created by carrying out the machine learning method according to the viewpoint of the present disclosure, an information acquisition section configured to receive a signal carrying a request for estimation of a life of a consumable to be replaced in the laser apparatus and acquire current second life-related information relating to the life of the consumable to be replaced, a life estimation section configured to calculate the life and a remaining life of the consumable to be replaced based on the learning model for the consumable to be replaced and the second life-related information relating to the life of the consumable to be replaced, and an information output section configured to notify an external apparatus of information on the calculated life and remaining life of the consumable to be replaced.

A non-transitory computer readable medium according to another viewpoint of the present disclosure is a non-transitory computer readable medium on which a programs is recorded, the program being configured to, when executed by a processor, cause the processor to achieve a machine learning function of creating a learning model for estimating a life of a consumable of a laser apparatus, the program containing instructions for causing the processor to achieve the function of acquiring first life-related information containing data on a parameter relating to the life of the consumable, the data recorded in correspondence with different numbers of oscillation pulses during a period from start of use of the consumable to replacement thereof, the function of dividing the first life-related information into a plurality of levels each representing a degree of degradation of the consumable in accordance with the numbers of oscillation pulses and creating training data configured to associate the first life-related information with the levels representing the degrees of deterioration, the function of creating the learning model configured to estimate the degree of degradation of the consumable from the data on the life-related parameter by performing machine learning using the training data, and the function of saving the created learning model.

BRIEF DESCRIPTION OF THE DRAWINGS

Embodiments of the present disclosure will be described below only by way of example with reference to the accompanying drawings.

FIG. 15 is a table showing an example of probabilities Lv(1) to Lv(10) on a degradation degree basis.

FIG. 18 is a table showing an example of the information relating to the life of the laser chamber.

FIG. 19 is a table showing an example of the information relating to the life of the laser chamber.

FIG. 20 is a table showing an example of the information relating to the life of the laser chamber.

FIG. 21 is a table showing an example of the information relating to the life of a monitoring module.

FIG. 22 is a table showing an example of the information relating to the life of a line narrowing module.

FIG. 33 is a table showing an example of log data contained in a file An.

DETAILED DESCRIPTION

Figure 1:
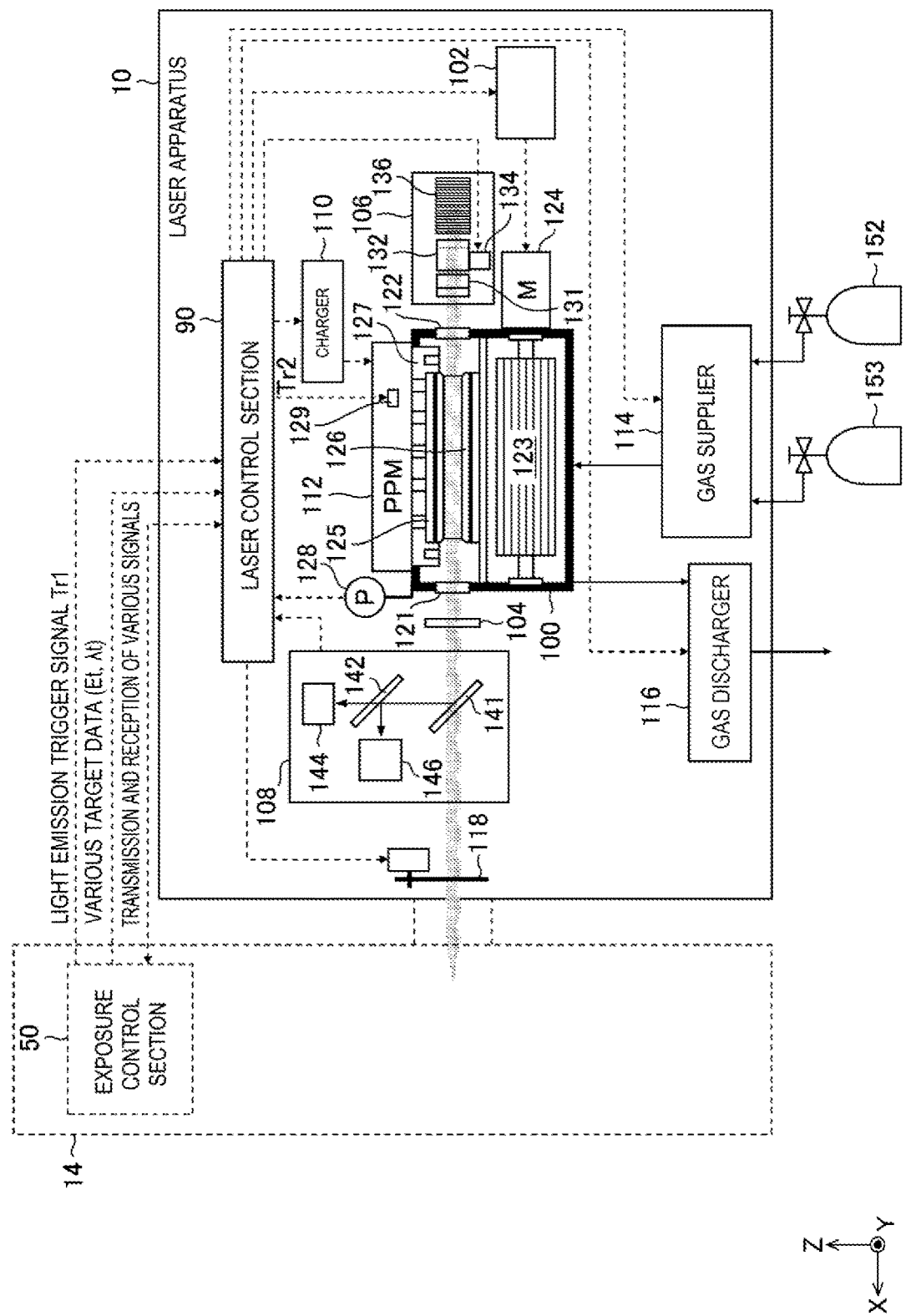
FIG. 1 schematically shows the configuration of an exemplary laser apparatus.

<Contents>
1. Description of terms
2. Description of laser apparatus
  2.1 Configuration
  2.2 Operation
  2.3 Maintenance of primary consumables of laser apparatus
  2.4 Others
3. Example of laser management system in semiconductor factory
  3.1 Configuration
  3.2 Operation
4. Problems
5. First Embodiment
  5.1 Configuration
  5.2 Operation
    5.2.1 Overview of machine learning operation in consumable management server
    5.2.2 Overview of operation of estimating life of consumable in consumable management server
    5.2.3 Example of processes carried out by data acquisition section
    5.2.4 Example of processes carried out by learning model creation section
    5.2.5 Example of creation of learning model used to estimate life of laser chamber
    5.2.6 Example of neural network model
    5.2.7 Learning mode of neural network model 5.2.8 Example of processes carried out by consumable life estimation section
5.2.9 Example of process of calculating life of consumable by using learning model
5.2.10 Life estimation mode of neural network model
5.2.11 Others
5.2.12 Example of processes carried out by data output section
5.3 Information relating to life of laser chamber
5.4 Example of information relating to life of monitoring module
5.5 Example of information relating to life of line narrowing module
5.6 Effects and advantages
5.7 Others
6. Second Embodiment
6.1 Configuration
6.2 Operation
6.2.1 Example of processes carried out by data acquisition section
6.2.2 Example of processes carried out by consumable life estimation section
6.2.3 Example of processes carried out by laser control parameter changing section
6.2.4 Example of processes carried out by data output section
6.3 Effects and advantages
7. Third Embodiment
7.1 Configuration
7.2 Operation
7.2.1 Creation and saving of learning model
7.2.2 Calculation of estimated life and recommended maintenance date
7.3 Effects and advantages
7.4 Others
8. Collection of learning data and creation of learning model according to version of consumable
8.1 Overview
8.2 Effects and advantages
8.3 Others
9. Example of spectrum detector
10. Other forms of laser apparatus
10.1 Configuration
10.2 Operation
10.3 Operation of master oscillator
10.4 Operation of power oscillator
10.5 Process of estimating life of consumables
11. Variations
12. Computer-readable medium on which program is recorded Embodiments of the present disclosure will be described below in detail with reference to the drawings. The embodiments described below show some examples of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Description of Terms

"Consumables" are used as a term comprehensively representing articles, such as parts or modules that require regular maintenance. Replacement parts and replacement modules are encompassed in the concept of the "consumables." The modules may each be taken as a form of a part. In the present specification, the term "consumable" is used in some cases as a term synonymous with "a replacement module or a replacement part." The maintenance includes replacement of a consumable. The concept of "replacement" includes not only replacing a consumable with a new one but cleaning or otherwise processing the consumables to maintain and/or restore the functionality of the part and relocating the same consumable.

"Burst running" means the running of a laser apparatus by alternately repeating a burst period for which narrowed-line pulsed laser light is continuously outputted in accordance with the exposure and an oscillation pause period for which the laser oscillation pauses in accordance with movement of a stage.

2. Description of Laser Apparatus

2.1 Configuration

FIG. 1 schematically shows the configuration of an exemplary laser apparatus. A laser apparatus 10 is, for example, a KrF excimer laser apparatus and includes a laser control section 90, a laser chamber 100, an inverter 102, an output coupling mirror 104, a line narrowing module (LNM) 106, a monitoring module 108, a charger 110, a pulse power module (PPM) 112, a gas supplier 114, a gas discharger 116, and an exit port shutter 118.

The laser chamber 100 includes a first window 121, a second window 122, a crossflow fan (CFF) 123, a motor 124, which rotates the CFF 123, a pair of electrodes 125 and 126, an electrical insulator 127, a pressure sensor 128, and a heat exchanger (not shown).

The inverter 102 is a supplier configured to supply the motor 124 with electric power. The inverter 102 is configured to receive a command signal that specifies the frequency of the electric power supplied to the motor 124 from the laser control section 90.

The PPM 112 is connected to the electrode 125 via feedthroughs in the electrical insulator 127 in the laser chamber 100. The PPM 112 includes a semiconductor switch 129 and the following components that are not shown: a charging capacitor; a pulse transformer; and a pulse compression circuit.

The output coupling mirror 104 is a partial reflection mirror and is so disposed as to form, along with the line narrowing module 106, an optical resonator. The laser chamber 100 is disposed in the optical path of the optical resonator.

The line narrowing module 106 includes a beam expander using a first prism 131 and a second prism 132, a rotary stage 134, and a grating 136. The first prism 131 and the second prism 132 are so arranged as to expand in the axis-Y direction the light beam having exited via the second window 122 of the laser chamber 100 and cause the expanded light beam to be incident on the grating 136.

The grating 136 is disposed in the Littrow arrangement, which causes the angle of incidence of the laser light incident on the grating 136 to be equal to the angle of diffraction of the laser light diffracted by the grating 136. The second prism 132 is so disposed on the rotary stage 134 that rotation of the rotary stage 134 changes the angle of incidence of the laser light incident on the grating 136 and the angle of diffraction of the laser light diffracted by the grating 136.

The monitoring module 108 includes a first beam splitter 141, a second beam splitter 142, a pulse energy detector 144, and a spectrum detector 146. The first beam splitter 141 is disposed in the optical path of the laser light having exited via the output coupling mirror 104 and so disposed that part of the laser light is reflected off the first beam splitter 141 and incident on the second beam splitter 142.

The pulse energy detector 144 is so disposed that the laser light having passed through the second beam splitter 142 enters the pulse energy detector 144. The pulse energy detector 144 may, for example, be a photodiode configured to measure the optical intensity of ultraviolet light. The second beam splitter 142 is so disposed that part of the laser light is reflected off the second beam splitter 142 and enters the spectrum detector 146.

The spectrum detector 146 is, for example, a monitor etalon measurement apparatus configured to cause an image sensor to measure interference fringes produced by an etalon. Based on the produced interference fringes, the center wavelength and the spectrum linewidth of the laser light are measured.

The gas supplier 114 in the case where a KrF excimer laser apparatus is employed is connected via pipes to an inert gas supply source 152, which is a source configured to supply an inert laser gas, and a halogen gas supply source 153, which is a source configured to supply a halogen-containing laser gas. The inert laser gas is the mixture of a Kr gas and an Ne gas. The halogen-containing laser gas is the mixture of an $F_2$ gas, a Kr gas, and an Ne gas. The gas supplier 114 is connected to the laser chamber 100 via a pipe.

The gas supplier 114 includes automatic valves and mass flow controllers that are not shown but are configured to supply the inert laser gas and the halogen-containing laser gas to the laser chamber 100 by predetermined amounts.

The gas discharger 116 is connected to the laser chamber 100 via a pipe. The gas discharger 116 includes a halogen filter and a discharge pump that are not shown but are configured to remove the halogen, and the gas discharger 116 is configured to discharge the laser gas from which the halogen has been removed out of the laser apparatus 10.

The exit port shutter 118 is disposed in the optical path of the laser light to be outputted from the laser apparatus 10.

The laser apparatus 10 is so disposed that the laser light outputted from the laser apparatus 10 via the exit port shutter 118 enters an exposure apparatus 14.

2.2 Operation

The operation of the laser apparatus 10 will be described. The laser control section 90 is configured to discharge the gases present in the laser chamber 100 via the gas discharger 116 and then fill the laser chamber 100 with the inert laser gas and the halogen-containing laser gas via the gas supplier 114 in such a way that a desired gas composition and total gas pressure are achieved.

The laser control section 90 is configured to rotate the motor 124 at a predetermined rotational speed via the inverter 102 to rotate the CFF 123. The laser gas thus flows through the space between the electrodes 125 and 126.

The laser control section 90 is configured to receive target pulse energy Et from an exposure control section 50 of the exposure apparatus 14 and transmit data on charging voltage Vhv, which allows the pulsed laser light to have the pulse energy Et, to the charger 110.

The charger 110 is configured to charge the charging capacitor in the PPM 112 at the charging voltage Vhv. When a light emission trigger signal Tr1 is outputted from the exposure apparatus 14, a trigger signal Tr2 is inputted from the laser control section 90 in synchronization with the light emission trigger signal Tr1 to the semiconductor switch 129 in the PPM 112. When the semiconductor switch 129 operates, a magnetic compression circuit in the PPM 112 compresses current pulses, and high voltage is applied to the space between the electrodes 125 and 126. As a result, discharge occurs between the electrodes 125 and 126, and the laser gas is excited in the discharge space.

When the state of the excited laser gas in the discharge space transitions to the ground state, excimer light is produced. The excimer light travels back and forth between the output coupling mirror 104 and the line narrowing module 106 and is therefore amplified, resulting in laser oscillation. As a result, the narrowed-line pulsed laser light is outputted via the output coupling mirror 104.

The pulsed laser light outputted via the output coupling mirror 104 enters the monitoring module 108. In the monitoring module 108, part of the laser light is sampled by the first beam splitter 141 and incident on the second beam splitter 142. The second beam splitter 142 transmits part of the laser light incident thereon, which enters the pulse energy detector 144, and reflects the remaining laser light, which enters the spectrum detector 146.

Pulse energy E of the pulsed laser light outputted from the laser apparatus 10 is measured with the pulse energy detector 144, and data on the measured pulse energy E is transmitted from the pulse energy detector 144 to the laser control section 90.

A center wavelength $\lambda$ and a spectrum linewidth $\Delta\lambda$ of the pulsed laser light are measured with the spectrum detector 146, and data on the measured center wavelength $\lambda$ and spectrum linewidth $\Delta\lambda$ are transmitted from the spectrum detector 146 to the laser control section 90.

The laser control section 90 is configured to receive data on the target pulse energy Et and a target wavelength $\lambda t$ from the exposure apparatus 14. The laser control section 90 is configured to perform pulse energy control based on the pulse energy E measured with the pulse energy detector 144 and the target pulse energy Et. The pulse energy control involves controlling the charging voltage Vhv in such a way that the difference $\Delta E = E - Et$ between the pulse energy E measured with the pulse energy detector 144 and the target pulse energy Et approaches zero.

The laser control section 90 is configured to perform wavelength control of the pulsed laser light based on the central wavelength $\lambda$ measured with the spectrum detector 146 and the target wavelength $\lambda t$. The wavelength control involves controlling the angle of rotation of the rotary stage 134 in such a way that the difference $\delta\lambda = \lambda - \lambda t$ between the central wavelength $\lambda$ measured with the spectrum detector 146 and the target wavelength $\lambda t$ approaches zero.

As described above, the laser control section 90 is configured to receive the target pulse energy Et and the target wavelength $\lambda t$ from the exposure apparatus 14 and cause the laser apparatus 10 to output, whenever the light emission trigger signal Tr1 is inputted to the laser control section 90, the pulsed laser light in synchronization with the light emission trigger signal Tr1.

When the laser apparatus 10 repeats the discharge, the electrodes 125 and 126 wear, resulting in consumption of the halogen gas in the laser gas and generation of impurity gases. A decrease in the concentration of the halogen gas and an increase in the impurity gases in the laser chamber 100 lower the pulse energy of the pulsed laser light and adversely affect the stability of the pulse energy. The laser control section 90 is configured to perform, for example, the following gas control to suppress the adverse effects described above.

[1] Halogen Injection Control

Halogen injection control is gas control in which the halogen gas consumed primarily by the discharge in the laser chamber 100 is replenished in the laser chamber 100 during the laser oscillation by injecting the halogen-containing gas to increase the concentration of the halogen gas in the laser chamber 100.

[2] Partial Gas Replacement Control

Partial gas replacement control is gas control in which part of the laser gas in the laser chamber 100 is replaced with a new laser gas during the laser oscillation so that increases in the concentrations of the impurity gases in the laser chamber 100 are suppressed.

[3] Gas Pressure Control

Gas pressure control is gas control in which the pulse energy of the pulsed laser light outputted from the laser apparatus 10 is controlled by injecting the laser gas into the laser chamber 100 to change gas pressure Pch of the laser gas against the decrease in the pulse energy. The pulse energy control is usually performed by controlling the charging voltage Vhv, but the gas pressure control is performed when the decrease in the pulse energy of the pulsed laser light outputted from the laser apparatus 10 cannot be compensated by controlling the charging voltage Vhv within a charging voltage control range.

The laser control section 90 is configured to control the gas discharger 116 to discharge the laser gas out of the laser chamber 100. The halogen gas is removed by the halogen filter, which is not shown, from the laser gas discharged from the laser chamber 100, and the resultant laser gas is discharged out of the laser apparatus 10.

The laser control section 90 is configured to transmit data on the number of oscillation pulses, the charging voltage Vhv, the gas pressure Pch in the laser chamber 100, the pulse energy E of the laser light, the spectrum linewidth $\Delta\lambda$, and other parameters to a laser apparatus management system 206 (see FIG. 2) via a local network that is not shown.

2.3 Maintenance of Primary Consumables of Laser Apparatus

Primary consumable replacement work performed by a field service engineer (FSE) is replacement work of the laser chamber 100, the line narrowing module 106, and the monitoring module 108.

In general, the timing when any of the primary consumables is replaced is not managed based on the length of time but is managed based on the number of oscillation pulses from the laser apparatus 10. The period required to replace the primary consumables described above takes from 3 to 10 hours in some cases. Among the primary consumables described above, the laser chamber 100 requires the longest replacement period.

2.4 Others

The example shown in FIG. 1 has been described with reference to the case where a KrF excimer laser apparatus is employed as the laser apparatus 10, but not necessarily, and another laser apparatus may be employed. For example, the laser apparatus 10 may be an ArF excimer laser apparatus or an XeCl excimer laser apparatus.

The example shown in FIG. 1 has been described with reference to the case where the gas control performed by the laser apparatus 10 includes the halogen injection control, the partial gas replacement control, and the gas pressure control, but not necessarily. For example, the gas pressure control may not necessarily be performed.

Figure 2:
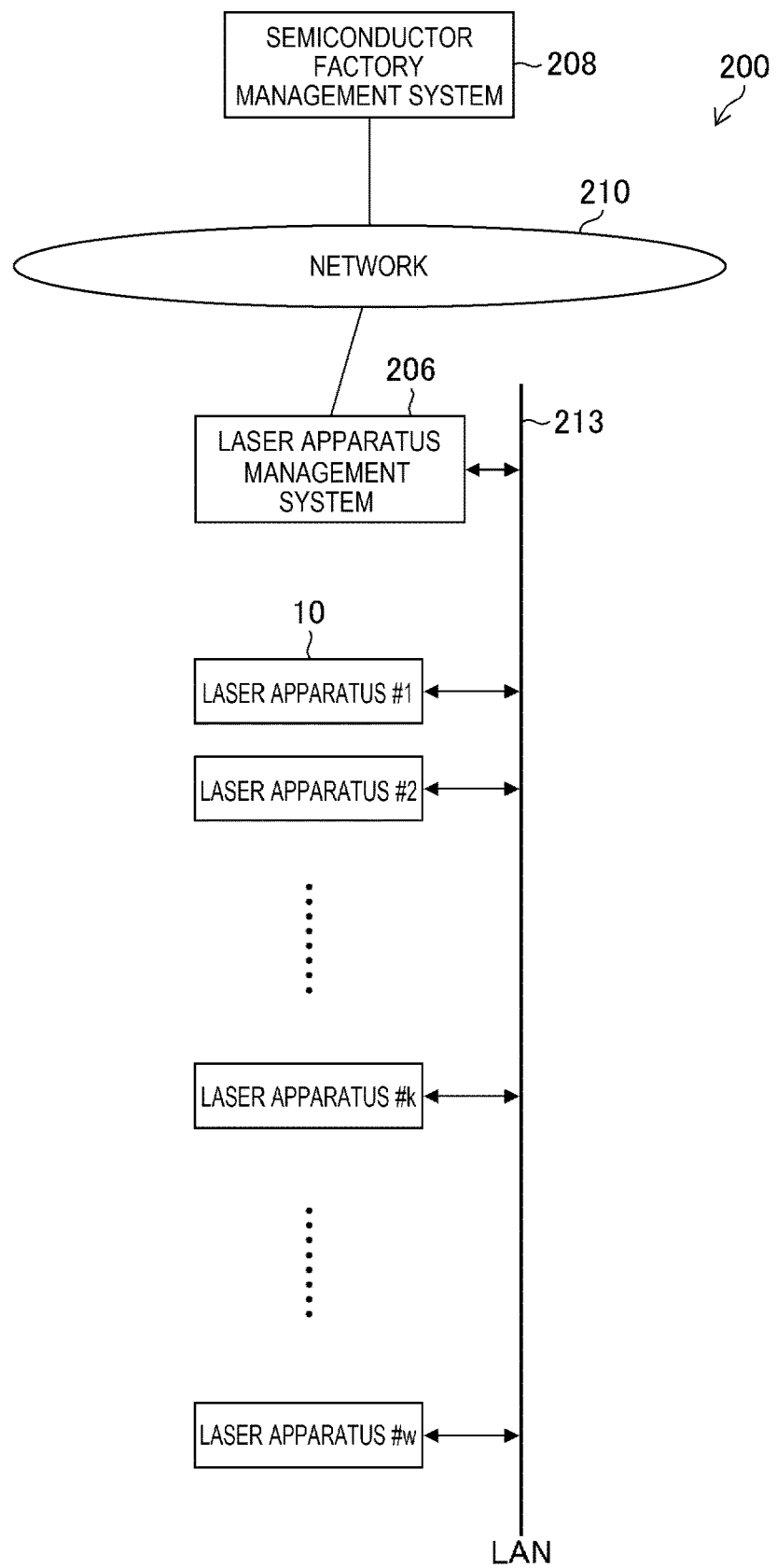
FIG. 2 schematically shows an example of the configuration of a laser management system in a semiconductor factory.

3. Example of Laser Management System in Semiconductor Factory 3.1 Configuration FIG. 2 schematically shows an example of the configuration of a laser management system in a semiconductor factory. A laser management system 200 includes a plurality of the laser apparatuses 10, the laser apparatus management system 206, and a semiconductor factory management system 208.

The laser apparatus management system 206 and the semiconductor factory management system 208 are each formed of a computer. The laser apparatus management system 206 and the semiconductor factory management system 208 may each be a computer system formed of a plurality of computers.

The semiconductor factory management system 208 is connected to the laser apparatus management system 206 via a network 210.

The network 210 is a communication line configured to allow information transmittance based on a wired and/or wireless configuration. The network 210 may be a wide area network or a local area network.

To identify each of the plurality of laser apparatuses 10, laser apparatus identification characters #1, #2, . . . #k, . . . #w are used below. Reference character w is the number of laser apparatuses provided in the laser management system 200 in the semiconductor factory. Reference character w is an integer greater than or equal to one. Reference character k is an integer greater than or equal to one but smaller than or equal to w. A laser apparatus having the laser apparatus identification character #k is hereinafter referred to as a laser apparatus #k for convenience of description. The laser apparatuses #1 to #w may have the same apparatus configuration, or part or all of the plurality of laser apparatuses #1 to #w may have forms different from one another.

The laser apparatuses #1 to #w and the laser apparatus management system 206 are each connected to a local area network 213. In FIG. 2, the local area network 213 is labeled as "LAN."

3.2 Operation

The laser apparatus management system 206 is configured to manage the timings when the primary consumables in each of the laser apparatuses #1 to #w are replaced based primarily on the number of pulses Np produced in the laser oscillation (number of oscillation pulses).

The laser apparatus management system 206 may display maintenance management information on a display terminal or transmit the maintenance management information to the semiconductor factory management system 208 via the network 210.

Management lines that manage the laser apparatuses #1 to #w via the laser apparatus management system 206 are independent of one another, and a manager of the semiconductor factory determines the timing when the primary consumables of each of the laser apparatuses #1 to #w are replaced based on the maintenance management information outputted from the laser apparatus.

Figure 3:
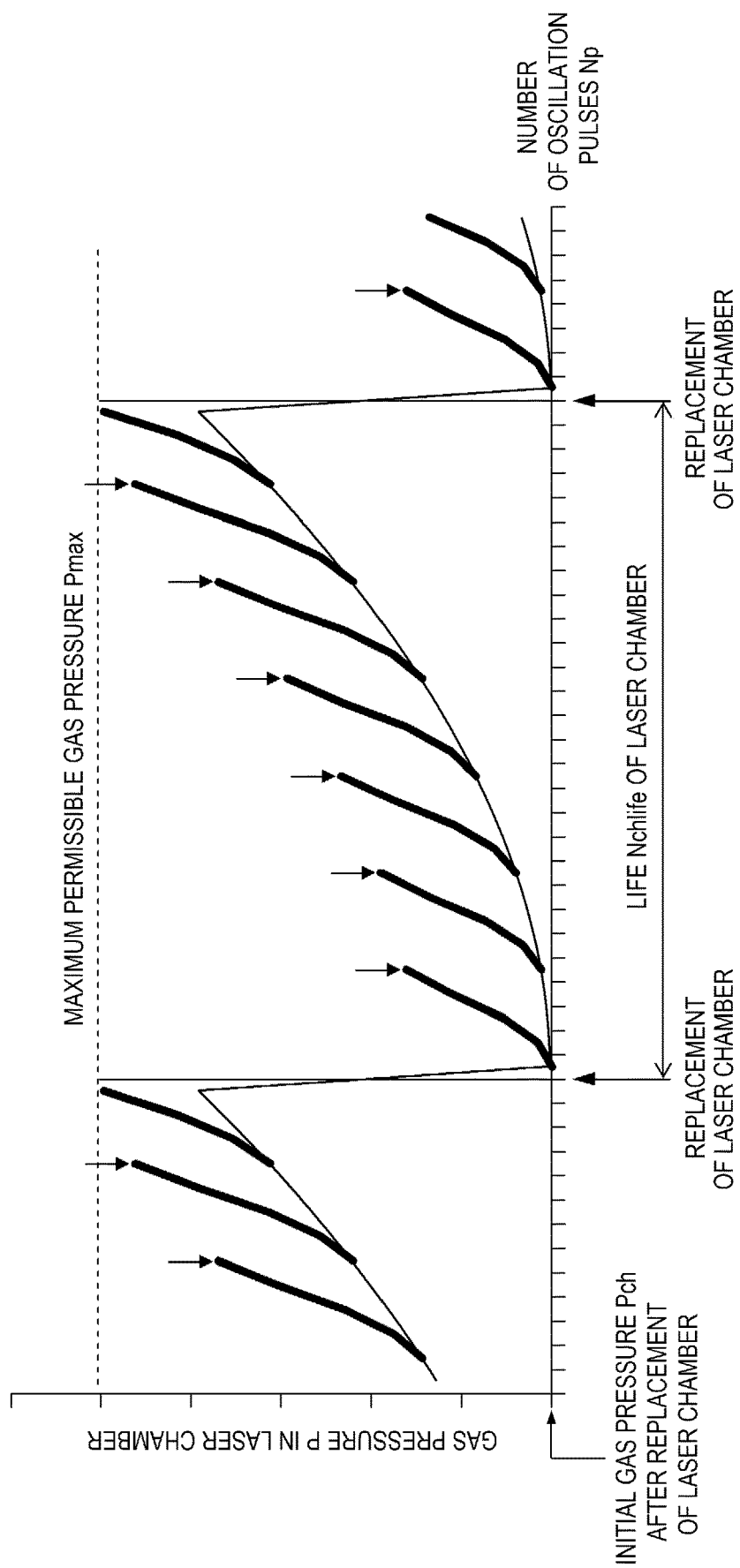
FIG. 3 shows graphs illustrating a typical relationship between the gas pressure in a laser chamber and the number of oscillation pulses.

FIG. 3 shows graphs illustrating a typical relationship between the gas pressure in the laser chamber and the number of oscillation pulses. When an excimer laser apparatus repeats the discharge, the electrodes wear, resulting in consumption of the halogen gas in the laser gas and generation of impurity gases. A decrease in the concentration of the halogen gas and an increase in the impurity gases in the laser chamber 100 lower the pulse energy of the pulsed laser light and adversely affect the stability of the pulse energy.

To maintain the performance of the excimer laser apparatus under the circumstances described above, the halogen injection control, the partial gas replacement control, the gas pressure control, or entire gas replacement is performed in accordance with the situation. In FIG. 3, the replacement timing of the laser chamber 100 is indicated by the upward arrows. The operation after the replacement of the laser chamber 100 is as follows.

[Step 1] A gas pressure P immediately after the replacement of the laser chamber 100 is the initial gas pressure Pch, at which the laser performance is maintained.

[Step 2] As the laser oscillation continues, the consumption of the discharge electrodes and the generation of the impurity gases cause the gas pressure control to increase the gas pressure to maintain the laser performance. The graphs each drawn with the thick line in FIG. 3 show the transition of the gas pressure in step 2.

[Step 3] However, when even the gas pressure control cannot eventually maintain the laser performance, the laser oscillation is stopped, and entire gas replacement is performed. In FIG. 3, the timing of the entire gas replacement is indicated by the downward arrows.

[Step 4] Adjustment oscillation is performed after the entire gas replacement. The gas pressure control is performed to restore laser performance. The gas pressure after the restoration of the laser performance is referred to as "initial gas pressure after the entire gas replacement" and is expressed by Pini.

[Step 5] Steps 2 to 4 are then repeated multiple times. The initial gas pressure Pini after the entire gas replacement gradually increases as the number of oscillation pulses increases. The graph drawn with the thin line in FIG. 3 shows the transition of the initial gas pressure Pini.

[Step 6] A laser chamber life Nchlife is eventually reached when the gas pressure P reaches a maximum permissible gas pressure Pmax.

In the example shown in FIG. 3, the sequence of events from the change in the gas pressure versus the number of oscillation pulses Np of the laser apparatus 10 to the end of the life of the laser chamber 100 has been described for the sake of simplicity. However, other types of laser performance, such as the spectral linewidth and the stability of the pulse energy, also need to meet certain specifications. The life of the laser chamber 100 cannot therefore be simply estimated in some cases.

4. Problems

[Problem 1] The number of oscillation pulses is used as one of indexes for inferring the life of each of the primary consumables of the laser apparatus. The number of oscillation pulses as a standard life is specified in some cases on a consumable basis. However, due to individual differences among consumables, the number of oscillation pulses that causes the end of the life to be reached is not fixed but varies. Even when the life of a consumable is longer than the standard life, the consumable is replaced in some cases as regular maintenance when the standard life is reached. When the life of the consumable is shorter than the standard life, the consumable cannot be replaced as planned, resulting in shutdown of the production line in some cases.

[Problem 2] At present, an FSE handles the replacement of each laser chamber by looking at data on a log of transition of the gas pressure versus the number of oscillation pulses, such as that shown in FIG. 3, and other parameters relating to the life of the laser chamber and empirically estimating the life. The same applies not only to the laser chamber but to other consumables, and the FSE empirically estimates the life based on the data on a log of the parameters relating to the life on a consumable basis. The estimation of the life of a consumable and the replacement of the consumable therefore depend on the ability of individual FSEs.

5. First Embodiment 5.1 Configuration

Figure 4:
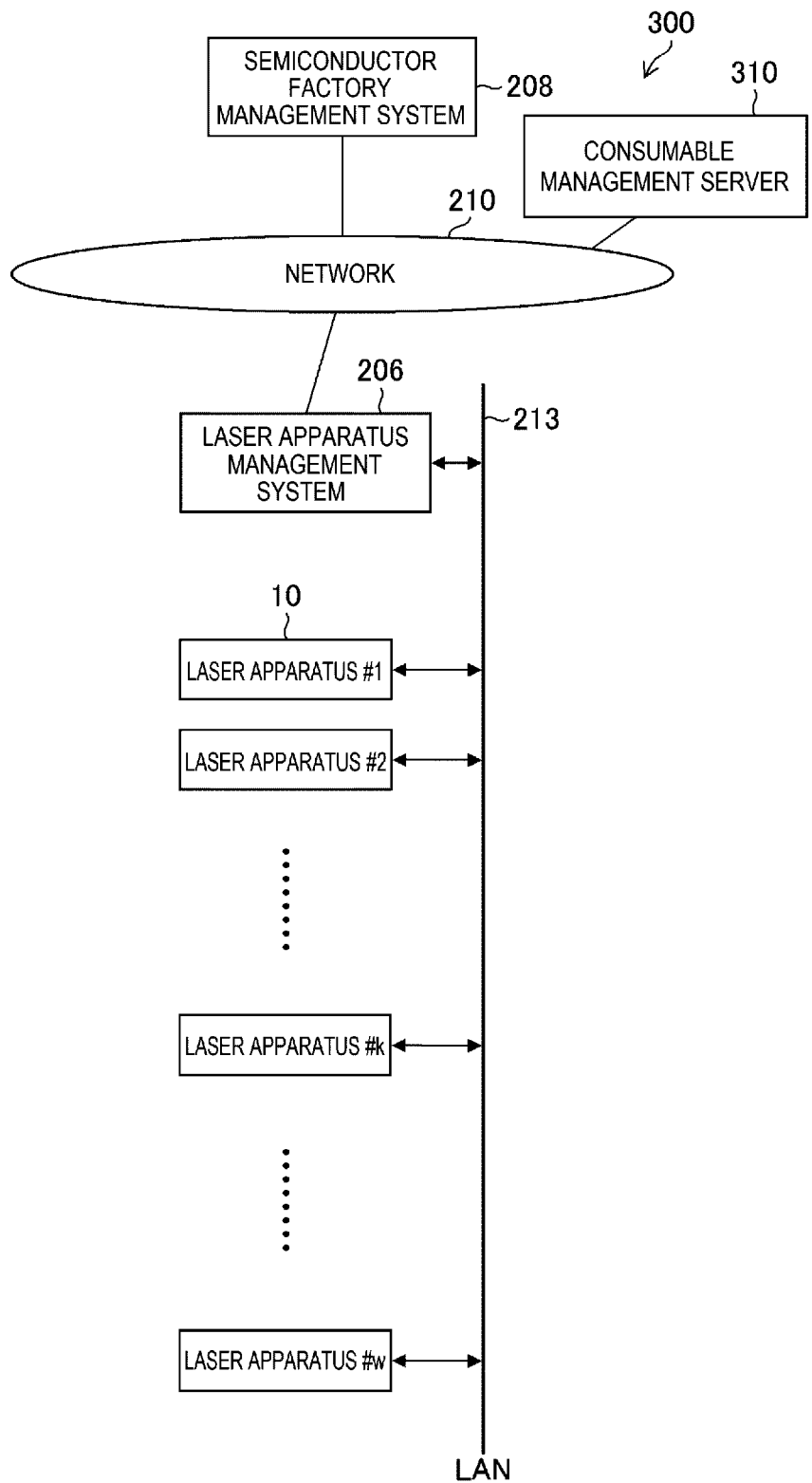
FIG. 4 shows the configuration of the laser management system in a semiconductor factory according to a first embodiment.

FIG. 4 shows the configuration of a laser management system 300 in a semiconductor factory according to a first embodiment. Differences from FIG. 2 will be described. The laser management system 300 in a semiconductor factory shown in FIG. 4 has a configuration in which a consumable management server 310 is added to the configuration of the laser management system 200 in FIG. 2. The consumable management server 310 is connected to the laser apparatus management system 206 and the semiconductor factory management system 208 via the network 210.

The consumable management server 310 has a configuration capable of transmitting and receiving data and signals to and from each of the laser apparatus management system 206 and the semiconductor factory management system 208.

Figure 5:
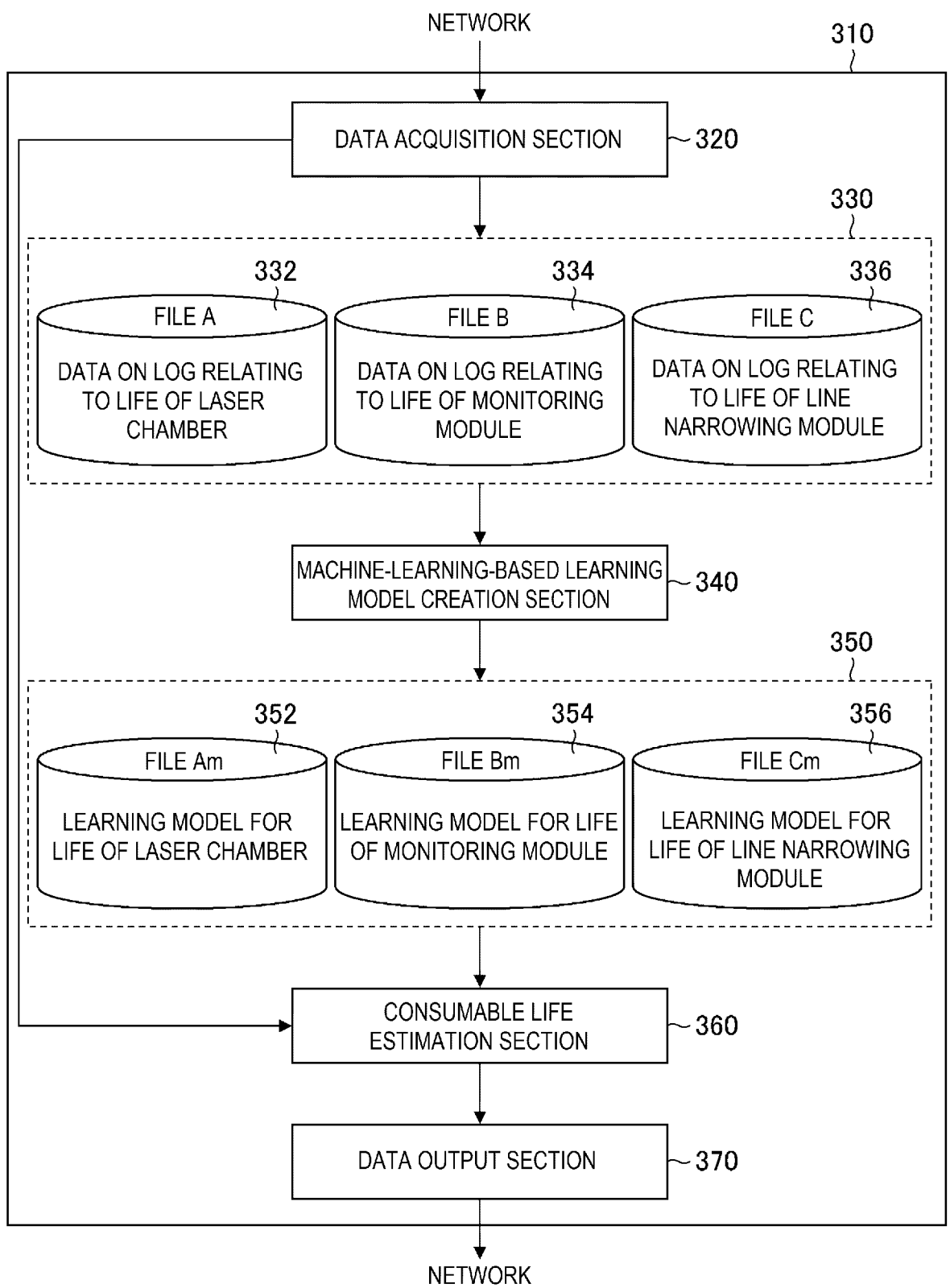
FIG. 5 is a block diagram showing the functions of a consumable management server.

FIG. 5 is a block diagram showing the functions of the consumable management server 310. The consumable management server 310 includes a data acquisition section 320, a consumable-life-related-information saving section 330, a machine-learning-based learning model creation section 340, a learning model saving section 350, a consumable life estimation section 360, and a data output section 370.

The consumable-life-related information includes a file A, a file B, and a file C. The file A is a file that saves data on a log relating to the life of the laser chamber 100. The file B is a file that saves data on a log relating to the life of the monitoring module 108. The file C is a file that saves data on a log relating to the life of the line narrowing module 106.

The consumable-life-related-information saving section 330 includes a storage section 332, which stores the file A, a storage section 334, which stores the file B, and a storage section 336, which stores the file C.

The learning model creation section 340 is a processing section configured to create a learning model based on machine learning. The consumable learning model saving section 350 is configured to save the learning model created by the learning model creation section 340. The consumable learning model saving section 350 includes a storage section 352, which stores a file Am, a storage section 354, which stores a file Bm, and a storage section 356, which stores a file Cm.

The file Am is a file that saves a first learning model for carrying out the process of estimating the life of the laser chamber 100. The file Bm is a file that saves a second learning model for carrying out the process of estimating the life of the monitoring module 108. The file Cm is a file that saves a third learning model for carrying out the process of estimating the life of the line narrowing module 106.

The storage sections 332, 334, 336, 352, 354, and 356 are each formed of a storage device, such as a hard disk apparatus and/or a semiconductor memory. The storage sections 332, 334, 336, 352, 354, and 356 may be configured by using separate storage devices or may be configured as part of a storage area in one or more storage devices.

In the present disclosure, the laser control section 90, the exposure control section 50, the laser apparatus management system 206, the semiconductor factory management system 208, and the consumable management server 310 can be achieved by the combination of hardware formed of one or more computers and software. The software is synonymous with a program.

The computer can be formed of a CPU (central processing unit) and a memory. A programmable controller is encompassed in the concept of a computer. The computer may include a GPU (graphics processing unit). The CPU or the GPU provided in the computer is an example of a processor.

Instead, part or all of the functions of the variety of control apparatuses and processing apparatuses, such as the laser control section 90, the exposure control section 50, the laser apparatus management system 206, the semiconductor factory management system 208, and the consumable management server 310, may be achieved by using an integrated circuit represented by an FPGA (field programmable gate array) and an ASIC (application specific integrated circuit).

The functions of the plurality of control apparatuses and processing apparatuses can instead be achieved by a single apparatus. Further, in the present disclosure, the plurality of control apparatuses and processing apparatuses may be connected to each other via a communication network, such as a local area network and the Internet line. In a distributed computing environment, a program unit may be saved both in local and remote memory storage devices.

5.2 Operation 5.2.1 Overview of Machine Learning Operation in Consumable Management Server The consumable management server 310 shown in FIG. 5 has the function of performing machine learning for creating a learning model used to estimate the life of a consumable of the laser apparatus 10 and the function of estimating the life of the consumable by using the created learning model. The consumable management server 310 is an example of the "consumable management apparatus" in the present disclosure. A machine learning method for creating a learning model used to estimate the life of a consumable in the consumable management server 310 will first be described.

When any of the consumables are replaced in each laser apparatus 10, the data acquisition section 320 is configured to acquire, from the laser apparatus management system 206, life-related information including all data on the life-related parameters continuously recorded in association with the number of oscillation pulses over the entire period for which the replaced consumable was used. The data acquisition section 320 is configured to write the data acquired from the laser apparatus management system 206 to the consumable-life-related-information saving section 330.

The data acquisition section 320 is configured to identify the file to which the data is written in accordance with the type of the replaced consumable and writes the data to the identified file. When the replaced consumable is the laser chamber 100, the data acquisition section 320 is configured to write, to the file A, life-related log data that is the information relating to the life of the laser chamber 100. When the replaced consumable is the monitoring module 108, the data acquisition section 320 is configured to write, to the file B, life-related log data on the information relating to the life of the monitoring module 108. When the replaced consumable is the line narrowing module 106, the data acquisition section 320 is configured to write, to the file C, life-related log data that is the information relating to the life of the line narrowing module 106. The log data written to each of the file A, the file B, and the file C is an example of the "first life-related information" in the present disclosure.

The data acquisition section 320 is an example of the "information acquisition section" in the present disclosure.

When the consumable-life-related-information saving section 330 saves data on new information relating to the life of the replaced consumable, the learning model creation section 340 is configured to acquire the data on the newly saved life-related information. The learning model creation section 340 is configured to call a learning model corresponding to the replaced consumable from the consumable learning model saving section 350.

For example, when the replaced consumable is the laser chamber 100, the learning model creation section 340 is configured to call the file Am. When the replaced consumable is the monitoring module 108, the learning model creation section 340 is configured to call the file Bm. When the replaced consumable is the line narrowing module 106, the learning model creation section 340 is configured to call the file Cm.

The learning model creation section 340 is configured to perform machine learning based on the data on the life-related parameters recorded during the period from the start of use of the replaced consumable to the replacement thereof to create a new learning model. A specific content of the machine learning method will be described later. The new learning model created by the learning model creation section 340 is saved in the consumable learning model saving section 350. When a new learning model is created by performing machine learning, the file in the learning model saving section 350 is updated, and the latest learning model file is written to the learning model saving section 350.

5.2.2 Overview of Operation of Estimating Life of Consumable in Consumable Management Server The operation of estimating the life of a consumable in the consumable management server 310 will next be described. The data acquisition section 320 can receive a request signal that requests the process of estimating the life of the consumable to be replaced from an external apparatus. The external apparatus may, for example, be the semiconductor factory management system 208 or a terminal apparatus that is not shown. The "consumable to be replaced" is a consumable which is currently incorporated and being used in the laser apparatus 10 and which is a candidate to be examined to see whether it will be replaced in the future.

Having received the request for the process of estimating the life of the consumable to be replaced, the data acquisition section 320 is configured to acquire, from the laser apparatus management system 206, the data on the current information relating to the life of the consumable to be replaced and data on the planned number of oscillation pulses per day Nday.

The data acquisition section 320 is configured to transmit the data on the current information relating to the life of the consumable to be replaced and the data on the planned number of oscillation pulses per day Nday to the consumable life estimation section 360.

The consumable life estimation section 360 is configured to acquire the data on the current information relating to the life of the consumable to be replaced and the data on the planned number of oscillation pulses per day Nday and call, from the consumable learning model saving section 350, a learning model corresponding to the consumable to be replaced.

The consumable life estimation section 360 may be configured to identify the type of the consumable to be replaced and identify the relevant consumable file, and read the identified file from the consumable learning model saving section 350. For example, when the consumable to be replaced is the laser chamber 100, the consumable life estimation section 360 is configured to read the file Am from the consumable learning model saving section 350. When the consumable to be replaced is the monitoring module 108, the consumable life estimation section 360 is configured to read the file Bm from the consumable learning model saving section 350. When the consumable to be replaced is the line narrowing module 106, the consumable life estimation section 360 is configured to read the file Cm from the consumable learning model saving section 350.

The consumable life estimation section 360 is configured to estimate the life of the consumable by using the learning model based on the data on the current life-related information.

The consumable life estimation section 360 is configured to calculate data on an estimated life Nlife of the consumable to be replaced and the number of oscillation pulses in a remaining life Nre thereof and data on a recommended maintenance date Drec when the consumable is replaced and transmit the calculated data to the data output section 370.

The recommended maintenance date Drec can be calculated, for example, by using the expression below.

$$Drec = Dpre + Nre/Nday$$

where Dpre is the date when the current data relating to the life of the consumable is acquired.

The data output section 370 is configured to transmit the data on the estimated life Nlife of the consumable to be replaced and the number of oscillation pulses in the remaining life Nre thereof and the data representing the recommended maintenance date Drec when the consumable is replaced to the laser apparatus management system 206 via the network 210. The data output section 370 is an example of the "information output section" in the present disclosure.

The laser apparatus management system 206 may be configured to notify the semiconductor factory management system 208, an operator, or a field service engineer of the information on the estimated life Nlife of the consumable to be replaced, the number of oscillation pulses in the remaining life Nre thereof, and the recommended maintenance date Drec when the consumable is replaced in the form of displayed information or e-mail message.

The notification may be made from the laser apparatus consumable management server 310 to the semiconductor factory management system 208, the operator, or the field service engineer via the network 210 in the form of displayed information or e-mail message.

5.2.3 Example of Processes Carried Out by Data Acquisition Section

Figure 6:
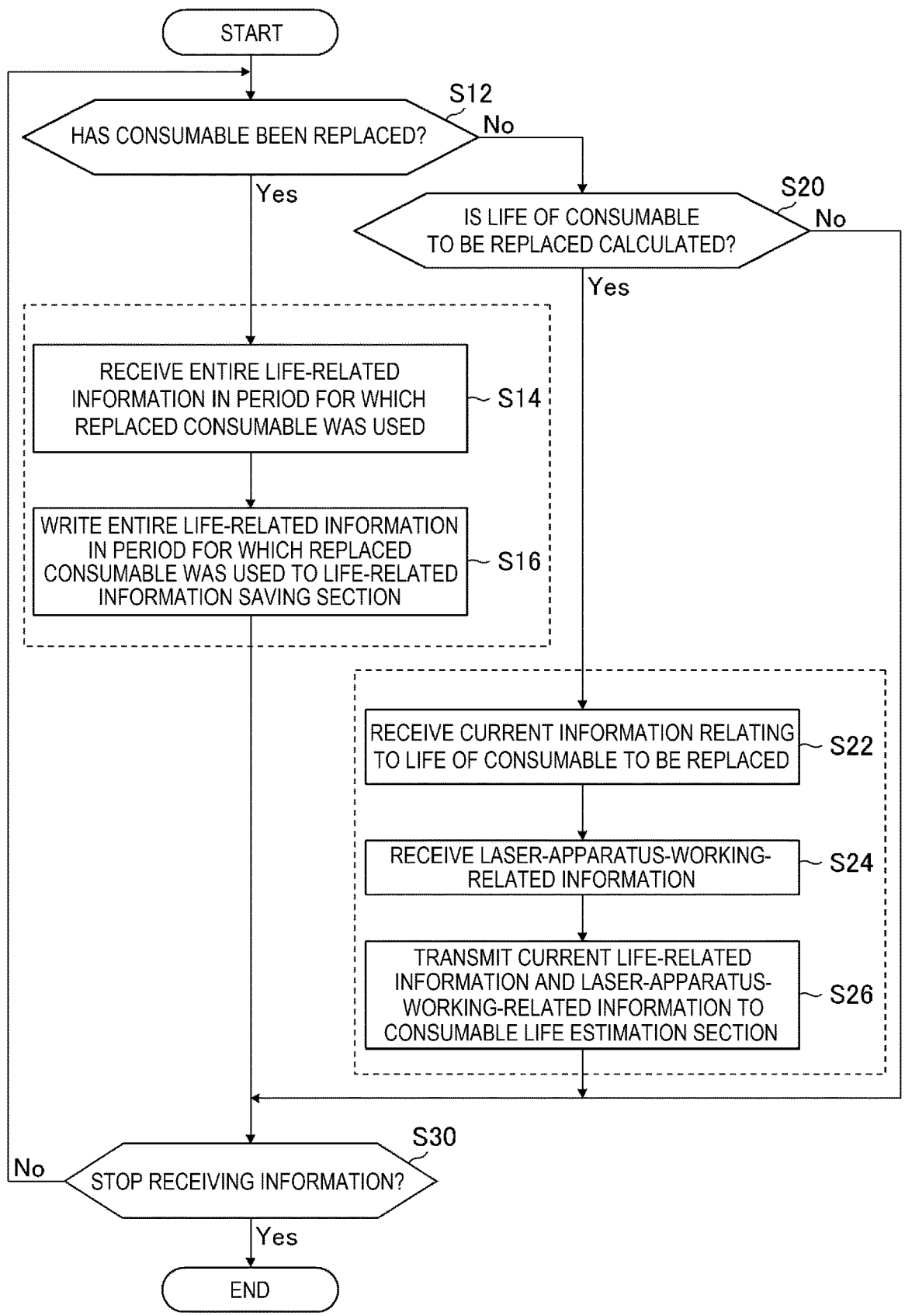
FIG. 6 is a flowchart showing an example of the contents of processes carried out by a data acquisition section.

FIG. 6 is a flowchart showing an example of the contents of processes carried out by the data acquisition section 320. The processes and operation shown in the flowchart of FIG. 6 are achieved when a processor configured to function as the data acquisition section 320 executes a program.

In step S12, the data acquisition section 320 is configured to evaluate whether or not a consumable has been replaced. When the result of the evaluation in step S12 is Yes, the data acquisition section 320 proceeds to step S14. Steps S14 and S16 are a process procedure of creating a learning model.

In step S14, the data acquisition section 320 is configured to receive entire life-related information during the period for which the replaced consumable was used. That is, when the consumable of the laser apparatus is replaced, the data acquisition section 320 is configured to receive the entire life-related information during the period for which the replaced consumable was used from the laser apparatus management system 206.

Next, in step S16, the data acquisition section 320 is configured to write the entire life-related information during the period for which the replaced consumable was used to the life-related information saving section 330. That is, the data acquisition section 320 is configured to write the data to the file corresponding to the replaced consumable. In this process, the replaced consumable is the laser chamber 100, the monitoring module 108, or the line narrowing module 106, and the data acquisition section 320 is configured to write the data to the file A, the file B, or the file C in accordance with the type of the consumable.

After step S16, the data acquisition section 320 proceeds to step S30. In step S30, the data acquisition section 320 is configured to evaluate whether or not to stop receiving the information. When the result of the evaluation in step S30 is No, the data acquisition section 320 returns to step S12.

When the result of the evaluation in step S12 is No, the data acquisition section 320 proceeds to step S20. In step S20, the data acquisition section 320 is configured to evaluate whether or not the life of the consumable to be replaced is calculated. For example, when a user inputs via an input apparatus (not shown) a request for estimation of the life of the consumable to be replaced, the result of the evaluation in step S20 is Yes.

When the result of the evaluation in step S20 is Yes, the data acquisition section 320 proceeds to step S22. Steps S22, S24, and S26 are a process procedure of calculating an estimated life of the consumable to be replaced. Calculating an expected life of the consumable means estimating the life of the consumable.

In step S22, the data acquisition section 320 is configured to receive the current information relating to the life of the consumable to be replaced from the laser apparatus management system 206.

In step S24, the data acquisition section 320 is configured to receive laser-apparatus-working-related information from the laser apparatus management system 206. The laser-apparatus-working-related information is the planned number of oscillation pulses per day Nday. Specifically, the laser-apparatus-working-related information may be the planned number of oscillation pulses per day that is derived from past working data. Instead, future working plan information may be acquired from the semiconductor factory management system 208, and the planned number of oscillation pulses per day may be calculated based on the acquired information.

Thereafter, in step S26, the data acquisition section 320 is configured to transmit the current life-related information and the laser-apparatus-working-related information to the consumable life estimation section 360.

After step S26, the data acquisition section 320 proceeds to step S30. When the result of the evaluation in step S20 is No, the data acquisition section 320 skips steps S22 to S26 and proceeds to step S30.

When the result of the evaluation in step S30 is Yes, the data acquisition section 320 terminates the flowchart of FIG. 6.

5.2.4 Example of Processes Carried Out by Learning Model Creation Section

Figure 7:
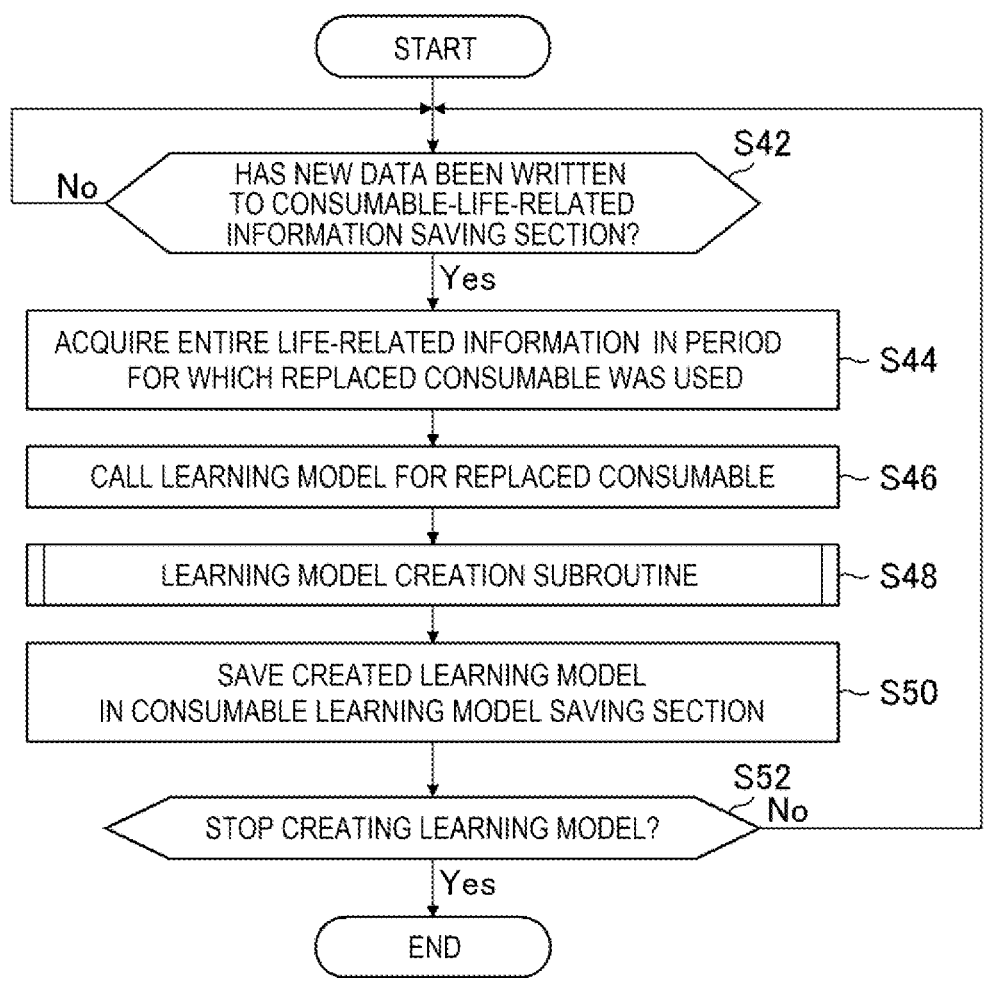
FIG. 7 is a flowchart showing an example of the contents of processes carried out by a learning model creation section.

FIG. 7 is a flowchart showing an example of the contents of processes carried out by the learning model creation section 340. The processes and operation shown in the flowchart of FIG. 7 are achieved when a processor configured to function as the learning model creation section 340 executes a program.

In step S42, the learning model creation section 340 is configured to evaluate whether or not new data has been written to the consumable-life-related information saving section 330. If the result of the evaluation in step S42 is No, the learning model creation section 340 repeats step S42. When the result of the evaluation in step S42 is Yes, the learning model creation section 340 proceeds to step S44.

In step S44, the learning model creation section 340 is configured to acquire the entire life-related information during the period for which the replaced consumable was used. The learning model creation section 340 is configured to acquire the data written to the file (file A, file B, or file C) corresponding to the replaced consumable (laser chamber 100, monitoring module 108, or line narrowing module 106).

In step S46, the learning model creation section 340 is configured to call the learning model for the replaced consumable. That is, the learning model creation section 340 is configured to call the learning model saved in the file (file Am, file Bm, or file Cm) corresponding to the replaced consumable.

In step S48, the learning model creation section 340 is configured to carry out processes in a learning model creation subroutine. The learning model creation section 340 is configured to perform machine learning based on the learning model corresponding to the replaced consumable and the life-related information to create a new learning model.

In step S50, the learning model creation section 340 is configured to save the newly created learning model in the consumable learning model saving section 350. The learning model creation section 340 is configured to save the newly created learning model in the file (file Am, file Bm, or file Cm) corresponding to the replaced consumable. The latest learning model is saved in the learning model saving section 350 so that the new learning model is used from the next time.

In step S52, the learning model creation section 340 is configured to evaluate whether or not to stop creating a learning model. When the result of the evaluation in step S52 is No, the learning model creation section 340 returns to step S42 and repeats steps S42 to S52. When the result of the evaluation in step S52 is Yes, the learning model creation section 340 terminates the flowchart of FIG. 7.

In the flowchart of FIG. 7, to create a learning model for each consumable for the first time, the parameters in an initial learning model saved in the learning model saving section 350 may be set at arbitrary values before the learning. By performing machine learning, which will be described later, the parameters in a learning model are changed to appropriate values, whereby a learning model having acquired the function of estimating the life of each consumable is created.

The initial learning model may, of course, be a provisional learning model created by performing in advance the same method as the machine learning method in the present embodiment so that the weight parameters are adjusted to some extent.

Figure 8:
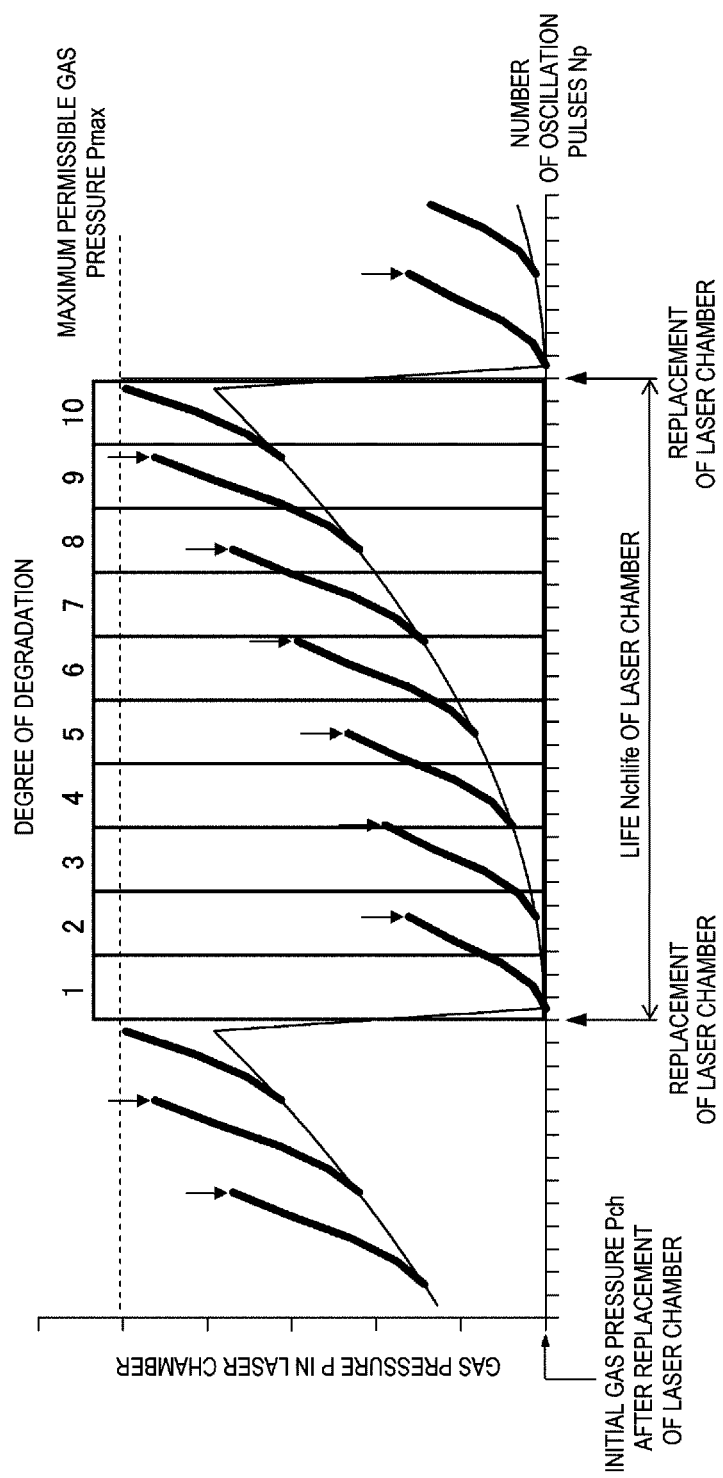
FIG. 8 shows graphs illustrating an example of data on life-related information representing the relationship between the number of oscillation pulses Np and gas pressure P in the laser chamber.

5.2.5 Example of Creation of Learning Model Used to Estimate Life of Laser Chamber An example of creation of a learning model used to estimate the life of the laser chamber 100 will be described below. FIG. 8 is an example of data on the life-related information representing the relationship between the number of oscillation pulses Np and the gas pressure P in the laser chamber 100. The period of one cycle from the start of use of a consumable to the replacement thereof is defined as the life of the consumable, and the degree of degradation of the consumable is defined stepwise within the life. FIG. 8 shows an example of the definition of the degree of degradation based on the number of oscillation pulses in the life of the laser chamber 100. In FIG. 8, levels representing the degree of degradation are defined in ten stages from the viewpoint of the number of oscillation pulses as an example of the life-related information. That is, in the example shown in FIG. 8, data on a log of the number of oscillation pulses in the entire period of one cycle from the start of use of the laser chamber 100 to the replacement thereof (example of entire life-related information) is divided into ten ranging from a degradation degree of one to a degradation degree of ten, and a set of data that associate the number of oscillation pulses with the degree of degradation are created.

The thus created data that associate the number of oscillation pulses with the degradation degree are used as training data for the machine learning. The training data is synonymous with the learning data. That is, data on the life-related parameters is data inputted to a learning model, and the levels representing the degree of degradation correspond to correct answer labels (teacher data) for the input. The learning model creation section 340 is configured to perform machine learning by using the created supervised data to create a learning model that outputs an estimated degree of degradation (estimated life) with respect to the input of the number of oscillation pulses. The definition of the degree of degradation in ten stages has been presented above by way of example, and the number of stages of the degree of degradation is not limited to ten and may be two or more stages as appropriate.

In addition to the laser chamber 100, the same thing applies to other consumables, such as the monitoring module 108 and the line narrowing module 106, that is, data on the life-related information in the entire period of one cycle from the start of use of each consumable to the replacement thereof is divided into levels of degradation in the form of a plurality of stages, and training data that associate the data on the life-related parameters with the levels representing the degree of degradation are created.

The training data are then used to perform machine learning to create a learning model on a consumable type basis.

Figure 9:
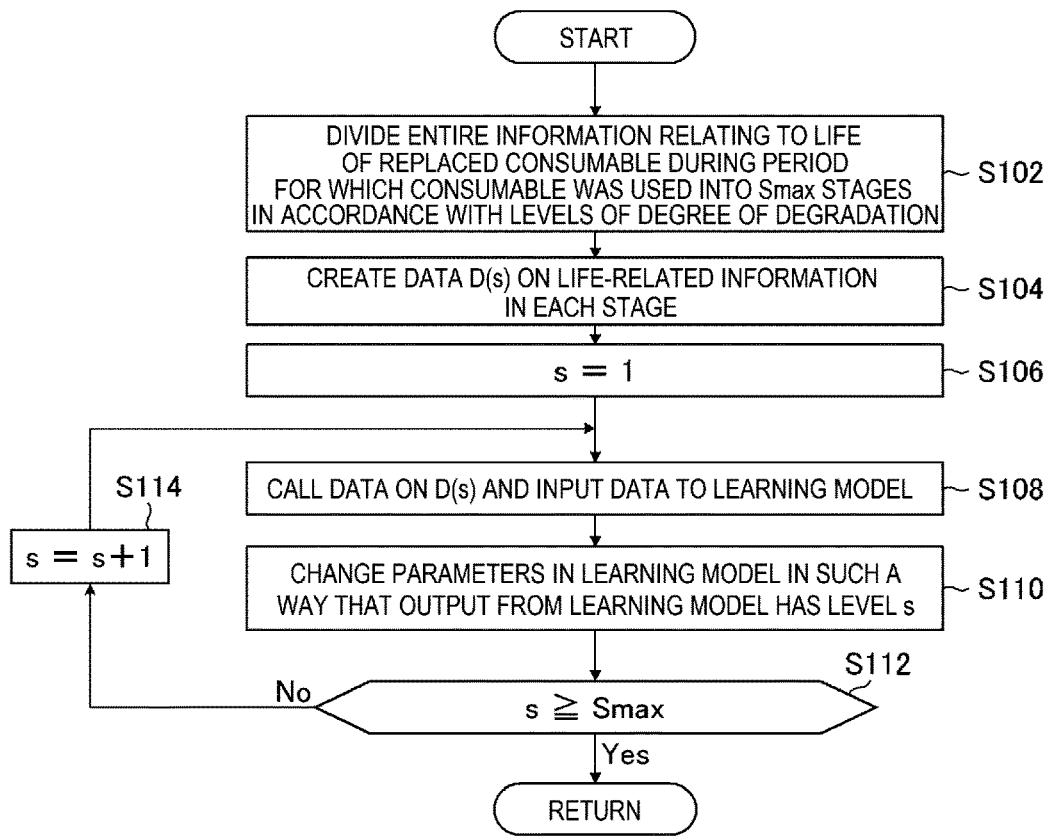
FIG. 9 is a flowchart showing an example of the contents of processes in step S48 in FIG. 7.

FIG. 9 is a flowchart showing an example of the contents of processes in step S48 in FIG. 7. That is, FIG. 9 shows an example of the learning model creation subroutine.

In step S102 in FIG. 9, the learning model creation section 340 is configured to divide the entire information relating to the life of the replaced consumable and during the period for which the consumable was used into Smax stages in accordance with the levels of degradation. Smax may be equal to, for example, ten, as shown in FIG. 8 by way of example.

In step S104 in FIG. 9, the learning model creation section 340 is configured to create data D(s) on the life-related information in each of the Smax divided stages. The symbol s is an integer representing the level of the degree of degradation. The symbol s can be a value ranging from 1 to Smax. In the example shown in FIG. 8, the data D(s) on the life-related information in each of the ten divided stages of the number of oscillation pulses in the laser chamber 100 is created. For example, data corresponding to the average of the number of oscillation pulses in each of the stages in the consumable may be D(s).

Next, in step S106, the learning model creation section 340 is configured to set the value of the variable s representing the level of the degree of degradation at an initial value of "1". Thereafter, in step S108, the learning model creation section 340 is configured to input data on D(s) to the learning model called in step S46 in FIG. 7.

Next, in step S110 in FIG. 9, the learning model creation section 340 is configured to change the parameters in the learning model in such a way that the output from the learning model for the input of the data D(s) has the level s.

The learning model may, for example, be a neural network model. The learning model creation section 340 is configured to change the parameters in the learning model based on machine learning using supervised data to create a new learning model.

In step S112, the learning model creation section 340 is configured to evaluate whether or not the variable s is greater than or equal to Smax. When the result of the evaluation in step S112 is No, the learning model creation section 340 proceeds to step S114, increments the value of the variable s, and returns to step S108. When the result of the evaluation in step S112 is Yes, the learning model creation section 340 terminates the flowchart of FIG. 9 and returns to the flowchart of FIG. 7. That is, when the result of the evaluation in step S112 is Yes, the learning model is updated to a new learning model that reflects the result of the latest replaced consumable.

The learning model creation section 340 is an example of the "training data creation section" and the "learning model creation section" in the present disclosure.

5.2.6 Example of Neural Network Model

Figure 10:
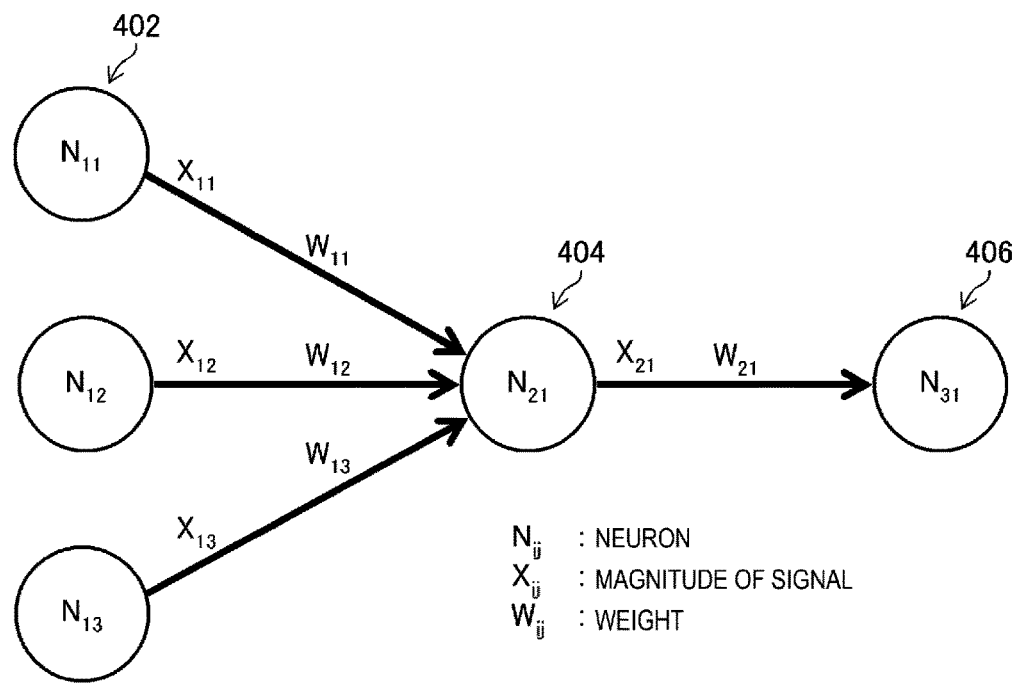
FIG. 10 is a diagrammatic view showing an example of a neural network model.

FIG. 10 is a diagrammatic view showing an example of a neural network model. In FIG. 10, each circle represents a neuron, and a straight line with an arrow represents a signal flow. FIG. 10 shows neurons $N_{11}$, $N_{12}$, and $N_{13}$ in an input layer 402, a neuron $N_{21}$ in a hidden layer 404, and a neuron $N_{31}$ in an output layer 406 sequentially located from the left. Let i be the number of a layer that forms the neural network having a layered structure, and let j be the number of a neuron. Further, the magnitude of a signal outputted from a neuron $N_{ij}$ is called $X_{ij}$, and the signal having the magnitude $X_{ij}$ is called a signal $X_{ij}$. Let $W_{ij}$ be the weight of the bond between a neuron in a layer i and a neuron in a layer (i+1).

The neurons $N_{11}$, $N_{12}$, and $N_{13}$ in the input layer 402 output signals having magnitudes $X_{11}$, $X_{12}$, and $X_{13}$, respectively. The neuron $N_{21}$ in the hidden layer 404 outputs a signal $X_{21}$ when a weighted signal sum of the inputted signals $X_{11}$, $X_{12}$, and $X_{13}$ ($W_{11} \times X_{11} + W_{12} \times X_{12} + W_{13} \times X_{13}$) is greater than a threshold. Let $b_{21}$ be the threshold, and the neuron $N_{21}$ outputs the signal $X_{21}$ when $W_{11} \times X_{11} + W_{12} \times X_{12} + W_{13} \times X_{13} - b_{21} > 0$ is satisfied. The symbol "$-b_{21}$" is called a bias of the neuron $N_{21}$.

Parameters in the neural network model include the weight of the bond between neurons and the bias.

5.2.7 Learning Mode of Neural Network Model

Figure 11:
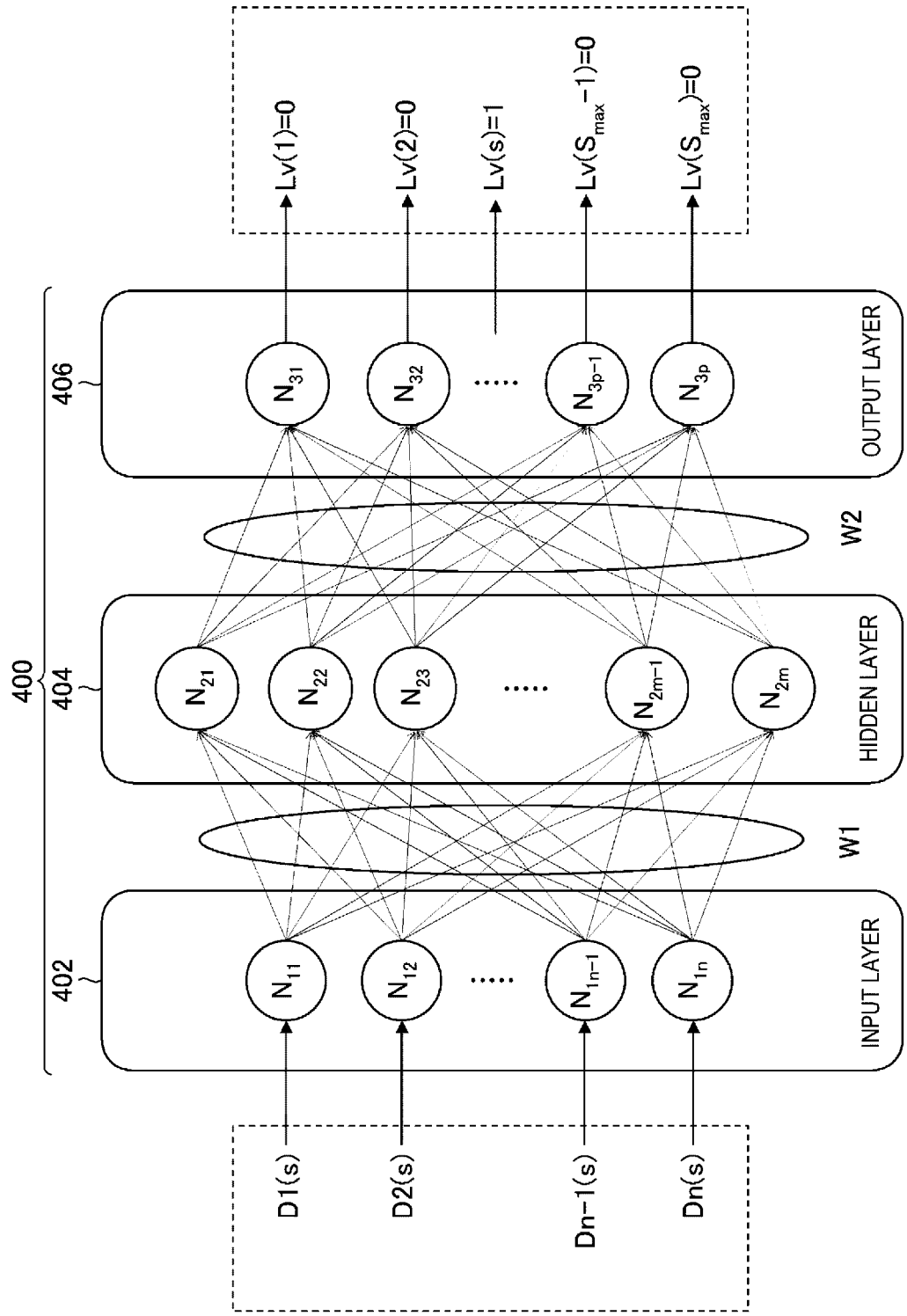
FIG. 11 is an example of the neural network model to create a learning model.

FIG. 11 is an example of the neural network model to create a learning model. A neural network model 400 includes the input layer 402, the hidden layer 404, and the output layer 406.

The input layer 402 includes n neurons $N_{11}$ to $N_{1n}$, and log data having the degree of degradation s in the information relating to the life of the replaced consumable are inputted to the neurons $N_{11}$ to $N_{1n}$.

The hidden layer 404 includes m neurons $N_{21}$ to $N_{2m}$, and signals outputted from the neurons $N_{11}$ to $N_{1n}$ in the input layer 402 are inputted to each of the neurons in the hidden layer 404. A weight parameter $W_1$ that varies among the input signals can be set. The different weight parameters $W_1$ are collectively referred to as a "weight parameter W1" for the signals inputted to the neurons $N_{21}$ to $N_{2m}$ in the hidden layer 404.

The output layer 406 includes p neurons $N_{31}$ to $N_{3p}$, and signals outputted from the neurons $N_{21}$ to $N_{2m}$ in the hidden layer 404 are inputted to each of the neurons in the output layer 406. The number p of neurons in the output layer 406 may be equal to the number of stages (Smax) of the levels of the degree of degradation. A weight parameter W2 that varies among the input signals can be set. The different weight parameters W2 are collectively referred to as a "weight parameter W2" for the signals inputted to the neurons $N_{31}$ to $N_{3p}$ in the output layer 406.

The neurons $N_{31}$ to $N_{3p}$ in the output layer 406 output probabilities of the degrees of degradation Lv(1) via Lv(s) to Lv(Smax). The probability of the degree of degradation means a score representing the likelihood corresponding to the level of any of the degrees of degradation.

When the degree of degradation s is defined in the Smax stages from 1 to Smax, the information relating to the life of the replaced consumable (log data) D1(s), D2(s) Dn(s) are inputted to the input layer 402.

The inter-neuron weight and bias are so adjusted that the probability of the output from the output layer 406 being Lv(s) approaches one for the input of each of the degrees of degradation s and the probabilities for the other degrees of degradation approach zero.

As described above, a learning model is created by the supervised machine learning.

5.2.8 Example of Processes Carried Out by Consumable Life Estimation Section

Figure 12:
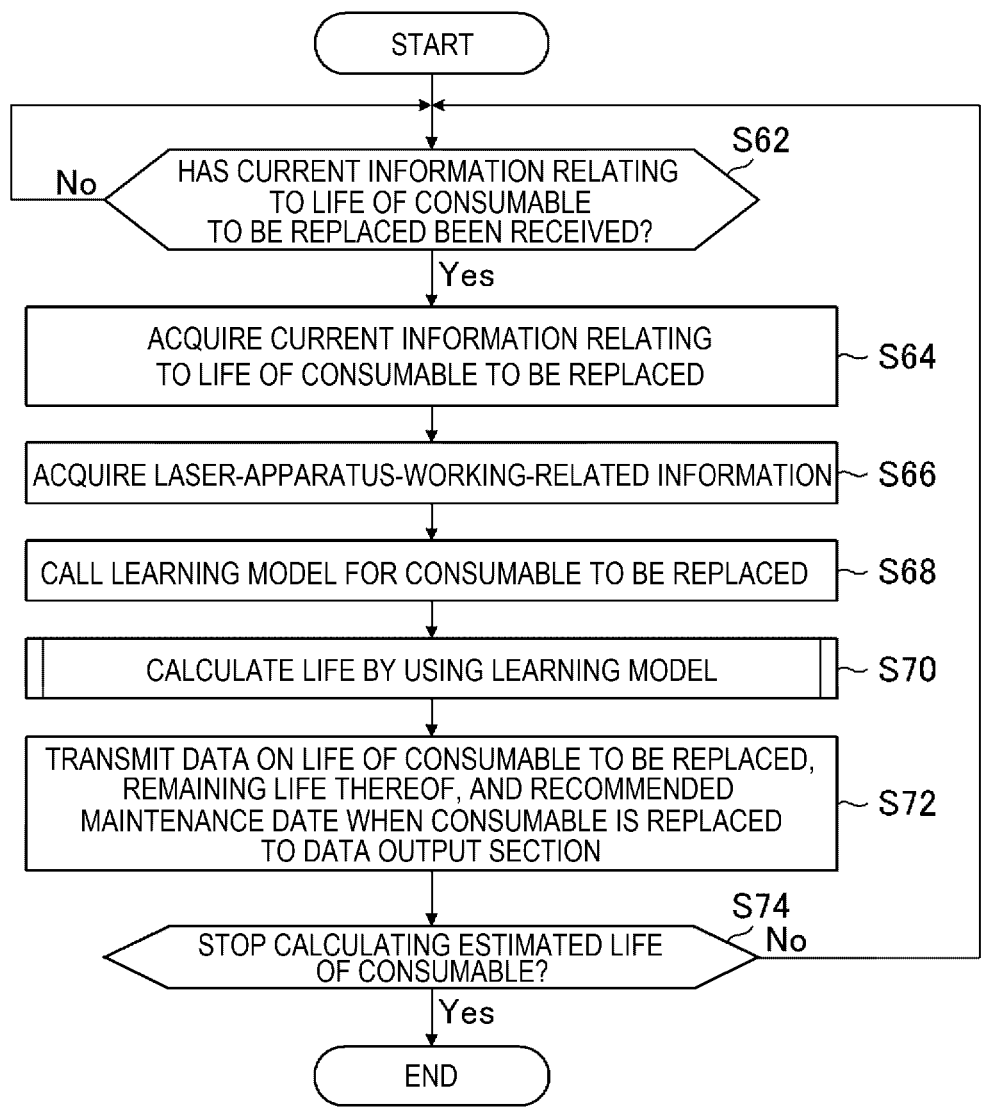
FIG. 12 is a flowchart showing an example of the contents of processes carried out by a consumable life estimation section.

FIG. 12 is a flowchart showing an example of the contents of processes carried out by the consumable life estimation section 360. The processes and operation shown in the flowchart of FIG. 12 are achieved when a processor configured to function as the consumable life estimation section 360 executes a program.

In step S62 in FIG. 12, the consumable life estimation section 360 is configured to evaluate whether or not the current information relating to the life of the consumable to be replaced has been received. When the result of the evaluation in step S62 is No, the consumable life estimation section 360 repeats step S62. When the result of the evaluation in step S62 is Yes, the consumable life estimation section 360 proceeds to step S64.

In step S64, the consumable life estimation section 360 is configured to acquire the current information relating to the life of the consumable to be replaced. The current life-related information acquired in step S64 is an example of the "second life-related information" in the present disclosure.

In step S66, the consumable life estimation section 360 is configured to acquire the laser apparatus-working-related information. Next, in step S68, the consumable life estimation section 360 is configured to call a learning model for the consumable to be replaced. In this process, a learning model saved in the file (file Am, file Bm, or file Cm) corresponding to the consumable (laser chamber, monitoring module, or line narrowing module) to be replaced is called.

Thereafter, in step S70, the consumable life estimation section 360 is configured to calculate the life by using the learning model. That is, the consumable life estimation section 360 is configured to calculate the life, the remaining life, and the recommended maintenance date by using the learning model and based on the current information relating to the life of the consumable to be replaced.

In step S72, the consumable life estimation section 360 is configured to transmit data on the life of the consumable to be replaced, the remaining life thereof, and the recommended maintenance date when the consumable is replaced to the data output section 370.

In step S74, the consumable life estimation section 360 is configured to evaluate whether or not to stop calculating the estimated life of the consumable. When the result of the evaluation in step S74 is No, the consumable life estimation section 360 returns to step S62 and repeats steps S62 to S74. When the result of the evaluation in step S74 is Yes, the consumable life estimation section 360 terminates the flowchart of FIG. 12.

Figure 13:
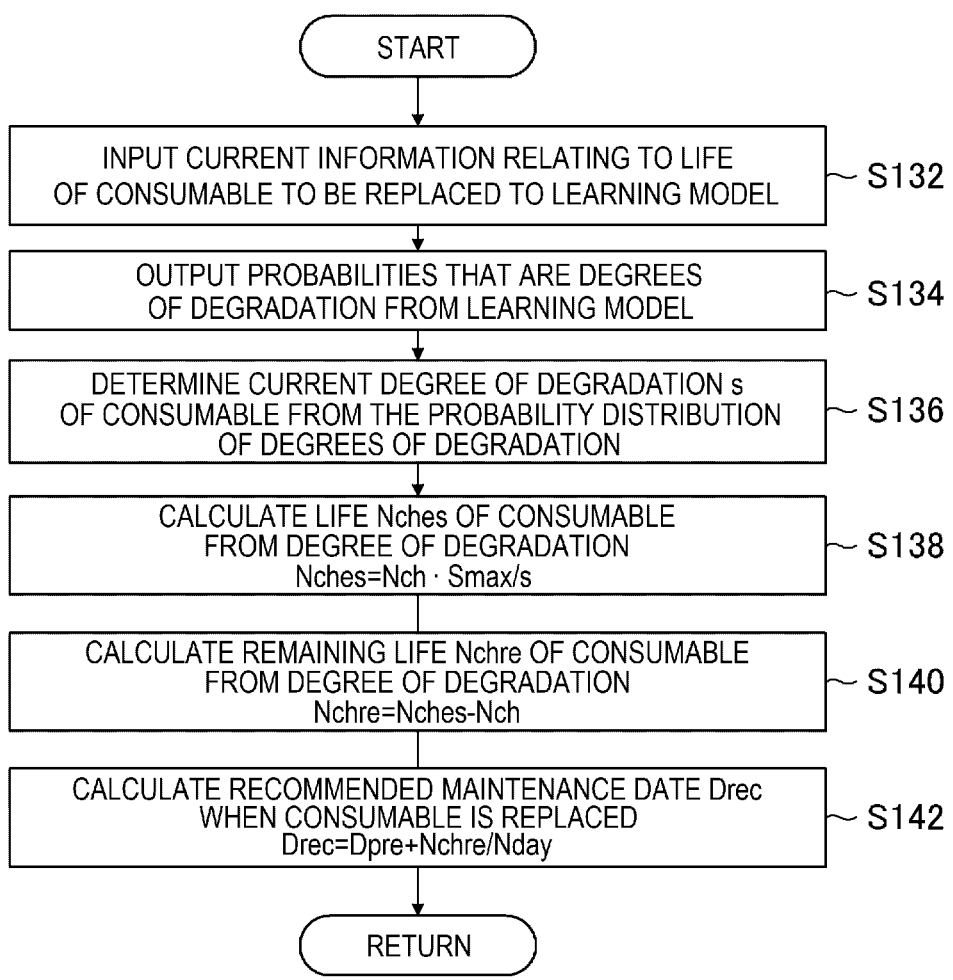
FIG. 13 is a flowchart showing an example of the contents of processes in step S70 in FIG. 12.

FIG. 13 is a flowchart showing an example of a life calculation subroutine using the learning model. That is, FIG. 13 is a flowchart showing an example of the contents of processes in step S70 in FIG. 12.

In step S132 in FIG. 13, the consumable life estimation section 360 is configured to input the current information relating to the life of the consumable to be replaced to the learning model.

In step S134, the consumable life estimation section 360 is configured to output the probabilities of the degrees of degradation Lv(1) to Lv(Smax) from the learning model.

In step S136, the consumable life estimation section 360 is configured to determine the current degree of degradation s of the consumable from the probability distribution of the degrees of degradation. As a first example of a method for determining the degree of degradation s, for example, the degree of degradation having the highest probability may be extracted. As a second example of the method for determining the degree of degradation s, an approximate curve may be obtained from the probability distribution of the degrees of degradation to obtain the degree of degradation s having the highest probability in the distribution. In the second example, the degree of degradation s is not an integer but is calculated in the form of a numerical value having digits below the decimal points. In the second example, the life and remaining life of the consumable can be estimated with higher accuracy than in the first example.

In step S138, the consumable life estimation section 360 is configured to further calculate a life Nches of the consumable from the degree of degradation obtained in step S136. The life Nches of the consumable is calculated from Nches=Nch·Smax/s by using the current number of oscillation pulses Nch. In the above expression, "·" represents multiplication.

In step S140, the consumable life estimation section 360 is configured to further calculate a remaining life Nchre of the consumable from the degree of degradation obtained in step S136. The remaining life Nchre of the consumables is calculated from Nchre=Nches−Nch by using the current number of oscillation pulses Nch.

In step S142, the consumable life estimation section 360 is configured to calculate the recommended maintenance date Drec, when the consumable is replaced. The recommended maintenance date Drec is calculated from Drec=Dpre+Nchre/Nday.

After step S142, the consumable life estimation section 360 terminates the flowchart of FIG. 13 and returns to the flowchart of FIG. 12.

Figure 14:
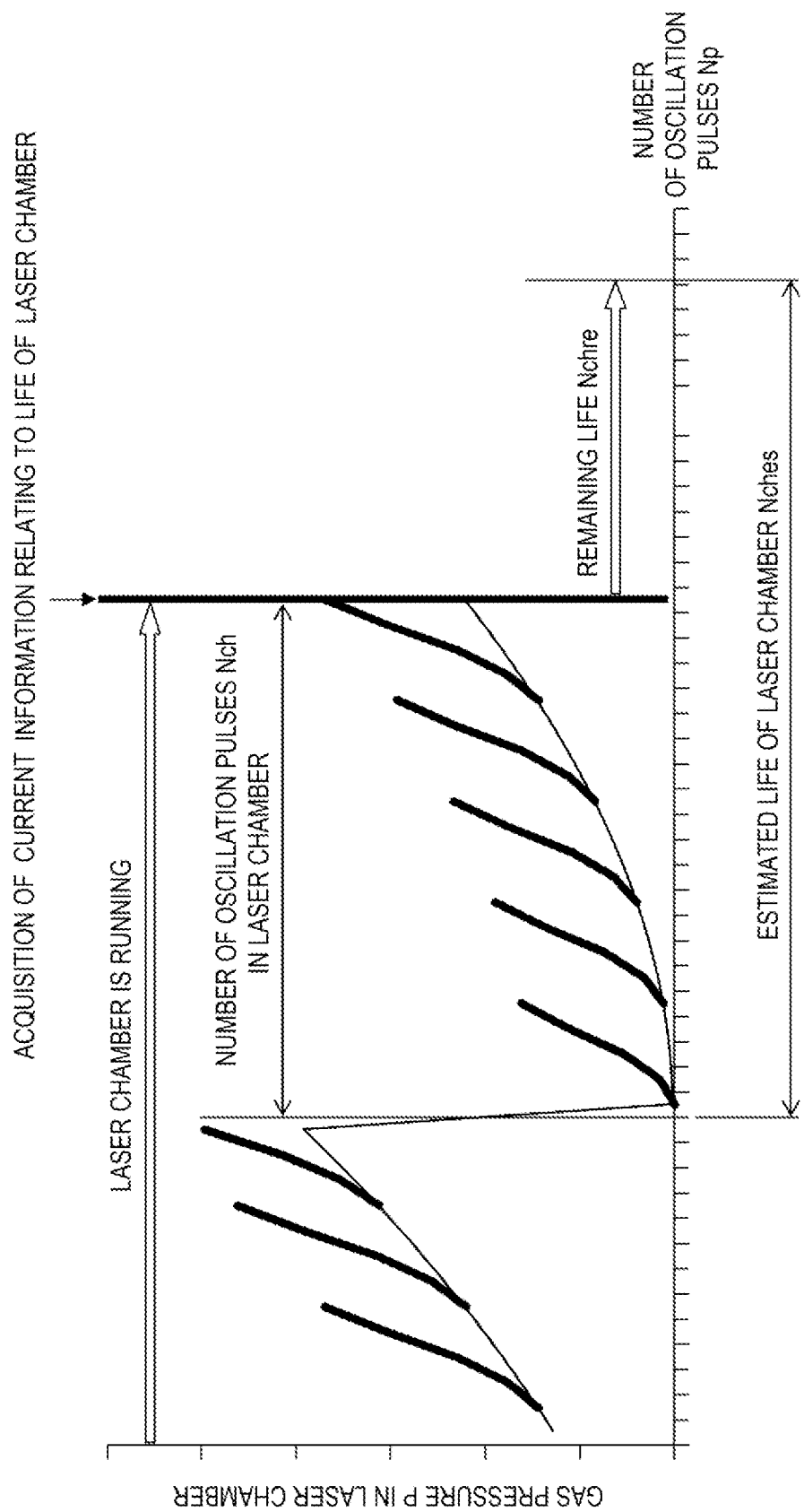
FIG. 14 shows graphs illustrating an example of calculation of the life and the remaining life of the laser chamber by using the created learning model.

5.2.9 Example of Process of Calculating Life of Consumable by Using Learning Model FIG. 14 shows an example of calculation of the life and the remaining life of the laser chamber 100 by using the created learning model. To calculate the estimated life of the currently running laser chamber 100, the consumable life estimation section 360 is configured to acquire the information relating to the life of the current laser chamber 100. In this process, data on the number of oscillation pulses Nch in the current laser chamber 100 is acquired.

Next, when the information relating to the life of the current laser chamber 100 is inputted to the created learning model, the probabilities Lv(1) to Lv(10), which are the degrees of degradation expressed in the plurality of stages, are calculated. FIG. 15 shows an example of the probabilities Lv(1) to Lv(10) on a degradation degree basis. In this example, it is determined that the probability Lv(7) of the degree of degradation of 7 is the highest.

The estimated life Nches of the currently running laser chamber 100 is then determined by Expression 1 below.

$$Nches=Nch\cdot 10/7 \qquad \text{(Expression 1)}$$

The remaining life Nchre is calculated by Expression 2 below.

$$Nchre=Nches-Nch=Nch\cdot 3/7 \qquad \text{(Expression 2)}$$

5.2.10 Life Estimation Mode of Neural Network Model

Figure 16:
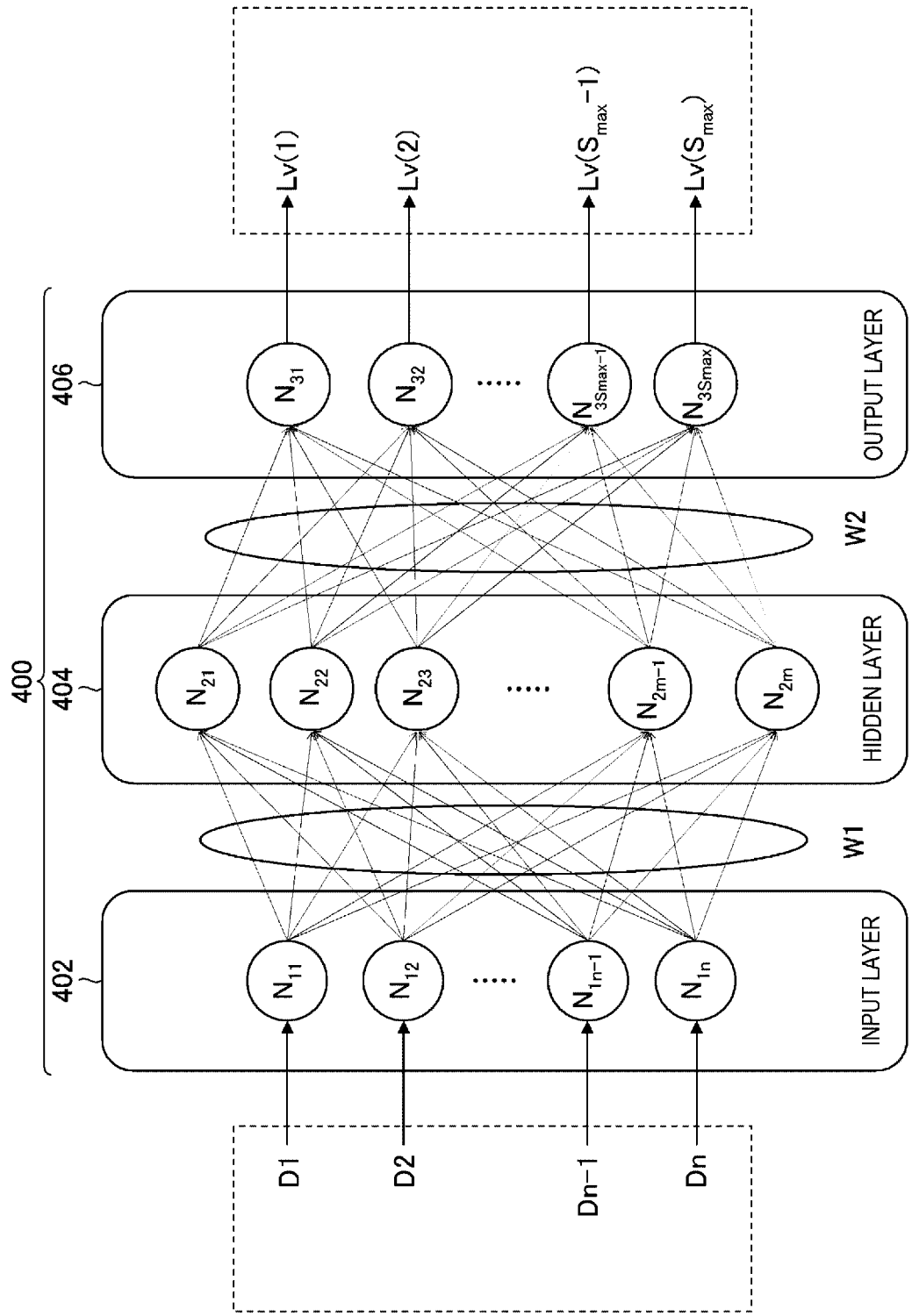
FIG. 16 shows an example of the process of estimating the life of a consumable by using a learned neural network model.

FIG. 16 shows an example of the process of estimating the life of a consumable by using a learned neural network model 400. The network structure of the neural network model 400 is the same as that in FIG. 11. In FIG. 16, the inter-neuron weight parameters $W_1$ and $W_2$ are set at values optimized by the learning mode described with reference to FIG. 11.

To estimate the life of the current consumable, the information (log data) D1, D2 . . . Dn relating to the life of the current consumable are inputted to the input layer 402. As a result, the probabilities of the degrees of degradation Lv(1) to Lv(Smax) are outputted from the output layer 406 (see FIG. 15).

5.2.11 Others

FIGS. 11 and 16 show a case where the hidden layer 404 of the neural network model 400 is a single layer, but not necessarily, and the neural network model 400 may include a plurality of hidden layers 404.

The present embodiment has been described with reference to the machine learning based on the supervised learning, but not necessarily, and machine learning based on unsupervised learning may be performed. For example, the input data can be reduced in dimension and the features in the datasets can be clustered into similar features. The result can be used to estimate the output by setting some criterion and allocating the output in such a way that the result is optimized.

5.2.12 Example of Processes Carried Out by Data Output Section

Figure 17:
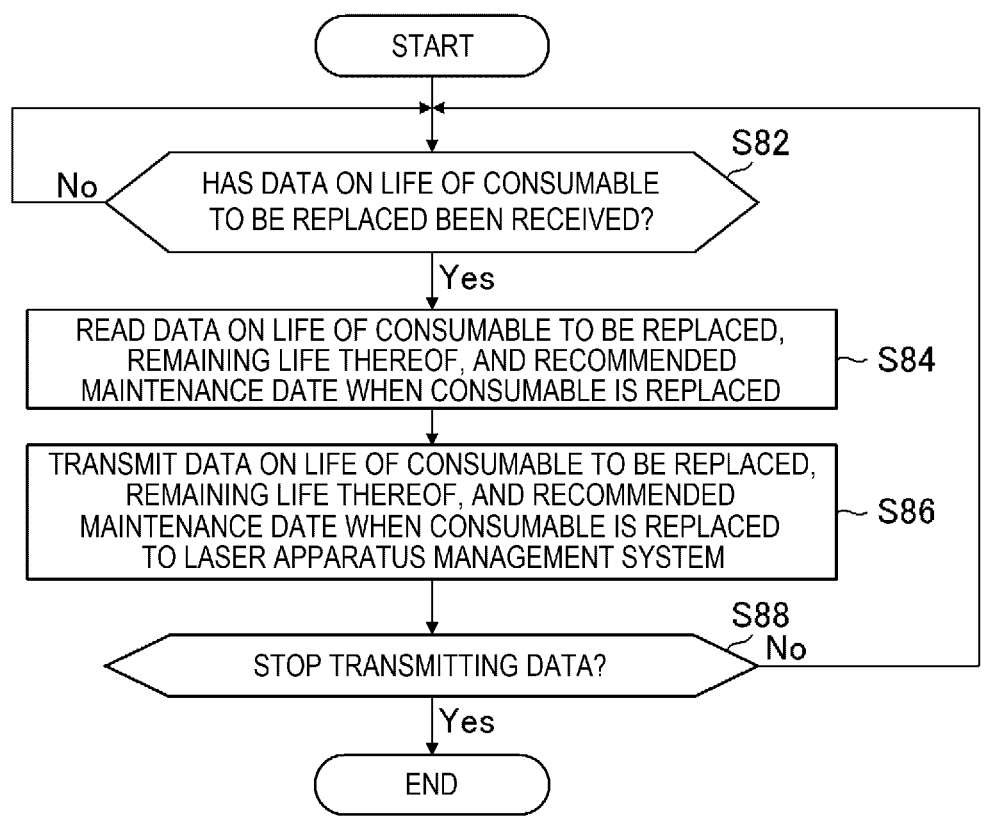
FIG. 17 is a flowchart showing an example of the contents of processes carried out by a data output section.

FIG. 17 is a flowchart showing an example of the contents of processes carried out by the data output section 370. The processes and operation shown in the flowchart of FIG. 17 are achieved when a processor configured to function as the data output section 370 executes a program.

In step S82, the data output section 370 is configured to evaluate whether or not data on the life of the consumable to be replaced has been received. When the result of the evaluation in step S82 is No, the data output section 370 repeats step S82. When the result of the evaluation in step S82 is Yes, the data output section 370 proceeds to step S84.

In step S84, the data output section 370 is configured to read data on the life of the consumable to be replaced, the remaining life thereof, and the recommended maintenance date when the consumable is replaced.

In step S86, the data output section 370 is configured to transmit the data on the life of the consumable to be replaced, the remaining life thereof, and the recommended maintenance date when the consumable is replaced. The destination to which the data is transmitted may be the laser apparatus management system 206 and/or the semiconductor factory management system 208. The destination to which the data is transmitted may instead be a terminal apparatus that is not shown but is connected to the network 210.

In step S88, the data output section 370 is configured to evaluate whether or not to stop transmitting the data. When the result of the evaluation in step S88 is No, the data output section 370 returns to step S82 and repeats steps S82 to S88. When the result of the evaluation in step S88 is Yes, the data output section 370 terminates the flowchart of FIG. 17.

5.3 Information Relating to Life of Laser Chamber

FIGS. 18 to 20 show an example of the information relating to the life of the laser chamber 100. The information relating to the life of the laser chamber 100 includes, for example, an electrode degradation parameter, a pulse energy stability parameter, a gas control parameter, a running load parameter, and a parameter of degradation due to the optical elements of the laser resonator. The notation "OC" in the table shown in FIG. 20 represents the output coupling mirror.

Out of the life-related parameters described above, life related parameters at least required to accurately estimate the life of the laser chamber 100 include the electrode degradation parameter, the pulse energy stability parameter, and the gas control parameter. Further, the running load parameter can be preferably used to improve the accuracy of the life estimation. The reason for this is that the life of the laser chamber 100 shortens when the running load is high.

Further, a parameter of degradation of the line narrowing module 106 and a parameter of degradation of the windows of the laser chamber 100, which are indices of the loss of the laser resonator, can be preferably used to improve the accuracy of the life estimation.

The electrode degradation parameter includes at least the number of discharge actions. The number of discharge actions is substantially equal to the number of oscillation pulses Np counted after the laser chamber 100 is replaced. As the electrode degradation parameter, the integrated value of the input energy may preferably be further added.

In the single-chamber-type laser apparatus shown in FIG. 1, in which the spectral linewidth and the discharge width correlate with each other, the spectral linewidth may be used as part of the electrode degradation parameter.

The pulse energy stability parameter includes at least variation in the pulse energy. Further, as the pulse energy stability parameter, variation in the integrated value of the pulse energy (amount of exposure) may be added.

As for the gas control parameter, to control the gas pressure in the laser chamber 100 in such a way that the charging voltage falls within a predetermined range, the gas control parameter includes at least the pressure in the laser chamber 100 and the pressure in the laser chamber 100 after the entire gas replacement and adjustment oscillation is performed.

When the pressure in the laser chamber 100 is controlled to be fixed and the charging voltage is controlled, the gas control parameter at least includes the charging voltage in the laser chamber 100 and the charging voltage after the entire gas replacement and adjustment oscillation is performed. It may be preferable to add the integrated value of the amount of injected halogen-containing gas after the laser chamber 100 is replaced or the integrated value of the injected laser gas. The life estimation accuracy may thus be further improved.

It may further be preferable to add the amount of injected halogen-gas-containing gas or the amount of injected laser gas per oscillation pulse.

The running load parameter may be replaced with the duty of the burst running when the average power of the laser light outputted from the laser apparatus 10 or the target pulse energy hardly changes.

In particular, the running load parameter during the exposure is preferably used. In a semiconductor manufacturing factory, the running load increases when memory devices are manufactured, whereas the running load decreases when devices relating to logical operation are manufactured.

The parameter of degradation due to the optical elements of the laser resonator includes a parameter of degradation of the windows, a parameter of degradation of the line narrowing module 106, and a parameter of degradation of the output coupling mirror 104 and at least includes the number of oscillation pulses after the replacement of each of the optical elements. When the pulse energy of the pulsed laser light outputted from the laser apparatus 10 greatly changes, the integrated value of the pulse energy or the integrated value of the square of the pulse energy, which are each a parameter of degradation of the optical elements due to two-photon absorption may be used.

5.4 Example of Information Relating to Life of Monitoring Module

FIG. 21 shows an example of the information relating to the life of the monitoring module 108. The life of the monitoring module 108 is in many cases determined by the deterioration of the optical elements and the deterioration of an optical sensor. The information relating to the life of the monitoring module 108 includes at least one of a parameter of degradation of the optical elements disposed in the monitoring module 108 and a parameter of degradation of the optical sensor.

The parameter of degradation of the optical elements of the monitoring module 108 includes at least the number of oscillation pulses after the monitoring module 108 is replaced. When the pulse energy of the pulsed laser light outputted from the laser apparatus 10 greatly changes, the integrated value of the pulse energy or the integrated value of the square of the pulse energy, which are each a parameter of degradation of the optical elements due to two-photon absorption may be used.

The parameter of degradation of the optical sensor includes the intensity of the light detected with the image sensor as the optical sensor, the spectral linewidth, and the pulse energy and the integrated value thereof.

A degradation parameter at least required to estimate the life of the monitoring module 108 is the intensity of the light detected with the image sensor. Since the intensity of the light incident on the image sensor changes in accordance with the spectral linewidth and the pulse energy, the spectral linewidth and the pulse energy value may be supplementally used. The integrated value of the pulse energy is close to the amount of light exposed to the image sensor and may therefore be used.

[Others]

In the example shown in FIG. 21, the optical sensor provided in the pulse energy detector 144 in the monitoring module 108 is, for example, a photodiode or a pyroelectric device. Deterioration of the sensors can also be assessed by the integrated value of pulse energy after the monitoring module 108 is replaced. When the target pulse energy does not greatly change, the number of oscillation pulses after the monitoring module 108 is replaced can be used in place of the integrated value.

5.5 Example of Information Relating to Life of Line Narrowing Module

FIG. 22 shows an example of the information relating to the life of the line narrowing module 106. The life of the line narrowing module 106 is determined in many cases by the degradation of the optical elements and the degradation of a wavelength actuator. The information relating to the life of the line narrowing module 106 includes at least one of parameters of degradation of the optical elements (plurality of prisms and grating) disposed in the line narrowing module 106, a parameter of degradation of the wavelength actuator, and a parameter of degradation of the wavefront.

A degradation parameter at least required to estimate the life of the line narrowing module 106 is the parameter of degradation of the optical elements in the line narrowing module 106. It may be preferable to add the parameter of degradation of the wavelength actuator and the parameter of degradation of the wavefront.

The parameters of degradation of the optical elements in the line narrowing module 106 at least include the number of oscillation pulses after the line narrowing module 106 is replaced. When the pulse energy of the pulsed laser light outputted from the laser apparatus 10 greatly changes, the integrated value of the pulse energy or the integrated value of the square of the pulse energy, which are each a parameter of degradation of the optical elements due to two-photon absorption may be used.

The parameter of degradation of the wavelength actuator includes wavelength stability.

When the wavelength actuator degrades so that the operation thereof deteriorates and the wavelength control therefore becomes unstable, the wavelength stability can be used to assess the life.

The parameter of degradation of the wavefront includes the spectral linewidth. Since the spectral linewidth of the pulsed laser light outputted from the laser apparatus 10 widens when the wavefront of the light from the line narrowing module 106 is distorted, the spectral linewidth can be used to assess the life. For example, when the prisms are made of synthetic quartz, compaction distorts the wavefront having passed through the prisms and widens the spectral linewidth in some cases.

5.6 Effects and Advantages

The consumable management server 310 according to the first embodiment can estimate the life of each of the consumables to be replaced in the laser apparatus 10 by using a corresponding learning model based on the information relating to the life of the consumable.

Further, the configuration in the first embodiment allows the replacement schedule to be planned in advance in accordance with the result of estimation of the life of a consumable to be replaced. As a result, the consumable can be replaced in accordance with the life estimated in accordance with the actual usage situation, instead of replacing the consumable in accordance with the standard life. The effects below are therefore provided.

[Effect 1] The life of a consumable can be used as effectively as possible, whereby the cost can be reduced.

[Effect 2] Shutdown of the production line due to unplanned replacement of a consumable can be suppressed.

Further, according to the configuration in the first embodiment, an estimated life of a consumable is calculated by using a learning model learned based on machine learning, whereby elements attributable to persons, such as an FSE, are eliminated.

5.7 Others

The first embodiment has been presented with reference to the case of a KrF excimer laser for an exposure apparatus in a semiconductor factory, but not necessarily, and the first embodiment may be applied, for example, to an excimer laser for annealing a flat panel and an excimer laser for processing a workpiece. In the cases described above, a rear mirror is disposed in place of the line narrowing module 106, and the spectrum detector 146 in the monitoring module 108 may be omitted.

6. Second Embodiment

6.1 Configuration

Figure 23:
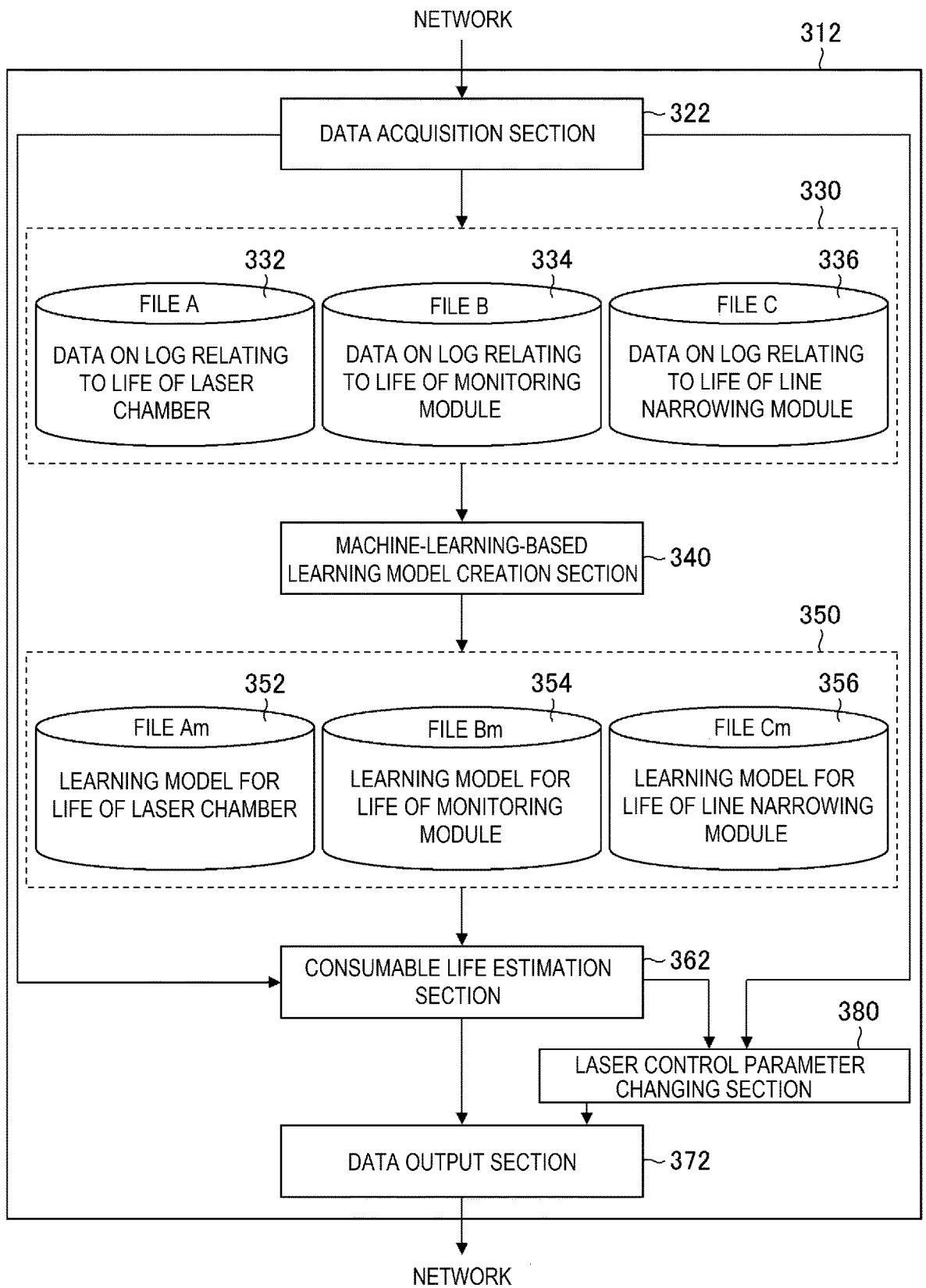
FIG. 23 is a block diagram showing the functions of the consumable management server according to a second embodiment.

FIG. 23 is a block diagram showing the functions of a consumable management server 312 according to a second embodiment. In place of the consumable management server 310 described with reference to FIG. 5, the consumable management server 312 shown in FIG. 23 may be used. Differences in configuration between the consumable management server 312 shown in FIG. 23 and the consumable management server 310 described with reference to FIG. 5 will be described.

The consumable management server 312 shown in FIG. 23 includes a data acquisition section 322, a consumable life estimation section 362, and a data output section 372 in place of the data acquisition section 320, the consumable life estimation section 360, and the data output section 370 in FIG. 5. Further, a laser control parameter changing section 380 is added to the consumable management server 312.

In addition to performing the same function as the function of the data acquisition section 320, the data acquisition section 322 is configured to acquire information on a consumable maintenance date desired by the user via the network 210.

In addition to performing the same function as the function of the consumable life estimation section 360, the consumable life estimation section 362 is configured to carry out the process of sending the result of the life estimation to the laser control parameter changing section 380.

The laser control parameter changing section 380 carries out the process of changing control parameters of the laser apparatus 10 based on the estimation result from the consumable life estimation section 362. The laser control parameter changing section 380 is configured to compare the number of oscillation pulses calculated based on the desired maintenance date and the data on the working schedule of the laser apparatus 10 with the number of oscillation pulses in the remaining life of the laser apparatus 10. When the number of oscillation pulses in the remaining life is smaller than the calculated number of oscillation pulses, the laser control parameter changing section 380 is configured to carry out the process of changing the control parameters of the laser apparatus 10 in such a way that the life of the consumable can be extended to the desired maintenance date.

In addition to performing the same function as the function of the data output section 370, the data output section 372 is configured to perform the function of providing the control parameters of the laser apparatus 10 that have been created by the laser control parameter changing section 380 to the relevant laser apparatus 10 via the network 210.

6.2 Operation

6.2.1 Example of Processes Carried Out by Data Acquisition Section

Figure 24:
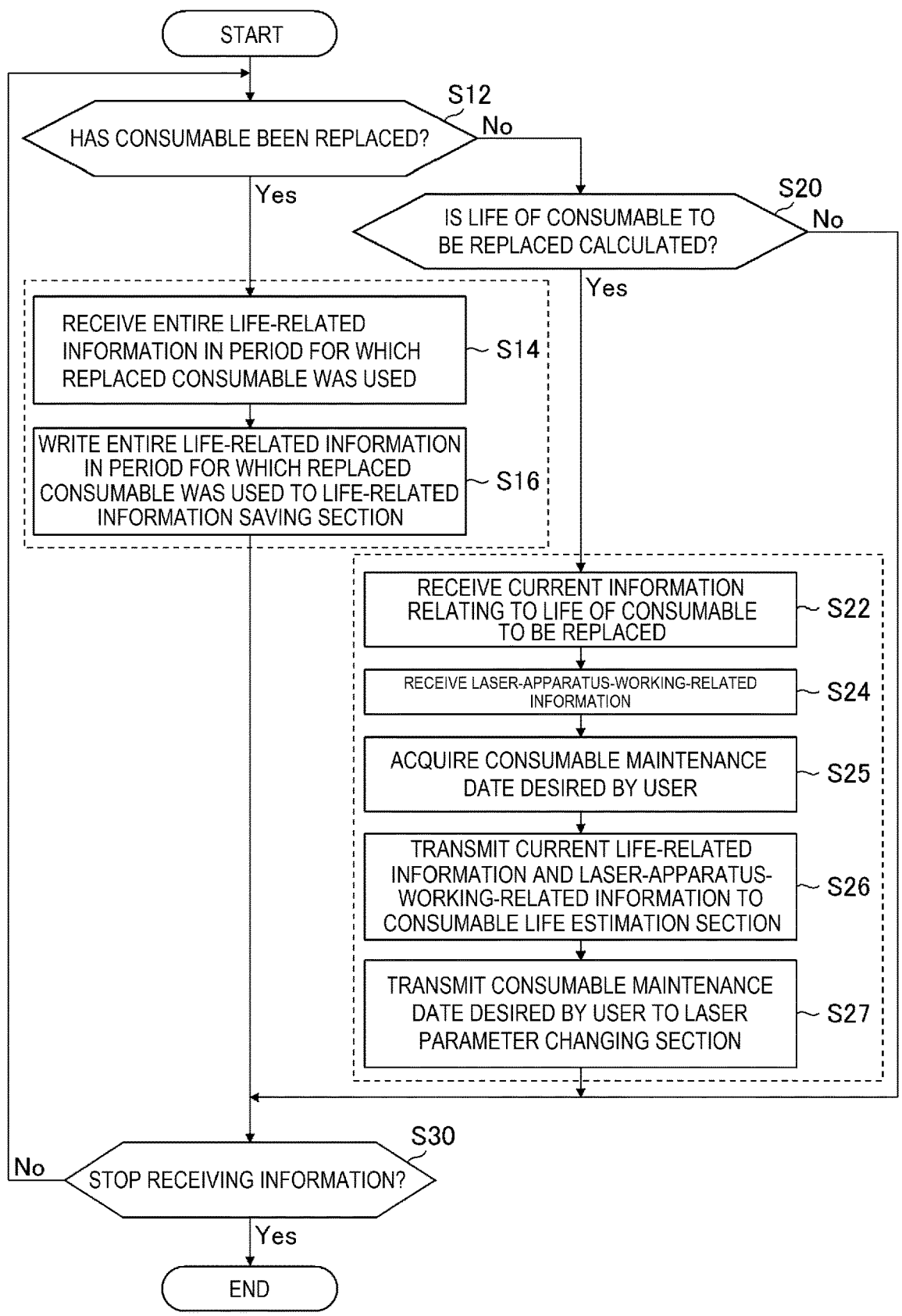
FIG. 24 is a flowchart showing an example of the contents of processes carried out by the data acquisition section.

FIG. 24 is a flowchart showing an example of the contents of processes carried out by the data acquisition section 322.

In FIG. 24, the same step as the step in FIG. 6 has the same step number, and no duplicated description will be made. Differences from FIG. 6 will be described.

In the flowchart of FIG. 24, steps S25 and S27 are added to the procedure of calculating an estimated life of the consumable to be replaced by using the created learning model.

After step S24, the data acquisition section 322 proceeds to step S25. In step S25, the data acquisition section 322 is configured to acquire information on the maintenance date desired by the user when the consumable to be replaced is replaced. The user can input a desired maintenance date, for example, via a terminal apparatus that is not shown. The "desired maintenance date" means a desired date when maintenance work including consumable replacement work is performed. After step S25, the data acquisition section 322 proceeds to step S26.

After step S26, the data acquisition section 322 proceeds to step S27. In step S27, the data acquisition section 322 is configured to transmit the information on the maintenance date desired by the user when the consumable to be replaced is replaced to the laser control parameter changing section 380. After step S27, the data acquisition section 322 proceeds to step S30. The contents of the other processes are the same as those in the flowchart of FIG. 6.

6.2.2 Example of Processes Carried Out by Consumable Life Estimation Section

Figure 25:
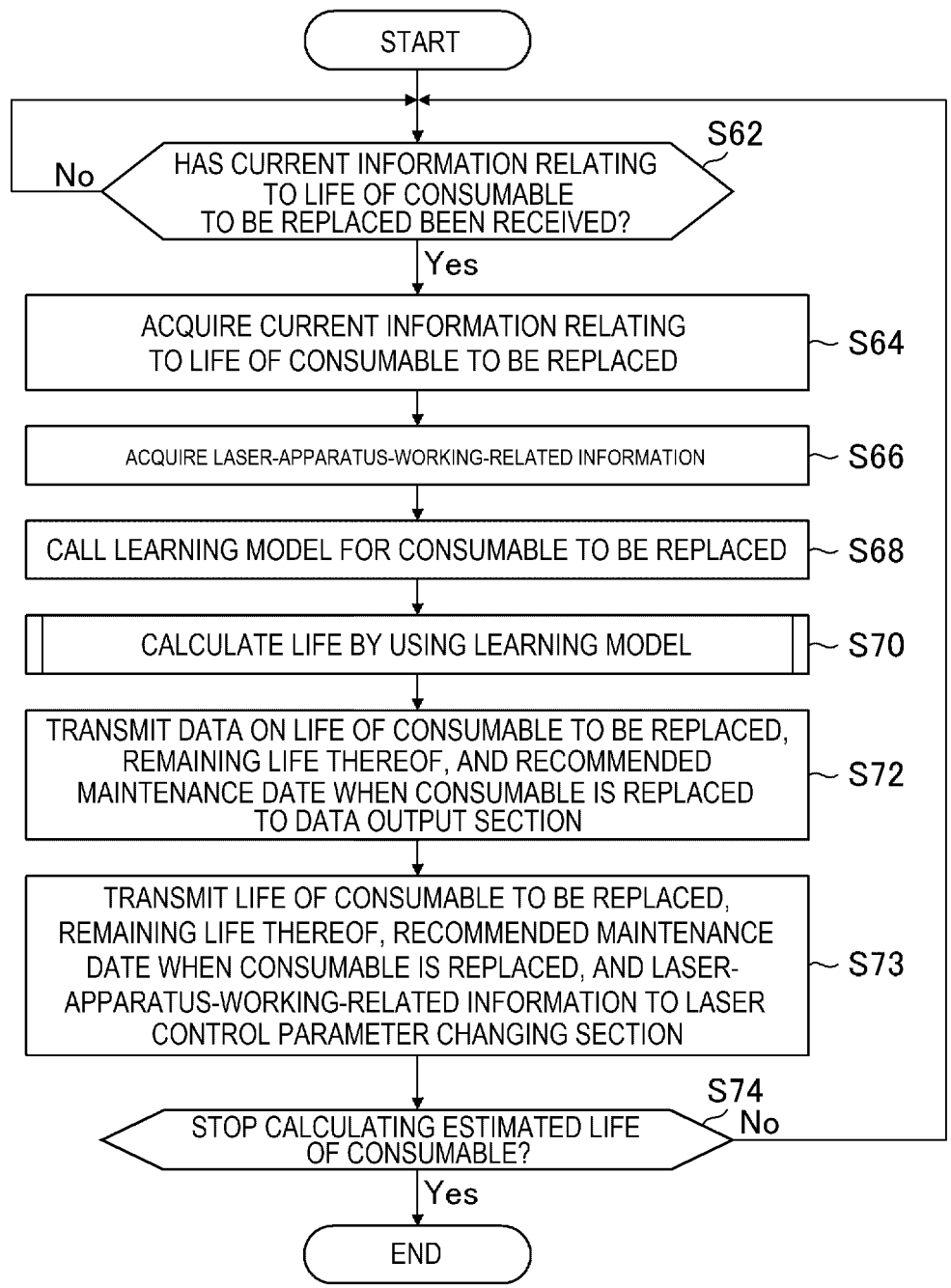
FIG. 25 is a flowchart showing an example of the contents of processes carried out by the consumable life estimation section.

FIG. 25 is a flowchart showing an example of the contents of processes carried out by the consumable life estimation section 362. In FIG. 25, the same step as the step in FIG. 12 has the same step number, and no duplicated description will be made. Differences from FIG. 12 will be described.

The flowchart of FIG. 25 includes step S73 between steps S72 and S74. In step S73, the consumable life estimation section 362 is configured to transmit the life of the consumable to be replaced, the remaining life thereof, the recommended maintenance date when the consumable is replaced, and the laser-apparatus-working-related information to the laser control parameter changing section 380.

After step S73, the consumable life estimation section 362 proceeds to step S74. The contents of the other processes are the same as those in the flowchart of FIG. 12.

Figure 26:
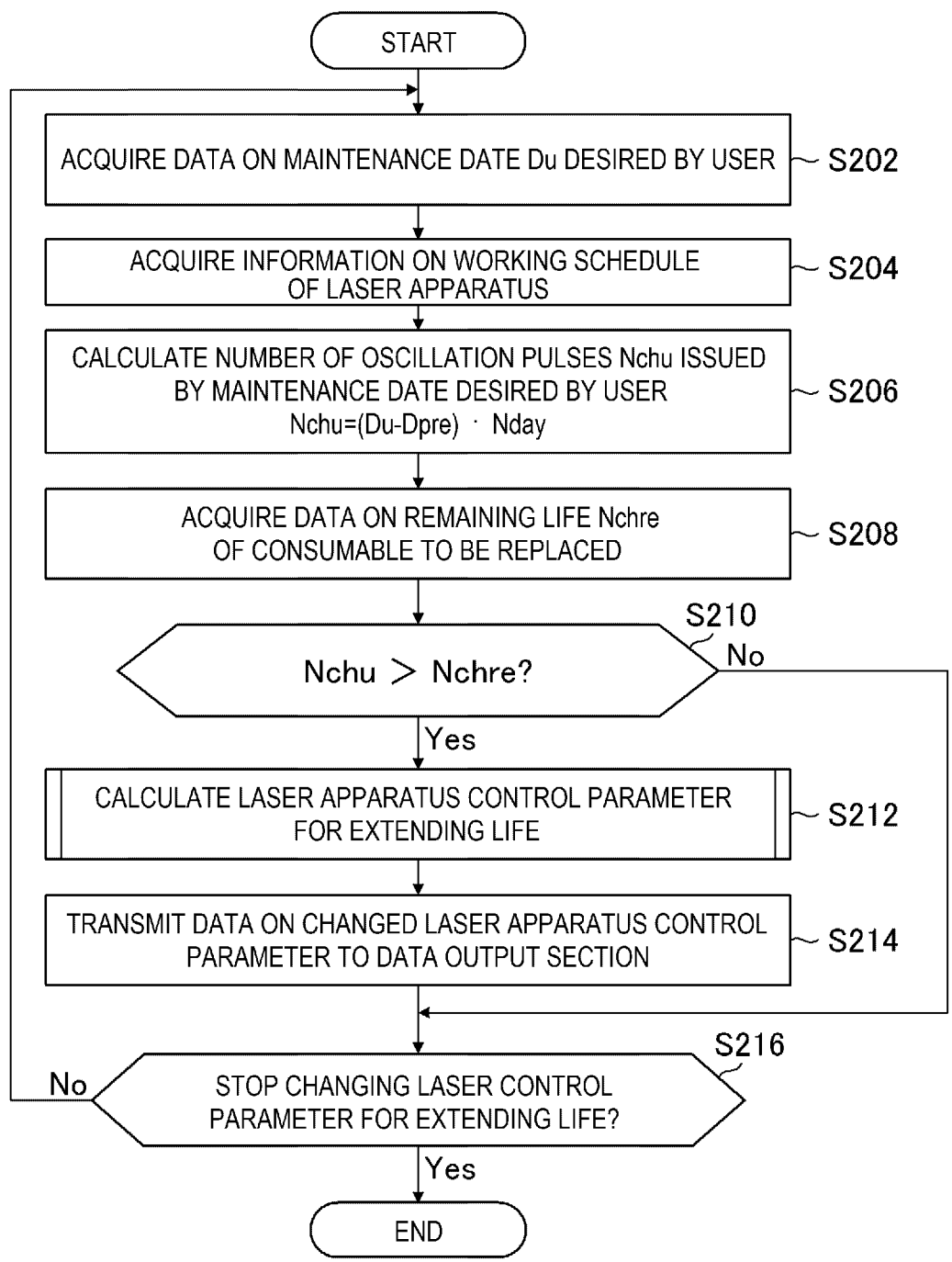
FIG. 26 is a flowchart showing an example of the contents of processes carried out by a laser control parameter changing section.

6.2.3 Example of Processes Carried Out by Laser Control Parameter Changing Section FIG. 26 is a flowchart showing an example of the contents of processes carried out by the laser control parameter changing section 380. The processes and operation shown in the flowchart of FIG. 26 are achieved when a processor configured to function as the laser control parameter changing section 380 executes a program.

In step S202, the laser control parameter changing section 380 is configured to acquire information on a maintenance date Du desired by the user.

In step S204, the laser control parameter changing section 380 is configured to acquire information on the working schedule of the laser apparatus 10. The working schedule information may, for example, be information on the number of oscillation pulses Nday outputted per day from the laser apparatus 10. Data on Nday is an example of "working schedule data" in the present disclosure.

In step S206, the laser control parameter changing section 380 is configured to calculate the number of oscillation pulses Nchu issued by the maintenance date desired by the user. Nchu can be calculated by Expression below.

$$Nchu=(Du-Dpre)\cdot Nday$$

Next, in step S208, the laser control parameter changing section 380 is configured to acquire data on the remaining life Nchre of the consumable to be replaced.

Thereafter, in step S210, the laser control parameter changing section 380 is configured to evaluate whether or not Nchu>Nchre is satisfied. That is, the laser control parameter changing section 380 is configured to evaluate whether or not the life of the consumable to be replaced needs to be extended to the maintenance date desired by the user.

When the result of the evaluation in step S210 is Yes, the laser control parameter changing section 380 proceeds to step S212. In step S212, the laser control parameter changing section 380 is configured to calculate a laser apparatus control parameter for extending the life. A specific example of the content of process in step S212 will be described later (FIG. 27).

After step S212, the laser control parameter changing section 380 is configured to transmit in step S214 data on the changed laser apparatus control parameter determined in step S212 to the data output section 372.

Thereafter, the laser control parameter changing section 380 is configured to evaluate in step S216 whether or not to stop changing the laser control parameter for extending the life. When the result of the evaluation in step S216 is No, the laser control parameter changing section 380 returns to step S202 and repeats steps S202 to S216. When the result of the evaluation in step S216 is Yes, the laser control parameter changing section 380 terminates the flowchart of FIG. 26. When the result of the evaluation in step S210 is No, the laser control parameter changing section 380 skips steps S212 to S214 and proceeds to step S216.

Figure 27:
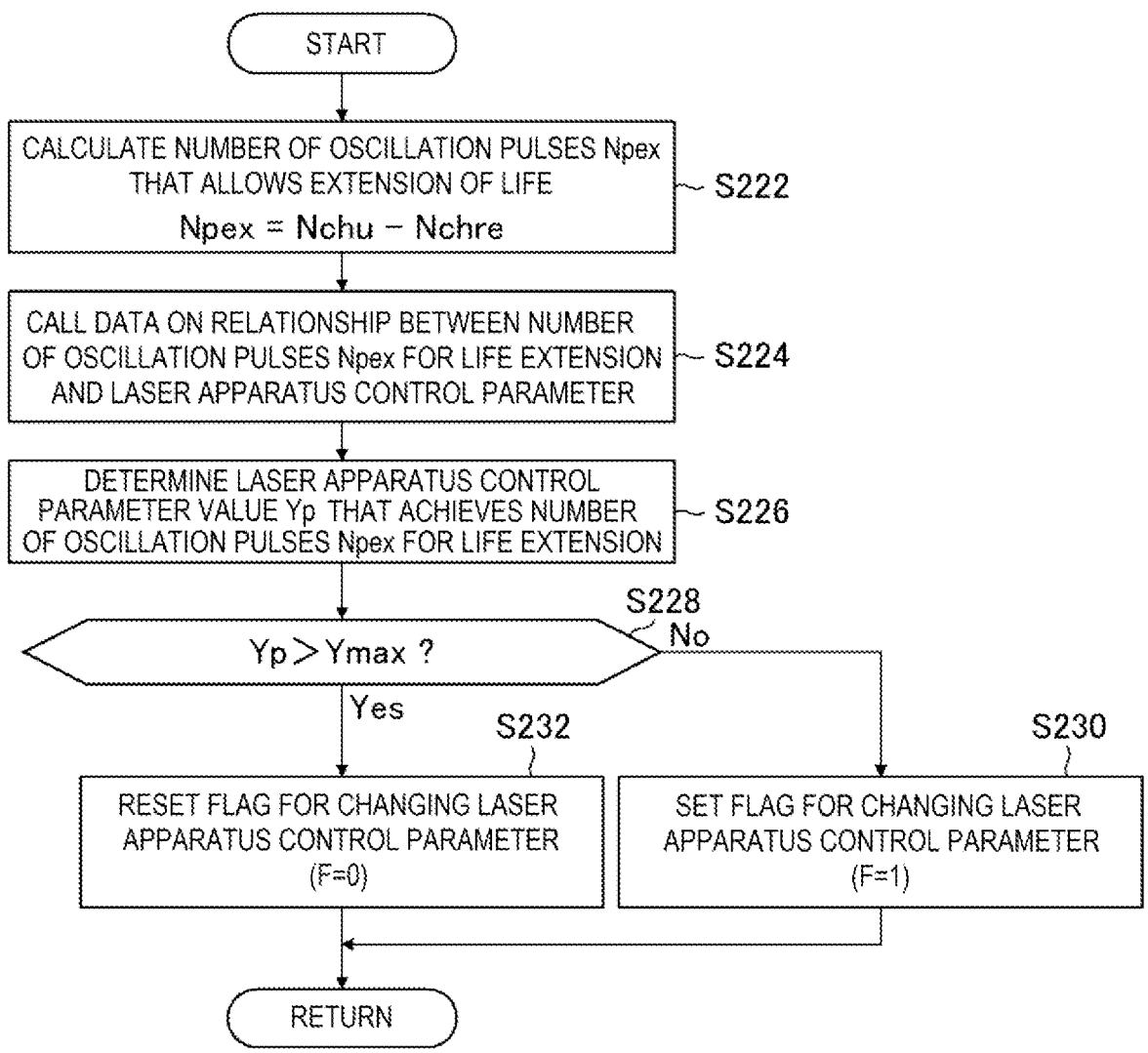
FIG. 27 shows a flowchart showing an example of a subroutine applied to step S212 in FIG. 26.

FIG. 27 shows a flowchart showing an example of a subroutine applied to step S212 in FIG. 26.

In step S222 of FIG. 27, the laser control parameter changing section 380 is configured to calculate the number of oscillation pulses Npex that allows extension of the life. Npex may be the result of subtraction of the remaining life Nchre from Nchu determined in step S206 in FIG. 26 (Npex=Nchu−Nchre).

In step S224, the laser control parameter changing section 380 is configured to call data on the relationship between the number of oscillator pulses Npex for the life extension and the control parameter of the laser apparatus 10. Thereafter, in step S226, the laser control parameter changing section 380 is configured to determine based on the called relationship data a control parameter value Yp of the laser apparatus 10 that is a control parameter value that achieves the number of oscillation pulses Npex for the life extension.

Next, in step S228, the laser control parameter changing section 380 is configured to evaluate whether or not the control parameter value Yp determined in step S226 exceeds an upper limit value Ymax specified in advance.

When the result of the evaluation in step S228 is No, the laser control parameter changing section 380 proceeds to step S230. In step S230, the laser control parameter changing section 380 is configured to set a flag (F=1) for changing the control parameter of the laser apparatus 10. The flag F=1 represents that the life extension control parameter of the laser apparatus 10 is changed.

On the other hand, when the result of the evaluation in step S228 is Yes, the laser control parameter changing section 380 proceeds to step S232. In step S232, the laser control parameter changing section 380 is configured to reset the flag for changing the control parameter of the laser apparatus 10 (F=0). The flag F=0 represents that the life extension control parameter of the laser apparatus 10 is not changed (life is not extended).

After step S230 or S232, the laser control parameter changing section 380 terminates the flowchart of FIG. 27 and returns to the flowchart of FIG. 26.

Figure 28:
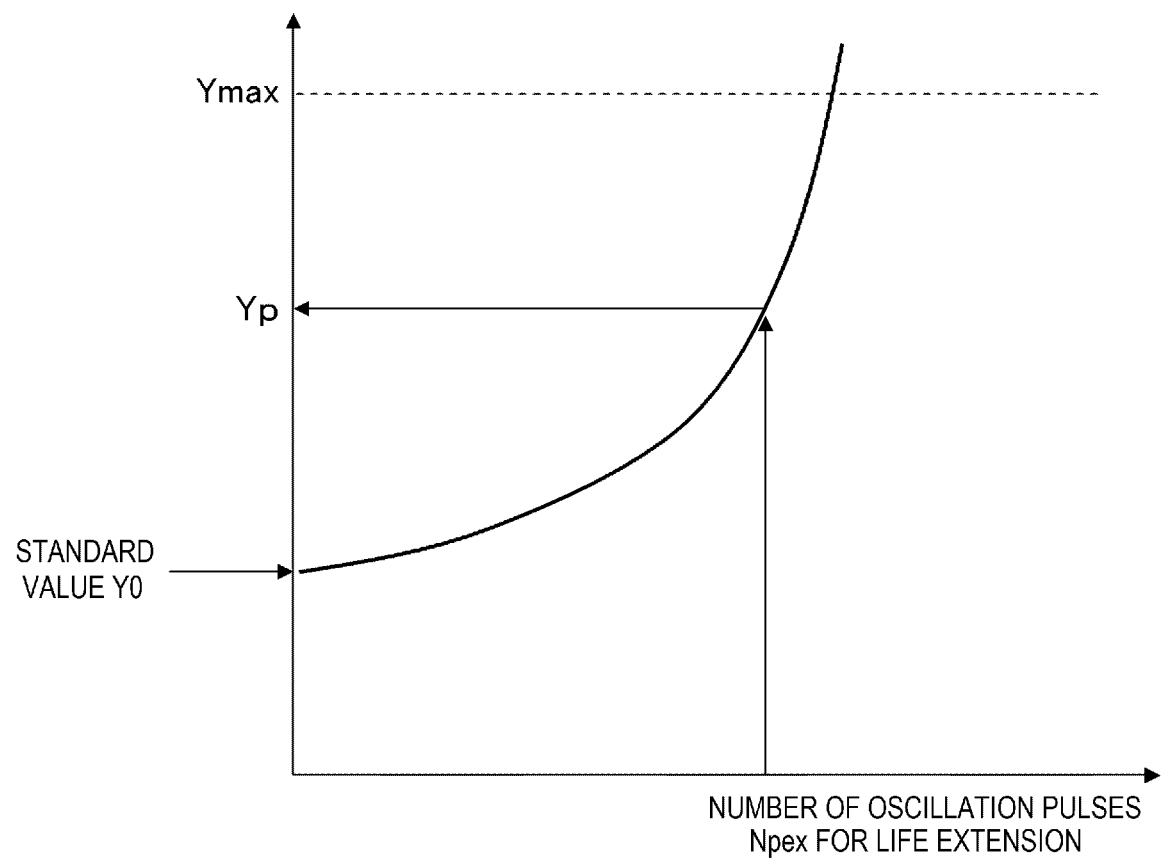
FIG. 28 is a conceptual view of a graph of the relationship between the number of oscillation pulses for life extension and a laser apparatus control parameter.

FIG. 28 is a conceptual view of a graph of the relationship between the number of oscillation pulses for the life extension and the laser apparatus control parameter. The horizontal axis of FIG. 28 represents the number of oscillation pulses Npex for the life extension, and the vertical axis of FIG. 28 represents a life extension control parameter value Y of the laser apparatus 10. The relationship indicated by the graph shown in FIG. 28 may be measured in advance in the factory of the laser apparatus manufacturer, and the relationship data may be stored, for example, in a memory.

A specific example of a control parameter of the laser apparatus 10 that allows extension of the life of the laser chamber 100 is the amount of consumed (replaced) laser gas operating at a laser gas unit number of oscillation pulses. The life of the laser chamber 100 can be extended by increasing the amount of consumed laser gas operating at the laser gas unit number of oscillation pulses.

As shown in FIG. 28, the parameter Yp, which changes the amount of consumed laser gas operating at the unit number of oscillation pulses corresponding to a current standard value Y0 to the amount of consumed laser gas operating at the number of oscillation pulses Npex for the life extension, is determined, and the control parameter of the laser apparatus 10 is changed from Y0 to Yp. The life of the laser chamber 100 can thus be extended.

However, even when the amount Y of replaced laser gas per unit number of oscillation pulses is increased, the life cannot be increased infinitely. Ymax in FIG. 28 is, for example, the maximum amount of replaced laser gas per unit oscillation pulses and is a value at which the life extension effect is almost saturated.

As an example of extension of the life of the monitoring module 108, for example, a parameter of the gain of an amplifier that amplifies the analog signal from the image sensor incorporated in the spectrum measurement device may be adjusted for the life extension.

As an example of the extension of the life of the line narrowing module 106, for example, the control gain of a wavelength feedback control parameter may be changed as the parameter that allows the life extension in a case where maintenance is required due to degradation of the wavelength actuator.

6.2.4 Example of Processes Carried Out by Data Output Section

Figure 29:
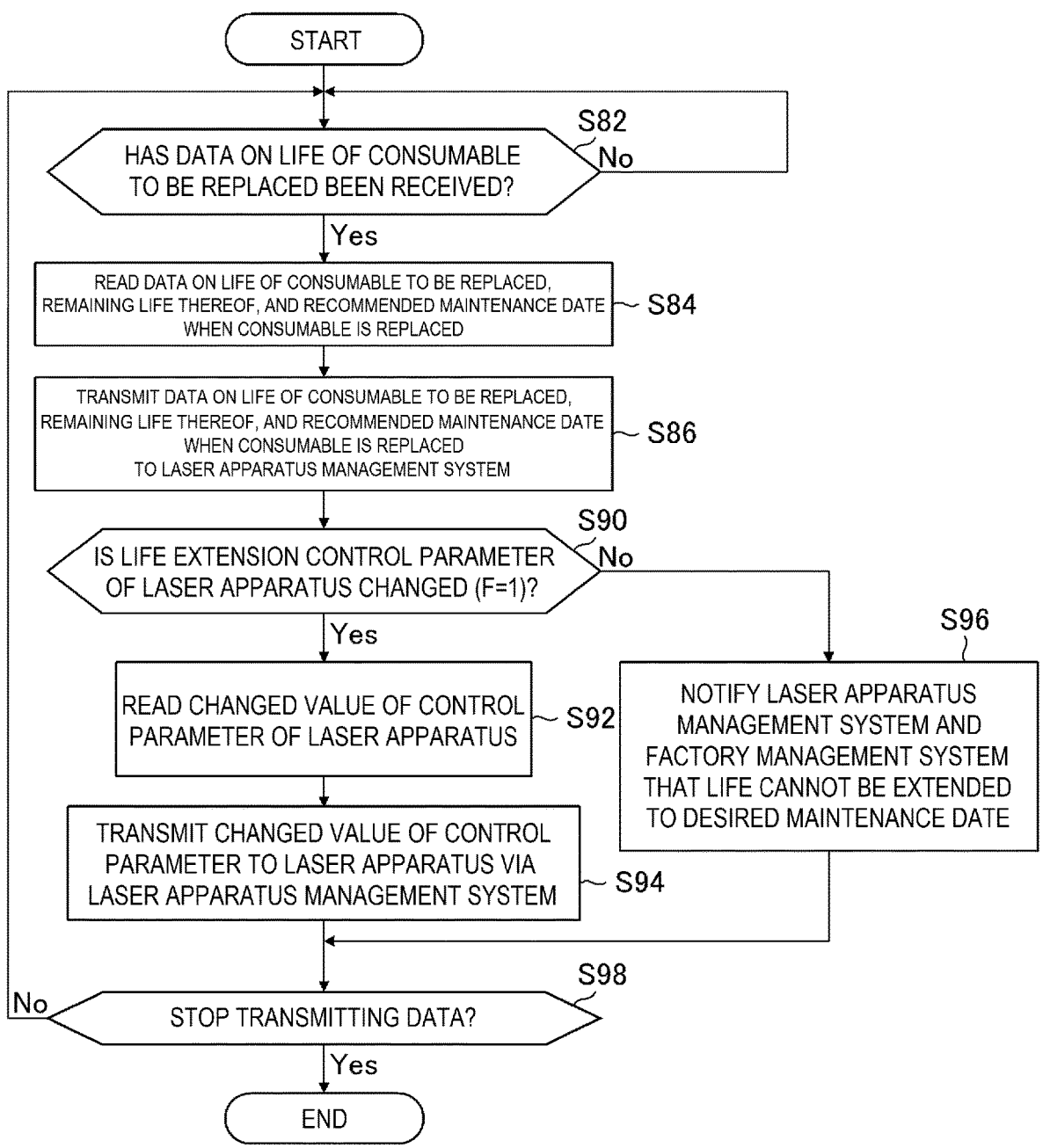
FIG. 29 is a flowchart showing an example of the contents of processes carried out by the data output section.

FIG. 29 is a flowchart showing an example of the contents of processes carried out by the data output section 372. In FIG. 29, the same step as the step in FIG. 17 has the same step number, and no duplicated description will be made. Differences from FIG. 17 will be described. The flowchart of FIG. 29 includes steps S90 to S98 after step S86.

In step S90, the data output section 372 is configured to check the value of the flag F and evaluate whether or not the control parameter is changed. That is, the data output section 372 is configured to evaluate whether or not the flag for changing the life extension control parameter of the laser apparatus 10 is F=1. When the result of the evaluation in step S90 is Yes, the data output section 372 proceeds to step S92.

In step S92, the data output section 372 is configured to read the changed value of the control parameter of the laser apparatus 10. In the example described with reference to FIG. 28, the data output section 372 is configured to read the control parameter value Yp as the changed value.

Thereafter, in step S94, the data output section 372 is configured to transmit the changed value of the control parameter to the laser apparatus 10 via the laser apparatus management system 206. After step S94, the data output section 372 proceeds to step S98.

When the result of the evaluation in step S90 is No, the data output section 372 proceeds to step S96. In step S96, the data output section 372 is configured to notify the laser apparatus management system 206 and/or the semiconductor factory management system 208 that the life cannot be extended to the desired maintenance date.

After step S96, the data output section 372 proceeds to step S98. Step S98 has the same process as that in step S88 in FIG. 17. In step S98, the data output section 372 is configured to evaluate whether or not to stop transmitting the data. When the result of the evaluation in step S98 is No, the data output section 372 returns to step S82.

When the result of the evaluation in step S98 is Yes, the data output section 372 terminates the flowchart of FIG. 29.

6.3 Effects and Advantages

In addition to the same effects as those in the first embodiment, the second embodiment allows extension of the life of a consumable to be replaced to a desired maintenance date specified by the user. Downtime of the apparatus can thus be suppressed.

7. Third Embodiment 7.1 Configuration

Figure 30:
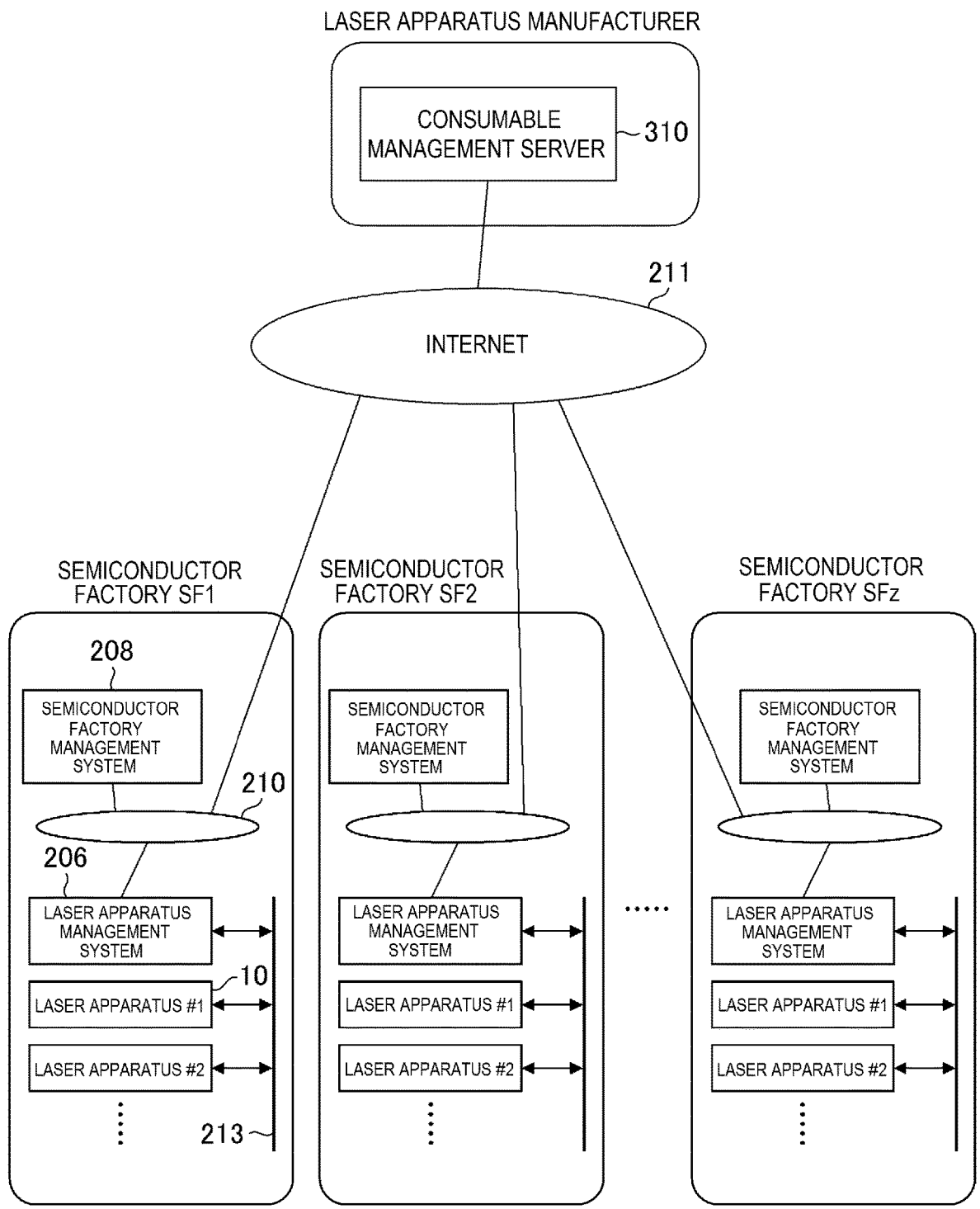
FIG. 30 shows an example of the configuration of the laser management system according to a third embodiment.

FIG. 30 shows an example of the configuration of the laser management system according to a third embodiment. FIG. 30 shows a case where the consumable management server 310 is disposed in a laser apparatus manufacturer. The consumable management server 310 is disposed in the factory of the laser apparatus manufacturer or a service base of the laser apparatus manufacturer outside the semiconductor factory where the laser apparatus 10 is disposed, and the consumable management server 310 is connected to an Internet line 211.

The laser management systems in a plurality of semiconductor factories SF1, SF2, . . . SFZ are also connected to each other via the Internet line 211. The semiconductor factories SF1, SF2, . . . SFZ each include the same laser management system 200 as that shown in FIG. 2, and the laser management systems 200 are connected to each other via the network 210.

The consumable management server 310 disposed at the laser apparatus manufacturer has a configuration capable of transmitting and receiving data and commands to and from the laser apparatus management system 206 and the semiconductor factory management system 208 in each of the semiconductor factories.

7.2 Operation 7.2.1 Creation and Saving of Learning Model

Whenever a consumable of the laser apparatus 10 disposed in any of the semiconductor factories shown in FIG. 30 undergoes maintenance (replacement), the laser apparatus management system 206 disposed in the semiconductor factory is configured to transmit data on a log of the consumable over the entire life to the consumable management server 310 disposed at the laser apparatus manufacturer via the Internet line 211.

The consumable management server 310 is configured to create a learning model and saves the learning model by carrying out the same steps as those in FIG. 5.

7.2.2 Calculation of Estimated Life and Recommended Maintenance Date

When the laser apparatus management system 206 or the semiconductor factory management system 208 in any of the semiconductor factories requests the calculation of the estimated life and the recommended maintenance date of a certain laser apparatus 10, the laser apparatus management system 206 disposed in the semiconductor factory is configured to transmit data on a log of a consumable to the laser apparatus consumable management server 310 disposed at the laser apparatus manufacturer via the Internet line 211.

The consumable management server 310 is configured to perform the following calculation by carrying out the same steps as those in FIG. 5.

The consumable management server 310 is configured to call a learning model corresponding to the consumable and calculate the number of oscillation pulses in an estimated life of the consumable.

Thereafter, the consumable management server 310 is configured to calculate a recommended maintenance date based on the number of oscillation pulses in the remaining life and the laser apparatus working information and transmit data on the recommended maintenance date to the laser apparatus management system 206 and the semiconductor factory management system 208 via the Internet line 211.

7.3 Effects and Advantages

According to the third embodiment, the consumable management server 310 is configured to be capable of acquiring the information relating to the life of the consumables of a plurality of laser apparatuses and collected in a plurality of semiconductor factories. As a result, a learning model can be created by using a large amount of data, whereby the accuracy of the life estimation is improved.

7.4 Others

In the example described above, the consumable management server 310 is configured to collect learning data, create a learning model, and calculate the number of oscillation pulses in an estimated life of a consumable, a remaining life thereof, and a recommended maintenance date, but not necessarily. For example, the learning model created by the consumable management server 310 may be provided to the laser apparatus management system 206, and the laser apparatus management system 206 may calculate the number of oscillation pulses in the estimated life, the remaining life, and the recommended maintenance date.

That is, the consumable management server 310 is configured to collect learning data and create and save a learning model. When there is a request for assessment of the life of a certain consumable of a certain laser apparatus, the laser apparatus management system 206 is configured to receive information relating to the life of the current consumable of the current laser apparatus. Further, the laser apparatus management system 206 is configured to receive the learning model for the consumable from the consumable management server 310 via the Internet line 211. The laser apparatus management system 206 may be configured to calculate the number of oscillation pulses in the estimated life of the consumable, the remaining life thereof, and the recommended maintenance date when the consumable is replaced from the received learning model.

8. Collection of Learning Data and Creation of Learning Model According to Version of Consumable

8.1 Overview

Figure 31:
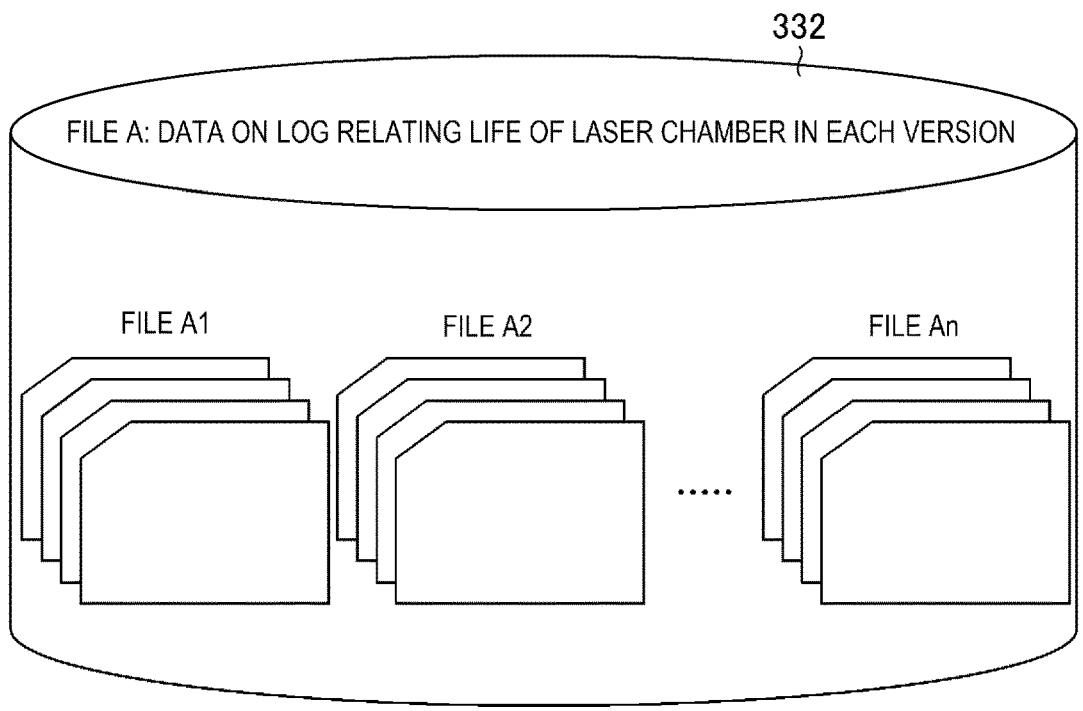
FIG. 31 is a conceptual view showing the configuration of data on a log relating to the life of the laser chamber of each version in a file A.

FIG. 31 shows the configuration of data on a log relating to the life of the laser chamber 100 of each version in the file A. For example, the life of the laser chamber 100 is improved as the progress of technological development. As a specific example, the life of the laser chamber 100 is greatly improved (improved by 20% or higher, for example) in some cases when the material of the electrodes of the laser chamber 100 is modified to extend the life of the electrodes.

Therefore, when modification is so made that life extension is expected, it is preferable to change the version of a consumable, classify the life-related log data on a version basis, and save the classified data in the form of a separate file.

The file A is configured to save the log data for each version of the laser chamber 100. A file A1 is a file of data on a log relating to the life of the laser chamber 100 of a version Ver. A1. A file A2 is a file of data on a log relating to the life of the laser chamber 100 of a version Ver. A2. A file An is similarly a file of data on a log relating to the life of the laser chamber 100 of a version Ver. An.

The log data in each of the files A1, A2, . . . An is used to create a learning model by performing machine learning on a version basis, and the created learning model is saved in the file Am, as shown in FIG. 32.

Figure 32:
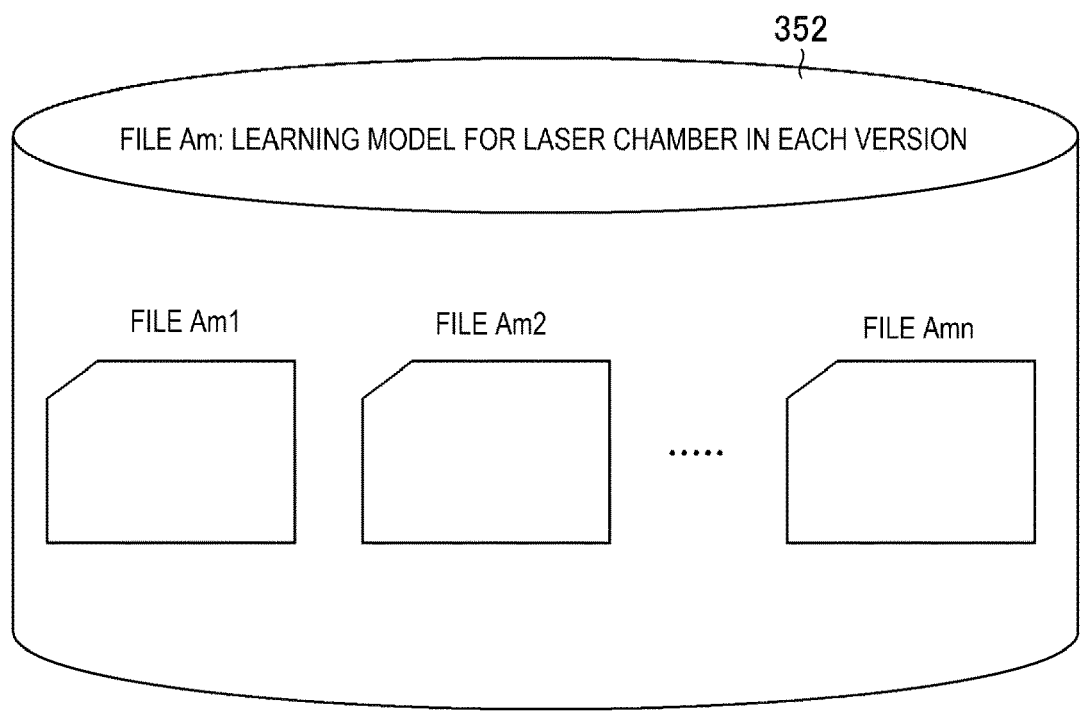
FIG. 32 is a conceptual view showing an example of a file Am configured to save a learning model for the laser chamber of each version.

FIG. 32 shows an example of the file Am configured to save a learning model for the laser chamber 100 of each version. The file Am is configured to save a learning model for each version of the laser chamber 100. A file Am1 is a file configured to save a learning model of the laser chamber 100 of the version Ver. A1. A file Am2 is a file configured to save a learning model of the laser chamber 100 of the version Ver. A2. A file Amn is similarly a file configured to save a learning model of the laser chamber 100 of the version Ver. An.

FIG. 33 shows an example of the file An. The file An has descriptions of hardware and software versions of the laser chamber 100, and the versions allow classification of the file and identification of the location where the file is saved. The software version of the laser chamber 100 may be changed when a change in pulse energy control or gas control software improves the life of the chamber.

8.2 Effects and Advantages

As described with reference to FIGS. 31 to 33, even when a change in hardware or software of a consumable improves the life of the consumable, fine classification of the data on the consumable on a version basis and machine learning performed on a version basis allow creation of a learning model suitable for each version. The life estimation accuracy is improved by using the thus created learning model to perform life estimation.

8.3 Others

The case of the laser chamber 100 has been presented by way of example, but not necessarily, and the present disclosure may be applied to the monitoring module 108 and the line narrowing module 106.

9. Example of Spectrum Detector

Figure 34:
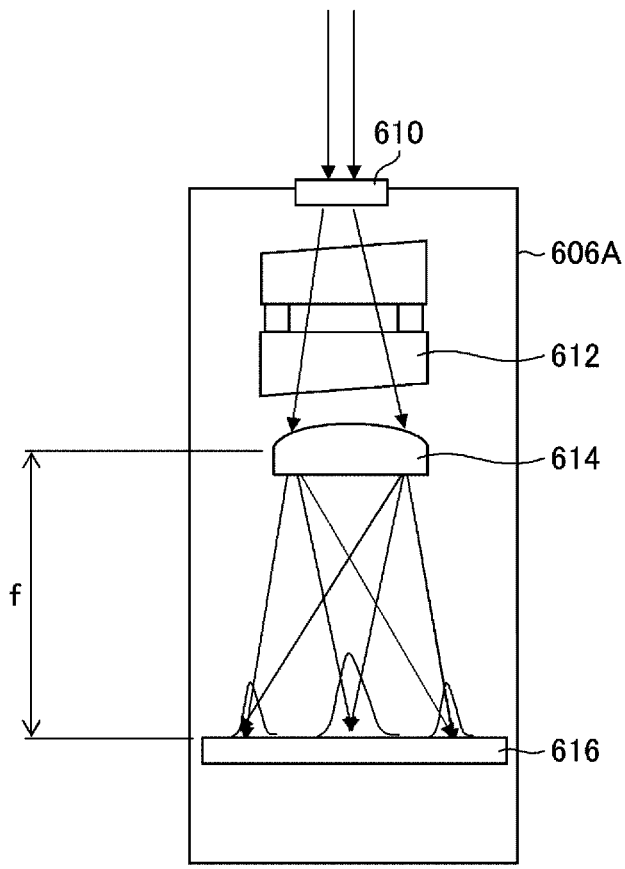
FIG. 34 schematically shows an example of the configuration of a spectrum detector using an etalon spectrometer.

FIG. 34 schematically shows an example of the configuration of a spectrum detector using an etalon spectrometer. An etalon spectrometer 606A shown in FIG. 34 can be used as the spectrum detector 146 configured to measure the spectrum of the excimer laser light. The etalon spectrometer 606A is an example of the "spectrometer" in the present disclosure.

The etalon spectrometer 606A includes a diffuser 610, an etalon 612, a light collection lens 614, and an image sensor 616, as shown in FIG. 34. The image sensor 616 may, for example, be a one-dimensional or two-dimensional photodiode array.

The laser light first enters the diffuser 610. The diffuser 610 may be a transmissive optical element having a large number of irregularities on the surface. The diffuser 610 is configured to transmit the laser light having entered the diffuser 610 in the form of scattered light. The scattered light enters the etalon 612. The etalon 612 may be an air-gap etalon including two partial reflection mirrors each having predetermined reflectance. The air-gap etalon has a configuration in which the two partial reflection mirrors face each other with an air gap having a predetermined distance therebetween and are bonded to each other via a spacer.

Light that does not travel back and forth between the two partial reflection mirrors but passes through the etalon 612 and light that travels back and forth once between the two partial reflection mirrors and then passes through the etalon 612 differ from each other in terms of optical path difference in accordance with an angle of incidence θ of the light incident on the etalon 612. When the optical path difference is an integer multiple of the wavelength, the light incident on the etalon 612 passes through the etalon 612 at high transmittance.

The light having passed through the etalon 612 enters the light collection lens 614. The laser light having passed through the light collection lens 614 is incident on the image sensor 616 disposed in a position separate from the light collection lens 614 and corresponding to a focal length f of the light collection lens 614. That is, the light having passed through and having therefore been collected by the light collection lens 614 forms interference fringes in the focal plane of the light collection lens 614.

The image sensor 616 is disposed in the focal plane of the light collection lens 614. The image sensor 616 is configured to receive the light having passed through the light collection lens 614 and detect the interference fringes. The square of the radius of each of the interference fringes is proportional to the wavelength of the laser light. The spectral linewidth (spectrum profile) and the center wavelength of the entire laser light are therefore detected from the detected interference fringes.

The spectral linewidth and the center wavelength may be determined by an information processing apparatus that is not shown or calculated by the laser control section 90 from the detected interference fringes.

Figure 35:
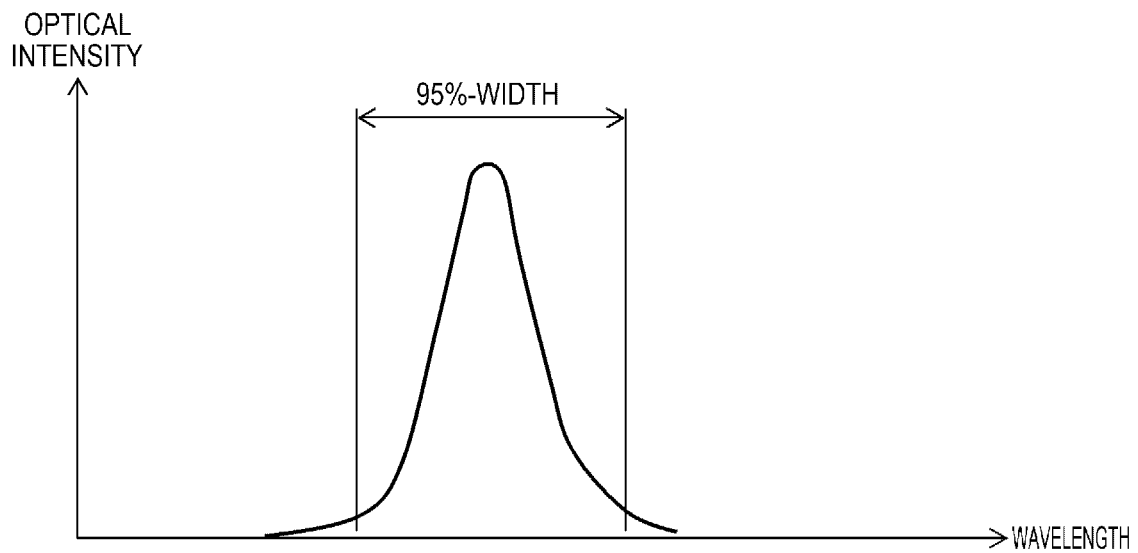
FIG. 35 shows the relationship between a spectral waveform and a width containing 95% of entire energy.

An approximate relationship between a radius r of any of the interference fringes and a wavelength λ is expressed by Expression (3) below.

$$\text{Wavelength } \lambda = \lambda c + \alpha \cdot r^2 \quad (3)$$

α: Proportional constant
r: Radius of interference fringe
λc: Wavelength in a case where optical intensity at the center of interference fringes is maximized After conversion into a spectrum waveform showing the relationship between the optical intensity and the wavelength by using Expression (3), a spectral linewidth Δλ may be calculated, as shown in FIG. 35. The spectral linewidth Δλ may be a width containing 95% of the entire energy (E95).

10. Other Forms of Laser Apparatus 10.1 Configuration

Figure 36:
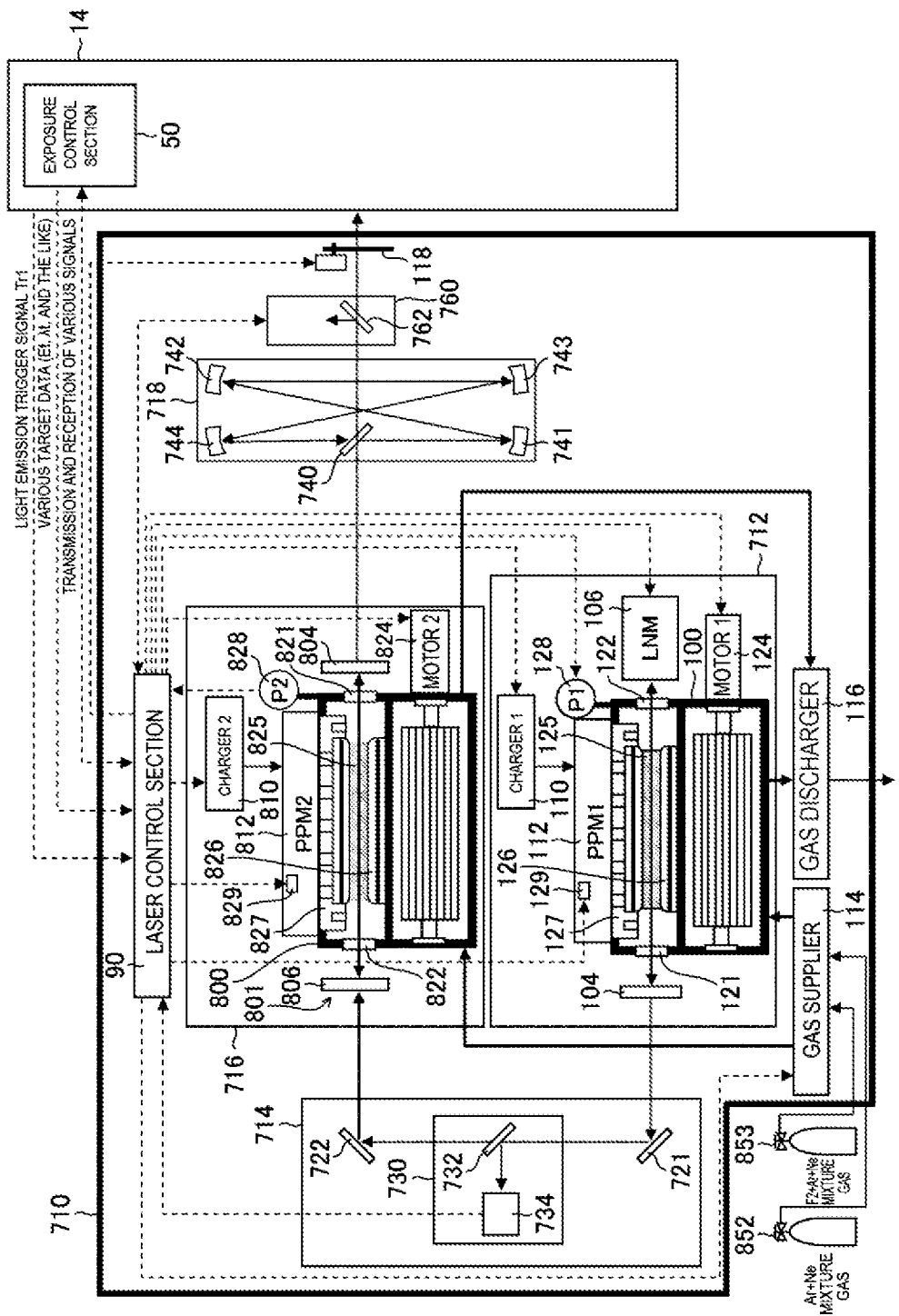
FIG. 36 shows a case where the laser apparatus is formed of a double chamber system.

FIG. 36 shows a case where the laser apparatus is formed of a double chamber system. In place of the laser apparatus 10 described with reference to FIG. 1, a laser apparatus 710 shown in FIG. 36 may be used. The laser apparatus 710 is an example of an ArF excimer laser apparatus. In FIG. 36, elements having the same or similar configurations as those shown in FIG. 1 have the same reference characters.

The laser apparatus 710 includes a master oscillator (MO) 712, a beam steering unit 714, a power oscillator (PO) 716, an optical pulse stretcher (OPS) 718, a monitoring module 760, the exit port shutter 118, the laser control section 90, the gas supplier 114, and the gas discharger 116.

The master oscillator 712 includes the laser chamber 100, the charger 110, the PPM 112, the output coupling mirror 104, and the line narrowing module 106. The configuration of the master oscillator 712 is the same as that of the laser apparatus 10 in FIG. 1.

The beam steering unit 714 includes high reflection mirrors 721 and 722 and an energy monitor 730.

The high reflection mirrors 721 and 722 are so disposed that the pulsed laser light outputted from the master oscillator 712 enters the optical resonator of the power oscillator 716 via the energy monitor 730. The energy monitor 730 is so disposed in the optical path of the high reflection mirrors 721 and 722 as to detect the pulse energy of the pulsed laser light outputted from the master oscillator 712. The energy monitor 730 includes a beam splitter 732 and an optical intensity detector 734. The optical intensity detector 734 may be a photodiode or a pyroelectric device.

The power oscillator 716 includes a laser chamber 800 having a configuration substantially the same as that of the master oscillator 712, an optical resonator 801 and a charger 810. The laser chamber 800 differs in some cases from the laser chamber 100 of the master oscillator 712 in terms of the configurations of electrodes 825 and 826.

The optical resonator 801 includes a partial reflection mirror 806 and an output coupling mirror 804. The partial reflection mirror 806 has reflectance ranging, for example, from 80% to 90%. The output coupling mirror 804 has reflectance ranging, for example, from 10% to 20%. The laser chamber 800 is disposed in the optical path of the optical resonator 801.

The optical pulse stretcher 718, the monitoring module 760, and the exit port shutter 118 are disposed in the optical path of the pulsed laser light outputted from the power oscillator 716.

The optical pulse stretcher 718 is disposed in the optical path between the power oscillator 716 and the monitoring module 760. The optical pulse stretcher 718 includes a beam splitter 740 and four concave mirrors 741, 742, 743, and 744.

The four concave mirrors 741, 742, 743, and 744 are so arranged that the laser beam partially reflected off the beam splitter 740 is transferred to and focused again on the beam splitter 740 and then partially reflected off the beam splitter 740.

The monitoring module 760 is disposed in the optical path between the optical pulse stretcher 718 and the exit port shutter 118. The configuration of the monitoring module 760 may be the same as that of the monitoring module 108 in FIG. 1.

The gas supplier 114 is connected to the laser chambers 100 and 800 and configured to be capable of supplying the laser chambers 100 and 800 with laser gases via valves that are not shown. The gas supplier 114 is connected to a mixture gas cylinder 852 containing an Ar gas and a Ne gas. The mixture gas cylinder 852 corresponds to an inert gas supply source. The gas supplier 114 is further connected to a mixture gas cylinder 853 containing an $F_2$ gas, which is a halogen gas, an Ar gas, and an Ne gas. The mixture gas cylinder 853 corresponds to a halogen gas supply source.

The gas discharger 116 is connected to the laser chambers 100 and 800 and configured to discharge the laser gases from the laser chambers 100 and 800 via valves that are not shown.

The laser control section 90 is connected to a LAN that is not shown in the semiconductor factory and configured to be capable of performing data transmission and reception to and from the laser apparatus management system 206.

10.2 Operation

When the laser control section 90 receives the light emission trigger signal Tr1 from the exposure control section 50 of the exposure apparatus 14, the laser control section 90 is configured to cause the master oscillator 712 to perform laser oscillation. Pulsed laser light having a narrow spectral linewidth is thus outputted from the master oscillator 712.

The pulsed laser light outputted from the master oscillator 712 enters as seed light the optical resonator 801 of the power oscillator 716 via the high reflection mirror 721, the energy monitor 730, and the high reflection mirror 722.

The laser control section 90 is configured to control the ON timing of a semiconductor switch 829 of a PPM 812 in such a way that discharge occurs between the electrodes 825 and 826 of the laser chamber 800 in synchronization with the entry of the seed light into the optical resonator 801.

The seed light undergoes amplified oscillation in the optical resonator 801 of the power oscillator 716, so that the pulsed laser light having a spectral waveform close to that of the seed light is amplified and outputted via the output coupling mirror 804.

The pulsed laser light amplified by the power oscillator 716 enters the optical pulse stretcher 718, which stretches the pulse width of the pulsed laser light. The pulsed laser light outputted from the optical pulse stretcher 718 enters the monitoring module 760, which measures the pulse energy and spectral linewidth of the pulsed laser light.

The pulsed laser light outputted from the monitoring module 760 enters the exposure apparatus 14 via the exit port shutter 118.

10.3 Operation of Master Oscillator

The laser control section 90 is configured to control the charging voltage that charges the charger 110 in such a way that the pulse energy detected with the energy monitor 730 is predetermined pulse energy that allows sufficient suppression of amplified spontaneous emission (ASE) of the pulsed laser light that has undergone the amplified oscillation in the power oscillator 716.

The laser control section 90 is configured to control the wavelength selected by the line narrowing module 106 based on the wavelength measured with the monitoring module 760. Gas control performed by the master oscillator 712 includes the same gas pressure control, halogen injection control, and partial gas replacement control as those in FIG. 1.

10.4 Operation of Power Oscillator

The laser control section 90 is configured to control the charging voltage that charges the charger 810 in such a way that the pulse energy of the pulsed laser light having undergone the amplified oscillation in the power oscillator 716 is the target pulse energy Et.

Gas control performed by the power oscillator 716 includes the same gas pressure control, halogen injection control, and partial gas replacement control as those in FIG. 1.

10.5 Process of Estimating Life of Consumables

As a consumable in the laser apparatus 710 formed of the double chamber system, the laser chamber 800 is added as compared with the consumables of the laser apparatus 10 formed of the single chamber system in FIG. 1. The information relating to the life of the laser chamber 800 may be the same information relating to the life of the laser chamber shown in FIGS. 18 to 20.

The pulse energy items of the laser chamber 100 of the master oscillator 712 are, however, carried out based on pulse energy Emo detected with the energy monitor 730. On the other hand, the pulse energy items of the laser chamber 800 of the power oscillator 716 are carried out based on pulse energy E detected with the monitoring module 760.

Further, the beam steering unit 714 and the optical pulse stretcher 718 may be added as the consumables of the double chamber system.

Information relating to the life of the high reflection mirrors 721 and 722 of the beam steering unit 714 may be the number of oscillation pulses at least after replacement of the mirrors. More preferably, based on the pulse energy Emo detected with the energy monitor 730, the integrated value of Emo or the integrated value of the square of Emo may be used as the life-related information.

Information relating to the life of the energy monitor 730 of the beam steering unit 714 may be the number of oscillation pulses at least after replacement of the energy monitor. More preferably, based on the pulse energy Emo detected with the master oscillator 712, the integrated value of Emo may be used as the life-related information.

Information relating to the life of the beam splitter 740 and the concave mirrors 741 to 744 of the optical pulse stretcher 718 may be the number of oscillation pulses at least after replacement of the beam splitter and the mirrors. More preferably, based on the pulse energy E detected with the monitoring module 760, the integrated value of E or the integrated value of the square of E may be used as the life-related information.

The information relating to the life of the consumables described above is transmitted from the laser control section 90 to the laser apparatus management system 206 that is not shown.

[Others]

FIG. 36 shows the double chamber system by way of example, but not necessarily, and the laser apparatus may be a solid-state laser apparatus in which the master oscillator is configured to output pulsed laser light in an excimer laser amplification region.

11. Variations

The function of creating a learning model based on machine learning and the function of estimating the life of a consumable by using the created learning model in the consumable management servers 310 and 312 described in the first to third embodiments may be achieved by different apparatuses (such as servers).

12. Computer-Readable Medium on which Program is Recorded

A program containing instructions for causing a computer to function as the consumable management server 310 or 312 described in one of the aforementioned embodiments can be recorded on an optical disk, a magnetic disk, or any other computer readable medium (tangible, non-transitory information storage medium), and the program can be provided in the form of the information storage medium. The program can be incorporated in the computer, and a processor in the computer can execute the instructions in the program to cause the computer to achieve the functions of the consumable management server 310 or 312.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious for those skilled in the art that embodiments of the present disclosure would be appropriately combined.

The terms used throughout the present specification and the appended claims should be interpreted as non-limiting terms. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. A machine learning method for creating a learning model configured to cause a computer to execute a procedure of estimating a degree of degradation of a consumable of a laser apparatus, the method comprising:
    acquiring first life-related information containing log data on a life-related parameter that is a parameter relating to a life of the consumable, the log data recorded in correspondence with different numbers of oscillation pulses during a period from start of use of the consumable to replacement thereof;
    dividing the first life-related information into a plurality of levels each representing the degree of degradation of the consumable in accordance with the numbers of oscillation pulses and creating training data configured to associate the first life-related information with the levels representing the degrees of deterioration, the consumable degrading with an increase of the numbers of oscillation pulses;
    creating the learning model configured to estimate the degree of degradation of the consumable from the log data on the life-related parameter by performing machine learning using the training data; and
    saving the created learning model.

2. The machine learning method according to claim 1, wherein the consumable is a laser chamber, and
the first life-related information relating to a life of the laser chamber includes an electrode degradation parameter, a pulse energy stability parameter, and a gas control parameter.

3. The machine learning method according to claim 2, wherein the first life-related information relating to the life of the laser chamber further includes a running load parameter.

4. The machine learning method according to claim 2, wherein the first life-related information relating to the life of the laser chamber further includes a parameter of degradation of an optical element of a laser resonator.

5. The machine learning method according to claim 1, wherein the consumable is a monitoring module, and
the first life-related information relating to a life of the monitoring module includes a parameter of degradation of an optical element of the monitoring module.

6. The machine learning method according to claim 1, wherein the consumable is a monitoring module, and
the first life-related information relating to a life of the monitoring module includes a parameter of degradation of an image sensor of the monitoring module.

7. The machine learning method according to claim 1, wherein the consumable is a line narrowing module, and
the first life-related information relating to a life of the line narrowing module includes a parameter of degradation of an optical element of the line narrowing module.

8. The machine learning method according to claim 7, wherein the first life-related information relating to the life of the line narrowing module further includes a parameter of degradation of a wavelength actuator.

9. The machine learning method according to claim 7, wherein the first life-related information relating to the life of the line narrowing module further includes a parameter of degradation of a wavefront.

10. The machine learning method according to claim 1, wherein the first life-related information is information classified in correspondence with a version of the consumable, and
the created learning model is saved as a learning model corresponding to the version of the consumable.

11. The machine learning method according to claim 1, wherein the learning model is a neural network model.

12. A consumable management apparatus comprising:
    a learning model saving section configured to save the learning model created by carrying out the machine learning method according to claim 1;
    an information acquisition section configured to receive a signal carrying a request for estimation of a life of a consumable to be replaced in the laser apparatus and acquire current second life-related information relating to the life of the consumable to be replaced;
    a life estimation section configured to calculate the life and a remaining life of the consumable to be replaced based on the learning model for the consumable to be replaced and the second life-related information relating to the life of the consumable to be replaced; and
    an information output section configured to notify an external apparatus of information on the calculated life and remaining life of the consumable to be replaced.

13. The consumable management apparatus according to claim 12, wherein the information acquisition section is configured to receive data on a working schedule of the laser apparatus,
the life estimation section is configured to calculate a recommended maintenance date from the working schedule data and the remaining life, and
the information output section is configured to notify the external apparatus of information on the recommended maintenance date.

14. The consumable management apparatus according to claim 13, further comprising
a laser control parameter changing section configured to change a control parameter of the laser apparatus, wherein the information acquisition section is configured to receive information on a desired maintenance date when the consumable to be replaced in the laser apparatus is replaced, and the laser control parameter changing section is configured to compare the number of oscillation pulses calculated from the desired maintenance date with the number of oscillation pulses in the remaining life, and when the number of oscillation pulses in the remaining life is smaller than the calculated number of oscillation pulses, change the control parameter of the laser apparatus in such a way that the life of the consumable to be replaced is extendable to the desired maintenance date, and provide the laser apparatus with the changed control parameter.

15. The consumable management apparatus according to claim 12, wherein the second life-related information is inputted to the learning model, and a score representing a likelihood of the level corresponding to the second life-related information is obtained from the learning model, and the life estimation section is configured to calculate the life and the remaining life of the consumable to be replaced based on a current number of oscillation pulses contained in the second life-related information and the score.

16. The consumable management apparatus according to claim 12, further comprising:

an information acquisition section configured to acquire first life-related information containing data on a parameter relating to the life of the consumable, the data recorded in correspondence with different numbers of oscillation pulses during a period from start of use of the consumable to replacement thereof;

a training data creation section configured to divide the first life-related information into a plurality of levels each representing a degree of degradation of the consumable in accordance with the numbers of oscillation pulses and create training data configured to associate the first life-related information with the levels representing the degrees of deterioration;

a learning model creation section configured to create the learning model configured to estimate the degree of degradation of the consumable from the data on the life-related parameter by performing machine learning using the training data; and a learning model saving section configured to save the created learning model.

17. A non-transitory computer readable medium on which a program is recorded, wherein the program is a program configured to achieve, when executed by a processor, a machine learning function of causing the processor to create a learning model for causing a computer to execute a procedure of estimating a degree of degradation of a consumable of a laser apparatus, and the program containing instructions for causing the processor to achieve the function of acquiring first life-related information containing log data on a life-related parameter that is a parameter relating to then a life of the consumable, the log data recorded in correspondence with different numbers of oscillation pulses during a period from start of use of the consumable to replacement thereof, the function of dividing the first life-related information into a plurality of levels each representing the degree of degradation of the consumable in accordance with the numbers of oscillation pulses and creating training data configured to associate the first life-related information with the levels, the consumable degrading with an increase of the numbers of oscillation pulses, the function of creating the learning model configured to estimate the degree of degradation of the consumable from the log data on the life-related parameter by performing machine learning using the training data, and the function of saving the created learning model.

18. A non-transitory computer readable medium on which a programs is recorded, the program causing a computer to achieve, the function of saving the learning model created by carrying out the program recorded on the computer readable medium according to claim 17, the function of receiving a signal carrying a request for estimation of a life of a consumable to be replaced in the laser apparatus, the function of acquiring current second life-related information relating to the life of the consumable to be replaced in response to the reception of the request signal, the function of calculating the life and a remaining life of the consumable to be replaced based on the learning model for the consumable to be replaced and the second life-related information relating to the life of the consumable to be replaced, and the function of notifying an external apparatus of information on the calculated life and remaining life of the consumable to be replaced.

19. The computer-readable medium according to claim 18, wherein the program further contains instructions for causing the computer to achieve the function of receiving data on a working schedule of the laser apparatus, the function of calculating a recommended maintenance date from the working schedule data and the remaining life, and the function of notifying the external apparatus of information on the recommended maintenance date.

20. The computer-readable medium according to claim 19, wherein the program further contains instructions for causing the computer to achieve the function of receiving information on a desired maintenance date when the consumable to be replaced in the laser apparatus is replaced, the function of comparing the number of oscillation pulses calculated from the desired maintenance date with the number of oscillation pulses in the remaining life, and when the number of oscillation pulses in the remaining life is smaller than the calculated number of oscillation pulses, changing a control parameter of the laser apparatus in such a way that the life of the consumable to be replaced is extendable to the desired maintenance date, and the function of providing the laser apparatus with the changed control parameter.

* * * * *